United States Patent
Higgs, Jr. et al.

(10) Patent No.: US 12,459,997 B2
(45) Date of Patent: *Nov. 4, 2025

(54) COMPOUNDS AND METHODS TARGETING INTERLEUKIN-19

(71) Applicant: Eli Lilly and Company, Indianapolis, IN (US)

(72) Inventors: Richard Earl Higgs, Jr., Zionsville, IN (US); Robert John Konrad, Carmel, IN (US); Brian Jeffrey Nickoloff, Carmel, IN (US); Robert William Siegel, II, Fountaintown, IN (US)

(73) Assignee: Eli Lilly and Company, Indianapolis, IN (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/159,393

(22) Filed: Jan. 25, 2023

(65) Prior Publication Data

US 2023/0220062 A1 Jul. 13, 2023

Related U.S. Application Data

(60) Division of application No. 16/903,731, filed on Jun. 17, 2020, now Pat. No. 11,591,387, which is a continuation of application No. PCT/US2019/013565, filed on Jan. 15, 2019.

(60) Provisional application No. 62/618,200, filed on Jan. 17, 2018.

(51) Int. Cl.
C07K 16/24 (2006.01)

(52) U.S. Cl.
CPC ........ C07K 16/244 (2013.01); *C07K 2317/34* (2013.01); *C07K 2317/565* (2013.01)

(58) Field of Classification Search
CPC .................................................... G01N 33/53
See application file for complete search history.

(56) References Cited

U.S. PATENT DOCUMENTS

| 2012/0034208 A1 | 2/2012 | Chang |
| 2012/0034224 A1 | 2/2012 | Chang |
| 2012/0034225 A1 | 2/2012 | Chang |

FOREIGN PATENT DOCUMENTS

| CN | 102137871 A | 7/2011 |
| WO | 2013/143026 A1 | 10/2013 |
| WO | 2014/168788 | 10/2014 |

OTHER PUBLICATIONS

Li et al., "The association between interleukin-19 concentration and diabetic nephropathy", BMC Nephrology, 18(1), Feb. 2017 (Feb. 2017).
Hsu, et al. "Interleukin-19 blockade attenuates collagen-induced arthritis in rats", Rheumatology, vol. 51 No. 3, Mar. 1, 2012, pp. 434-442.
North et al., *A New Clustering of Antibody CDR Loop Conformations*, Journal of Molecular Biology, 406:228-256 (2011).
Altschul et al., J. Mol. Biol. 215:403-410 (1990).
Rudikoff et al., Proc Natl Acad Sci USA. Mar. 1982; 79(6):1979-83.
Janeway, et al., Immunobiology, 3rd edition, 1997 Garland Publishing Inc., pp. 3:1-3:11.
Edwards, et al., J Mol Biol. Nov. 14, 2003; 334(1):103-18.
Lloyd et al., Protein Eng Des Sel Mar. 2009; 22(3):159-68. Doi:10.1093/protein/gzn058. Epub Oct. 29, 2008.
Goel et al., J. Immunol. Dec. 15, 2004; 173(12):7358-67.
Kanyavuz et al., Nat Rev Immunol Jun. 2019; 19(6):355-368.doi:10.1038/S41577-019-0126-7.
D'Angelo et al., Front Immunol. Mar. 8, 2018;9:395. Doi:10.3389/fimmu.2018.00395.e Collection 2018.
Hsing, et al., "The distribution of interleukin-19 in healthy and neoplastic tissue." Cytokine 44 (2008) 221-228.

*Primary Examiner* — Prema M Mertz
(74) *Attorney, Agent, or Firm* — Quarles & Brady LLP

(57) ABSTRACT

The present invention provides compounds and methods targeting human interleukin-19, including therapeutic antibodies, pharmaceutical compositions and diagnostic applications useful in the field of immune-mediated diseases including psoriasis, atopic dermatitis, psoriatic arthritis, bronchial asthma and diabetic nephropathy.

2 Claims, No Drawings

Specification includes a Sequence Listing.

COMPOUNDS AND METHODS TARGETING INTERLEUKIN-19

The present application is being filed along with a Sequence Listing in ST.26 XML format. The Sequence Listing is provided as a file titled "X20963A.xml" created Jan. 6, 2023 and is 388 kilobytes in size. The Sequence Listing information in the ST.26 XML format is incorporated herein by reference in its entirety. No new matter is added herewith.

The present invention is in the field of medicine. More particularly, the present invention relates to compounds, pharmaceutical compositions, and methods which include an antibody directed against human interleukin-19 (IL-19). The compounds and methods of the present invention are expected to be useful in the field of autoimmune and chronic inflammatory diseases (collectively referred to herein as, immune-mediated diseases), particularly diseases such as psoriasis (Ps0), atopic dermatitis (AD), diabetic nephropathy (DN), bronchial asthma (BA), psoriatic arthritis (PsA) and the like, including treatment thereof and diagnostic applications relating thereto.

Interleukin-19 (IL-19) is a cytokine reported to belong to the interleukin-10 cytokine family (which includes IL-10, 20, 22 and 26 as well as some virus-encoded cytokines). IL-19 has been reported to have involvement in the IL-20R complex signaling pathway and to be expressed in resting monocytes, macrophages, B cells, and epithelial cells including keratinocytes.

Autoimmune diseases arise from the body's production of an immune response against its own tissue. Autoimmune diseases are often chronic and can be debilitating and even life-threatening. Ps0 is a chronic autoimmune disease with systemic manifestations including psoriatic arthritis, cardiovascular disease, metabolic syndrome and affective disorders. AD, along with many other forms of chronic autoimmune diseases such as Ps0, RA, AxSpA and PsA, affect the axial and/or peripheral skeleton.

Current FDA approved treatments for immune-mediated diseases include corticosteroids, often used to treat acute inflammation, and bioproducts targeting TNFα or interleukin-12 and 23. Although these treatments have demonstrated efficacy in reducing symptoms for a subset of patients, a large percentage of patients remain nonresponsive or experience a loss of response to the currently available treatments. For autoimmune diseases such as Ps0, ixekizumab is an FDA approved therapeutic antibody targeting IL-17A in which 90% of patients achieved a 75% reduction in the Psoriasis Assessment Skin Involvement (PASI) score (e.g. PASI 75). However, PASI assessments rely on subject inputs that can be difficult to assess in certain circumstances. To date, an objective, sensitive, and reproducible blood-based biomarker for assessing and informing clinical management of Ps0, and other immune-mediated diseases such as AD, DN and BA does not exist. Thus, there remains an unmet need for compounds, pharmaceutical compositions, and methods useful as therapeutics for, and/or in diagnostic applications relating to, immune-mediated diseases such as Ps0, AD, BA, DN and the like.

Accordingly, in certain embodiments, the present invention provides antibodies directed against human IL-19. According to some embodiments, the present invention provides antibodies which comprise a light chain variable region (LCVR) and a heavy chain variable region (HCVR), wherein the LCVR comprises complementarity determining regions (CDRs) LCDR1, LCDR2 and LCDR3 and the HCVR comprises CDRs HCDR1, HCDR2 and HCDR3 selected from the groupings of CDR combinations provided in Table 1, 2 or 3. In some embodiments, the LCVR comprises CDRs LCDR1, LCDR2 and LCDR3 and the HCVR comprises CDRs HCDR1, HCDR2 and HCDR3 having amino acid sequences with at least 95% homology to the amino acid sequences selected from the groupings of CDR combinations provided in Table 1, 2 or 3. According to particular embodiments, the present invention also provides antibodies comprising a LCVR and a HCVR selected from:

a. the LCVR having the amino acid sequence of SEQ ID NO: 66 and the HCVR having the amino acid sequence of SEQ ID NO: 70;
b. the LCVR having the amino acid sequence of SEQ ID NO: 74 and the HCVR having the amino acid sequence of SEQ ID NO: 78;
c. the LCVR having the amino acid sequence of SEQ ID NO: 82 and the HCVR having the amino acid sequence of SEQ ID NO: 86;
d. the LCVR having the amino acid sequence of SEQ ID NO: 34 and the HCVR having the amino acid sequence of SEQ ID NO: 38;
e. the LCVR having the amino acid sequence of SEQ ID NO: 42 and the HCVR having the amino acid sequence of SEQ ID NO: 46;
f. the LCVR having the amino acid sequence of SEQ ID NO: 50 and the HCVR having the amino acid sequence of SEQ ID NO: 54; and
g. the LCVR having the amino acid sequence of SEQ ID NO: 58 and the HCVR having the amino acid sequence of SEQ ID NO: 62.

According to even more particular embodiments, the present invention also provides antibodies comprising a LC and a HC selected from, or having amino acid sequences with at least 95% homology to the amino acid sequences of:

a. the LC having the amino acid sequence of SEQ ID NO: 2 and the HC having the amino acid sequence of SEQ ID NO: 6;
b. the LC having the amino acid sequence of SEQ ID NO: 10 and the HC having the amino acid sequence of SEQ ID NO: 14;
c. the LC having the amino acid sequence of SEQ ID NO: 18 and the HC having the amino acid sequence of SEQ ID NO: 22;
d. the LC having the amino acid sequence of SEQ ID NO: 26 and the HC having the amino acid sequence of SEQ ID NO: 30;
e. the LC having the amino acid sequence of SEQ ID NO: 310 and the HC having the amino acid sequence of SEQ ID NO: 311; and
f. the LC having the amino acid sequence of SEQ ID NO: 312 and the HC having the amino acid sequence of SEQ ID NO: 313.

According to particular embodiments, the present invention provides human IL-19 neutralizing antibodies having a LCVR and a HCVR, wherein the LCVR comprises CDRs (LCDR1, LCDR2 and LCDR3) and the HCVR comprises CDRs (HCDR1, HCDR2 and HCDR3) selected from, or having amino acid sequences with at least 95% homology to the amino acid sequences of, the CDR combinations provided in Table 1, 2 or 3. In particular embodiments, the human IL-19 neutralizing antibodies of the present invention comprise a LCVR and a HCVR selected from:

a. the LCVR having the amino acid sequence of SEQ ID NO: 66 and the HCVR having the amino acid sequence of SEQ ID NO: 70;

b. the LCVR having the amino acid sequence of SEQ ID NO: 74 and the HCVR having the amino acid sequence of SEQ ID NO: 78;
c. the LCVR having the amino acid sequence of SEQ ID NO: 82 and the HCVR having the amino acid sequence of SEQ ID NO: 86;
d. the LCVR having the amino acid sequence of SEQ ID NO: 34 and the HCVR having the amino acid sequence of SEQ ID NO: 38;
e. the LCVR having the amino acid sequence of SEQ ID NO: 42 and the HCVR having the amino acid sequence of SEQ ID NO: 46;
f. the LCVR having the amino acid sequence of SEQ ID NO: 50 and the HCVR having the amino acid sequence of SEQ ID NO: 54; and
g. the LCVR having the amino acid sequence of SEQ ID NO: 58 and the HCVR having the amino acid sequence of SEQ ID NO: 62.

According to even more particular embodiments, the present invention also provides human IL-19 neutralizing antibodies having a LC and a HC selected from, or having amino acid sequences with at least 95% homology to the amino acid sequences of:
a. the LC having the amino acid sequence of SEQ ID NO: 2 and the HC having the amino acid sequence of SEQ ID NO: 6;
b. the LC having the amino acid sequence of SEQ ID NO: 10 and the HC having the amino acid sequence of SEQ ID NO: 14;
c. the LC having the amino acid sequence of SEQ ID NO: 18 and the HC having the amino acid sequence of SEQ ID NO: 22;
d. the LC having the amino acid sequence of SEQ ID NO: 26 and the HC having the amino acid sequence of SEQ ID NO: 30; and
e. the LC having the amino acid sequence of SEQ ID NO: 310 and the HC having the amino acid sequence of SEQ ID NO: 311; and
f. the LC having the amino acid sequence of SEQ ID NO: 312 and the HC having the amino acid sequence of SEQ ID NO: 313.

In embodiments, antibodies of the present invention comprise an IgG1 heavy chain. According to some embodiments, the antibodies further comprise kappa light chains.

According to some aspects of the present invention, human IL-19 antibodies, including human IL-19 neutralizing antibodies, are provided which bind human IL-19 within an epitope region comprising at least one or more of amino acid residues: 95-102; 67-75; 125-136; 67-75 and 125-136; 90-100; 42-60; 90-107; 149-160; 42-60, 90-107 and 149-160 of human IL-19 as given by SEQ ID NO. 1 (as determined my methods set forth in the present disclosure). In an embodiment, the present invention provides IL-19 antibodies that bind human IL-19 within an epitope region of human IL-19 which bins with an antibody provided herein.

According to some embodiments, the IL-19 antibodies of the present invention are useful in the treatment of immune-mediated diseases. In some more specific embodiments, the immune-mediated diseases are at least one of Ps0, AD, PsA, BA and/or DN. According to other embodiments of the present invention, the IL-19 antibodies of the present invention are useful in diagnostic applications for autoimmune diseases. In some more specific embodiments, the immune-mediated diseases are at least one of Ps0, AD and/or DN.

The present invention further provides pharmaceutical compositions comprising an IL-19 antibody of the present invention and one or more pharmaceutically acceptable carriers, diluents or excipients. Further, the present invention provides a method of treating an immune-mediated disease, such as Ps0, AD and/or DN, comprising administering to a patient in need thereof a pharmaceutical composition of the present invention.

In addition, the present invention provides a method of treating immune-mediated diseases. More particularly, the present invention provides a method of treating immune-mediated diseases, including Ps0, AD, PsA, BA or DN comprising administering to a patient in need thereof an effective amount of an IL-19 antibody of the present invention.

The present invention also provides an IL-19 antibody of the present invention for use in therapy. More particularly, the present invention provides an IL-19 antibody of the present invention for use in treatment of immune-mediated diseases including Ps0, AD, PsA and DN. In an embodiment, the present invention provides the use of an IL-19 antibody of the present invention in the manufacture of a medicament for the treatment of one or more immune-mediated diseases including Ps0, AD, PsA, BA and DN.

According to some embodiments, the present invention provides a method of detecting IL-19 in a patient sample comprising the steps of contacting the patient sample with a first antibody which binds a first epitope region of IL-19; contacting the patient sample with a second antibody which binds a second epitope region of IL-19 and has a detectable label; and detecting a signal provided by said detectable label. In some embodiments, the patient sample is one of blood, serum or plasma. According to some more specific embodiments, the first epitope region of IL-19 partially overlaps with the second epitope region of IL-19. Further, in some embodiments, said steps of contacting with the first and second antibodies occurs simultaneously. In some specific embodiments, the first antibody comprises a combination of LC and HC CDRs provided in Tables 1, 2 or 3. In some embodiments, the first antibody comprises a combination of LC and HC CDRs having 95% homology to the LC and HC CDRs provided in Tables 1, 2 or 3. In some specific embodiments, the second antibody comprises a combination of LC and HC CDRs provided in Tables 1, 2 or 3. In some embodiments, the second antibody comprises a combination of LC and HC CDRs having 95% homology to the LC and HC CDRs provided in Tables 1, 2 or 3. In more particular embodiments, the first and second antibodies do not bin together.

According to some embodiments of the present invention, a method of quantifying IL-19 in a patient sample is provided. Such method includes the steps of contacting the patient sample with a first antibody which binds a first epitope region of IL-19; contacting the patient sample with a second antibody which binds a second epitope region of IL-19 and said has a detectable label; and detecting the signal provided by said detectable label; contacting a control standard with a first antibody which binds the same first epitope region of IL-19 (as used in contacting the patient sample); contacting the control standard with a second antibody which binds the same second epitope region of IL-19 (as used in contacting the patient sample) and having a detectable label; and detecting a signal provided by said detectable signal. In some embodiments, the patient sample is one of blood, serum or plasma. According to some more specific embodiments, the first epitope region of IL-19 partially overlaps with the second epitope region of IL-19. Further, in some embodiments, said steps of contacting with the first and second antibodies occurs simultaneously. In some specific embodiments, the first antibody comprises a combination of LC and HC CDRs provided in Tables 1, 2 or 3. In some embodiments, the first antibody comprises a combination of LC and HC CDRs having 95% homology to the LC and HC CDRs provided in Tables 1, 2 or 3. In some specific embodiments, the second antibody comprises a combination of LC and HC CDRs provided in Tables 1, 2 or 3. In some embodiments, the second antibody comprises a combination of LC and HC CDRs having 95% homology to the LC and HC CDRs provided in Tables 1, 2 or 3. In more particular embodiments, the first and second antibodies do not bin together.

According to some embodiments, a method of diagnosing an immune-mediated disease is provided. Such method comprises the steps of contacting a patient sample with an IL-19 antibody and detecting binding between IL-19 in the patient sample and the antibody. According to some specific embodiments, the method of diagnosing includes diagnosing the patient as having; at risk for; in need of treatment for; and/or at risk of symptoms relating to an immune-mediated disease when the presence of IL-19 in the patient sample is detected as above a reference value. According to some more specific embodiments, such methods further include the steps of determining the reference value including the steps of contacting a control standard with a first antibody which binds the same first epitope region of IL-19 as used in contacting the patient sample; contacting the control standard with a second antibody having a detectable label and which binds the same second epitope region of IL-19 as used in contacting the patient sample; and detecting a signal provided by the detectable signal. In some embodiments, the first antibody comprises a combination of LC and HC CDRs provided in Tables 1, 2 or 3. In some embodiments, the first antibody comprises a combination of LC and HC CDRs having 95% homology to the LC and HC CDRs provided in Tables 1, 2 or 3. Some embodiments of the method of diagnosing an immune-mediated disease, provided herein, further includes the steps of contacting the patient sample with a second IL-19 antibody which binds a second epitope region of IL-19 and has a detectable label; and detecting a signal provided by the detectable label. In some specific embodiments, the IL-19 antibody comprises a combination of LC and HC CDRs provided in Table 1, 2 and 3. In some embodiments, the second IL-19 antibody comprises a combination of LC and HC CDRs provided in Table 1, 2 and 3. In some embodiments, the second antibody comprises a combination of LC and HC CDRs having 95% homology to the LC and HC CDRs provided in Table 1, 2, and 3. According to specific embodiments, the first epitope region of IL-19 partially overlaps with the second epitope region of IL-19. According to particular embodiments, the first and second antibodies do not bin together. According to further embodiments, the reference value is approximately 21 pg/mL. In further embodiments, the immune-mediated disease is one of Ps0, AD, PsA, BA and DN.

In even further embodiments, the present invention provides a method of treating an immune-mediated disease in a patient. Such methods comprise the steps of contacting a patient sample with an IL-19 antibody and detecting binding between IL-19 in the patient sample and the antibody; and diagnosing the patient as having; at risk for; in need of treatment for; and/or at risk of symptoms relating to an immune-mediated disease when the presence of IL-19 in the patient sample is detected as above a reference value. According to some more specific embodiments of the methods of treating provided herein, such methods further include the steps of determining the reference value including the further steps of contacting a control standard with a first antibody which binds the same first epitope region of IL-19 as used in contacting the patient sample; contacting the control standard with a second antibody having a detectable label and which binds the same second epitope region of IL-19 as used in contacting the patient sample; and detecting a signal provided by the detectable signal. In some specific embodiments, the IL-19 antibody comprises a combination of LC and HC CDRs provided in Tables 1, 2 and 3. In some embodiments, the IL-19 antibody comprises a combination of LC and HC CDRs having 95% homology to the LC and HC CDRs provided in Tables 1, 2 or 3. According to some embodiments, the reference value is approximately 21 pg/mL. In embodiments, the immune-mediated disease is one of Ps0, AD and DN. In some embodiments, the patient sample is one of blood, serum or plasma. According to some embodiments, the method further includes the steps of contacting the patient sample with a second IL-19 antibody which binds a second epitope region of IL-19 and has a detectable label and detecting a signal provided by the detectable signal. In even further embodiments, the second antibody comprises a combination of LC and HC CDRs provided in Tables 1, 2 or 3. In some embodiments, the second antibody comprises a combination of LC and HC CDRs having 95% homology to the LC and HC CDRs provided in Tables 1, 2 or 3. According to particular embodiments, the first and second antibodies do not bin together.

As used herein, an "antibody" is an immunoglobulin molecule comprising 2 HCs and 2 LCs interconnected by disulfide bonds. The amino terminal portion of each LC and HC includes a variable region of about 100-120 amino acids primarily responsible for antigen recognition via the CDRs contained therein. The CDRs are interspersed with regions that are more conserved, termed framework regions ("FR"). Each LCVR and HCVR is composed of 3 CDRs and 4 FRs, arranged from amino-terminus to carboxy-terminus in the following order: FR1, CDR1, FR2, CDR2, FR3, CDR3, FR4. The 3 CDRs of the LC are referred to as "LCDR1, LCDR2, and LCDR3," and the 3 CDRs of the HC are referred to as "HCDR1, HCDR2, and HCDR3." The CDRs contain most of the residues which form specific interactions with the antigen. The functional ability of an antibody to bind a particular antigen is largely influenced by the six CDRs. Assignment of amino acids to CDR domains within the LCVR and HCVR regions of the antibodies of the present invention is based on the well-known Kabat numbering convention (Kabat, et al., *Ann. NY Acad. Sci.* 190: 382-93 (1971); Kabat et al., *Sequences of Proteins of Immunological Interest*, Fifth Edition, U.S. Department of Health and Human Services, NIH Publication No. 91-3242 (1991)), and North numbering convention (North et al., *A New Clustering of Antibody CDR Loop Conformations*, Journal of Molecular Biology, 406:228-256 (2011)).

LCs are classified as kappa or lambda, which are each characterized by a particular constant region as known in the art. HCs are classified as gamma, mu, alpha, delta, or epsilon, and define the isotype of an antibody as IgG, IgM, IgA, IgD, or IgE, respectively. The antibodies of the present invention include IgG HCs which can be further divided into subclasses, e.g., IgG1, IgG2, IgG3, IgG4. The carboxy-terminal portion of each HC defines a constant region primarily responsible for effector function. Particular embodiments of antibodies of the present invention may include one or more modifications in the constant region of each HC, for example that enhance or reduce effector function, as are known in the art.

The antibodies of the present invention are monoclonal antibodies. Monoclonal antibodies are antibodies derived from a single copy or clone including, for example, any eukaryotic, prokaryotic or phage clone, and not the method by which it is produced. Monoclonal antibodies can be produced, for example, by hybridoma technologies, recombinant technologies, phage display technologies, synthetic technologies, e.g., CDR-grafting, or combinations of such or other technologies known in the art.

Methods of producing and purifying antibodies are well known in the art and can be found, for example, in Harlow and Lane (1988), *Antibodies, A Laboratory Manual*, Cold Spring Harbor Laboratory Press, Cold Spring harbor, N.Y., chapters 5-8 and 15, ISBN 0-87969-314-2. For example, mice or rabbits may be immunized with human IL-19 and the resulting antibodies can be recovered, purified, and the amino acid sequences determined using conventional methods well known in the art. Likewise, a phage library may be screened, whereby thousands of Fab fragments are screened for interaction with human IL-19 and resulting interactions can be recovered, purified, and the amino acid sequences determined using conventional methods well known in the art, whereby initial lead antibodies can be constructed. According to possible embodiments, antibodies of the present invention may be engineered to contain one or more human framework regions surrounding CDRs derived from the non-human antibody. Human framework germline sequences can be obtained, for example, from ImMunoGeneTics (INGT) via their website, http://imgt.cines.fr, or from *The Immunoglobulin FactsBook* by Marie-Paule Lefranc and Gerard Lefranc, Academic Press, 2001, ISBN 012441351.

In particular embodiments of the present invention, the antibody, or the nucleic acid encoding same, is provided in isolated form. As used herein, the term "isolated" refers to a protein, peptide, or nucleic acid which is free or substantially free from other macromolecular species found in a cellular environment.

The antibodies of the present invention can be used in the treatment of patients. More particularly the antibodies of the present invention are expected to treat immune-mediated diseases or disorders, which include Ps0, AD, PsA, BA and DN. Although antibodies of the present invention are expected to be useful in the treatment of Ps0, AD and DN, such antibodies may also be useful in the treatment of other immune-mediated diseases, including RA, AxSpA and PsA and/or immune-mediated diseases specifically including epithelial cell involvement. As used interchangeably herein, "treatment" and/or "treating" and/or "treat" are intended to refer to all processes wherein there may be a slowing, interrupting, arresting, controlling, stopping, or reversing of the progression of the disorders described herein, but does not necessarily indicate a total elimination of all disorder symptoms. Treatment includes administration of an antibody of the present invention for treatment of a disease or condition in a human that would benefit from a reduction in IL-19 activity, and includes: (a) inhibiting further progression of the disease, i.e., arresting its development; and (b) relieving the disease, i.e., causing regression of the disease or disorder or alleviating symptoms or complications thereof.

As used interchangeably herein, the term "patient," "subject," and "individual," refers to a human. In certain embodiments, the patient is further characterized with a disease, disorder, or condition (e.g., an autoimmune disorder) that would benefit from a reduction in IL-19 activity. In other embodiments, the patient is further characterized as being at risk of developing an immune-mediated disease, disorder, or condition that would benefit from a reduction in IL-19 activity.

A patient "sample" as used herein refers to a human sample. Non-limiting sources of a sample for use in the present invention include blood, plasma, serum, spinal fluid, lymph fluid, biopsy aspirates, ascites, fluidic extracts, solid tissue, the external sections of the skin, respiratory, intestinal, and genitourinary tracts, tears, saliva, milk, tumors, organs, cell cultures and/or cell culture constituents.

As used herein, the term "bind (or binds)" IL-19 refers to an interaction of an antibody with a epitope region of human IL-19. The term "epitope region" refers to specific amino acids comprising IL-19 which provide an antigenic determinant capable of specific binding to an IL-19 antibody. The amino acids of an epitope region provide chemically active surface groupings of IL-19 and form a specific three dimensional structure of IL-19, and may provide specific charge characteristics. Binding may comprise interacting with the epitope region either through "conformational" or "linear" epitope binding of the antibody with human IL-19. Presented herein are exemplified embodiments of IL-19 antibodies that bind linear epitopes of human IL-19, and other exemplified embodiments of IL-19 antibodies that bind conformational epitopes. Conformational and nonconformational/linear epitopes may be distinguished in that the binding to the conformational epitope regions is lost in the presence of denaturing solvents whereas linear epitope regions is not. In a particular embodiment, the term "bind (or binds)" human IL-19 refers to an interaction with an epitope region comprising amino acid residues 95-102 of human IL-19, as determined my methods set forth in the present disclosure (residue numbering based on the exemplified human IL-19 of SEQ ID NO.1). In a further embodiment, the term "bind (or binds)" human IL-19 refers to an interaction with an epitope region comprising amino acid residues 90-100 of human IL-19, as determined my methods set forth in the present disclosure (residue numbering based on the exemplified human IL-19 of SEQ ID NO.1). In another particular embodiment, the term "bind (or binds)" human IL-19 refers to an interaction with an epitope region comprising amino acid residues 67-75 of human IL-19, as determined my methods set forth in the present disclosure (residue numbering based on the exemplified human IL-19 of SEQ ID NO.1). In another embodiment, the term "bind (or binds)" human IL-19 refers to an interaction with an epitope region comprising amino acid residues 125-136 of human IL-19, as determined my methods set forth in the present disclosure (residue numbering based on the exemplified human IL-19 of SEQ ID NO.1). In another particular embodiment, the term "bind (or binds)" human IL-19 refers to an interaction with an epitope region comprising amino acid residues 67-75 and 125-136 of human IL-19, as determined my methods set forth in the present disclosure (residue numbering based on the exemplified human IL-19 of SEQ ID NO.1). In a further embodiment, the term "bind (or binds)" human IL-19 refers to an interaction with an epitope region comprising amino acid residues 42-60 of human IL-19, as determined my methods set forth in the present disclosure (residue numbering based on the exemplified human IL-19 of SEQ ID NO.1). In an embodiment, the term "bind (or binds)" human IL-19 refers to an interaction with an epitope region comprising amino acid residues 90-107 of human IL-19, as determined my methods set forth in the present disclosure (residue numbering based on the exemplified human IL-19 of SEQ ID NO.1). In an embodiment, the term "bind (or binds)" human IL-19 refers to an interaction with an epitope region comprising amino acid residues 149-160 of human IL-19, as determined my methods set forth in the present disclosure (residue numbering based on the exemplified human IL-19 of SEQ ID NO.1). In another particular embodiment, the term "bind (or binds)" human IL-19 refers to an interaction with an epitope region comprising amino acid residues 42-60, 90-107 and 149-160 of human IL-19, as determined my methods set forth in the present disclosure (residue numbering based on the exemplified human IL-19 of SEQ ID NO.1). It should be understood that there are known variations of human IL-19, for example resulting from splice variants. It is also understood that such known variants may result in altered residue numbering for residues described here (for example, as in relation to the residue numbering presented in SEQ ID NO.1). Although the residue numbering may be altered in some variants, the amino acids comprising the epitope region remain the same. The term "epitope region" as used herein refers to discrete, three-dimensional sites of an antigen that are recognized, either in total or in part, by the antibodies of the present invention.

An antibody of the present invention can be incorporated into a pharmaceutical composition which can be prepared by methods well known in the art and comprise an antibody of the present invention and one or more pharmaceutically acceptable carrier(s) and/or diluent(s) (e.g., Remington, *The Science and Practice of Pharmacy*, 22$^{nd}$ Edition, Loyd V., Ed., Pharmaceutical Press, 2012, which provides a compendium of formulation techniques as are generally known to practitioners). Suitable carriers for pharmaceutical compositions include any material which, when combined with an antibody of the present invention, retains the molecule's activity and is non-reactive with the patient's immune system. A pharmaceutical composition comprising an antibody of the present invention can be administered to a patient at risk for, or exhibiting, diseases or disorders as described herein by parental routes (e.g., subcutaneous, intravenous, intraperitoneal, intramuscular, or transdermal). A pharmaceutical composition of the present invention contains an "effective" or "therapeutically effective" amount, as used interchangeably herein, of an antibody of the present invention. An effective amount refers to an amount necessary (at dosages and for periods of time and for the means of administration) to achieve the desired therapeutic result. An effective amount of an antibody may vary according to factors such as the disease state, age, sex, and weight of the individual, and the ability of the antibody to elicit a desired response in the individual. An effective amount is also one in which any toxic or detrimental effects of the antibody of the present invention are outweighed by the therapeutically beneficial effects.

The term percent homology, as used in the present disclosure, in the context of two or more amino acid sequence refers to two or more sequences having a specified percentage of amino acid residues that are the same, when compared and aligned for maximum correspondence, as measured using a sequence comparison algorithm (e.g., BLASTP and BLASTN or other algorithms available to persons of skill) or by visual inspection. Depending on the application, the percent homology can exist over a region of the sequence being compared, e.g., over a functional domain, or, alternatively, exist over the full length of the two sequences to be compared. By way of example, percent homology of a sequence may be compared to a reference sequence. For example, when using a sequence comparison algorithm, test and reference sequences may be input into a computer (and subsequence coordinates may be further designated if desired along with sequence algorithm program parameters). The sequence comparison algorithm then calculates the percent sequence identity or homology for the test sequence(s) relative to the reference sequence(s), based on the designated program parameters. Exemplary sequence alignment and/or homology algorithms are available through, Smith & Waterman, Adv. Appl. Math. 2:482 (1981). Needleman & Wunsch, J. Mol. Biol. 48:443 (1970), Pearson & Lipman, Proc. Nat'l. Acad. Sci. USA 85:2444 (1988), GAP, BESTFIT, FASTA, and TFASTA (in the Wisconsin Genetics Software Package, Genetics Computer Group, 575 Science Dr., Madison, Wis.), or by visual inspection (see generally Ausubel et al., infra). One example of an algorithm that is suitable for determining percent sequence identity and sequence similarity is the BLAST algorithm, which is described in Altschul et al., J. Mol. Biol. 215:403-410 (1990). Software for performing BLAST analyses is publicly available through the National Center for Biotechnology Information (www.ncbi.nlm.nih.gov/).

The present disclosure also pertains to methods of clinical diagnosis, prognosis, or theranosis of a subject performed by a medical professional using the methods disclosed herein. The methods, as described herein, can, for example, be performed by an individual, a health professional, or a third party, for example a service provider who interprets genotype information from the subject. As explained herein, a medical professional may initiate or modify treatment after receiving information regarding a diagnostic method of the present disclosure. For example, a medical professional may recommend a therapy or a change in therapy.

Antibodies of the instant disclosure can be used to isolate, detect and/or quantify IL-19 by standard techniques, such as affinity chromatography, immunoprecipitation, immunohistochemistry or ELISA-based assay. Such assay can be used to detect and/or evaluate the abundance and/or patterns of IL-19 expression for diagnostic, prognostic, or theranostic purposes to monitor polypeptide levels, for example in serum, plasma, blood or tissue as part of a clinical testing procedure, e.g., to determine the efficacy of a given treatment regimen.

IL-19 levels or measurements, as provided by assays of the present invention, may be absolute values (e.g., concentration within a biological sample) or relative values (e.g., concentration compared to a reference). As used herein, IL-19 is referred to as "increased" in a patient sample if the method for detecting IL-19 indicates that the level or concentration of IL-19 in the patient sample is higher than a reference value. Conversely, IL-19 is referred to as "decreased" in a patient sample if the IL-19 level or concentration of IL-19 in a patient sample is lower than a reference value, or for example, the IL-19 value measured in a previous patient sample.

A "reference value" as used herein refers to a known, or approximate concentration of IL-19 associated with a specific condition. The concentration levels in a reference value can be an absolute or relative amount, a range of amount, or a minimum amount, a mean amount, and/or a median amount of IL-19. A reference value can also serve as a baseline of IL-19 to which a value derived from a patient sample is compared. According to some embodiments, the reference value may include a reference value of approximately 21 pg/mL.

A "control standard," as used herein, refers to a sample that can be used to compare the results obtained from a patient sample in the methods of the invention, Control standards can be cells, tissue, or known protein concentrations spiked into a media. The concentration levels in a control standard can be an absolute or relative amount, a range of amount, or a minimum amount, a mean amount, and/or a median amount of IL-19, A control standard can also serve as a baseline of IL-19 to which the patient sample is compared. The control standard can include a concentration value from the same patient or a known, normal reference of IL-19. According to some embodiments, the control standard may include a reference value of approximately 21 pg/mL. Further, in some embodiments, a control standard may express IL-19 concentrations in the form of a standard curve.

As used herein, the term "capture antibody" or "first antibody" refers to an IL-19 antibody capable of binding and capturing IL-19 in a patient sample under suitable conditions, such that the capture antibody-IL-19 complex can be separated from the rest of the sample. In some embodiments, the capture antibody is immobilized. In some embodiments, the capture antibody is labeled with a detectable label. In some embodiments, the capture antibody is immobilized in a "sandwich" immunoassay, and the capture or first IL-19 antibody binds a specific or first epitope region of IL-19. In such sandwich immunoassays, a "detection (or second) antibody" is also utilized. According to some embodiments a detection or second antibody may bind specifically to the capture antibody and may be labelled with a detectable label. In some embodiments, the detection of second antibody binds to the IL-19 already bound, or captured, by the capture or first antibody. In such embodiments, the detection antibody binds IL-19 at a second epitope region and may be labelled with a detectable label.

As understood in the art, an antibody of the present invention may be coupled to a "detectable label" to facilitate its detection. As used herein, a detectable label is a moiety, composition or technique which can be used to detect the binding of the detection antibody to the capture antibody-IL-19 complex. According to some embodiments, the detectable label may be conjugated to the antibody (either capture or detection, as the case may be) directly or indirectly. Examples of detectable labels include various enzymes, prosthetic groups, fluorescent materials, luminescent materials, bioluminescent materials, and radioactive materials. Examples of suitable enzymes include horseradish peroxidase, alkaline phosphatase, beta-galactosidase, or acetylcholinesterase; examples of suitable prosthetic group complexes include streptavidin/biotin and avidin/biotin; examples of suitable fluorescent materials include umbelliferone, fluorescein, fluorescein isothiocyanate, rhodamine, dichlorotnazinylamine fluorescein, dansyl chloride or phycoerythnn; an example of a luminescent material includes luminol; examples of bioluminescent materials include luciferase, luciferin, and aequorirn and examples of suitable radioactive material include $^{125}I$, $^{131}I$, $^{35}S$ or $^{3}H$. Antibodies of the present invention can also be useful in pharmacogenomic analysis Such embodiments, may be used to identify individuals that can benefit from specific or modified treatment modalities and/or monitor efficacy of present treatment regimens.

The term "diagnosis" or "diagnosing", as used interchangeably herein, refers to methods by which the skilled artisan can estimate and/or determine the probability ("a likelihood") of whether or not a patient is suffering from a given disease or condition. In the case of the present invention, "diagnosing" the patient includes using the results of an assay of the present invention to identify or diagnose an autoimmune disease or element related to an autoimmune disease and the patient (that is, the presence or occurrence of an autoimmune disease or the need for treatment, or the effectiveness of a treatment against the autoimmune disease with the patient). A diagnosis may, according to the present invention, be based on a combination of other clinical indicia, as understood by a healthcare professional, to arrive at a diagnosis.

EXAMPLES

Expression of IL-19 Antibodies

Murine-derived IL-19 antibodies of the present invention are generated employing hybridoma methodology (e.g., as first described by Kohler et al., Nature, 256:495 (1975)). Briefly, the mouse is immunized with recombinant human IL-19 and lymphocytes capable of producing antibodies that bind human IL-19 are isolated and fused with a myeloma cell line using a suitable fusing agent for forming a hybridoma cell (Goding, Monoclonal Antibodies: Principles and Practice, pp. 59-103 (Academic Press, 1986)). Hybridomas are seeded and grown in a suitable culture medium (preferably containing one or more substances inhibiting survival of unfused myeloma cells). Binding specificity of monoclonal antibodies produced by hybridomas is then determined by an in vitro binding assay (e.g., immunoprecipitation, radioimmunoassay (RIA), or enzyme-linked immunosorbent assay (ELISA)). Preferred hybridomas may be subcloned by limiting dilution procedures and grown by standard methods including in vivo as ascites tumors in an animal (Goding, Monoclonal Antibodies: Principles and Practice, pp. 59-103 (Academic Press, 1986p). Monoclonal antibodies secreted by the hybridomas (and or subclones) are purified according to conventional procedures such as, for example, affinity chromatography (e.g., protein A or protein G-Sepharose) or ion-exchange chromatography, hydroxylapatite chromatography, gel electrophoresis, dialysis, or the like. Affinity maturation of antibodies may be performed according to methods known in the field.

cDNA encoding antibodies of the present invention is sequenced using conventional procedures. cDNA sequences encoding the heavy and light chains may be cloned and engineered into a GS (glutamine synthetase) expression vector. The engineered immunoglobulin expression vector may then be stably transfected into CHO cells. As one of skill in the art will appreciate, mammalian expression of antibodies will result in glycosylation, typically at highly conserved N-glycosylation sites in the Fc region. Stable clones may be verified for expression of an antibody specifically binding to human IL-19. Positive clones may be expanded into serum-free culture medium for antibody production in bioreactors. Media, into which an antibody has been secreted, may be purified by conventional techniques. For example, the medium may be conveniently applied to a Protein A or G Sepharose FF column that has been equilibrated with a compatible buffer, such as phosphate buffered saline. The column is washed to remove nonspecific binding components. The bound antibody is eluted, for example, by pH gradient and antibody fractions are detected, such as by SDS-PAGE, and then pooled. The antibody may be concentrated and/or sterile filtered using common techniques. Soluble aggregate and multimers may be effectively removed by common techniques, including size exclusion, hydrophobic interaction, ion exchange, or hydroxyapatite chromatography. The product may be immediately frozen, for example at −70° C., or may be lyophilized. CDR sequences of exemplified embodiments of murine-derived IL-19 antibodies of the present invention, which have been affinity optimized as known in the art, are provided in Table 1.

TABLE 1

Murine Immunization-Derived Antibody CDR Amino Acid Sequences

| Antibody | Light Chain CDRs SEQ ID NOs. | | | Heavy Chain CDRs SEQ ID NOs. | | |
|---|---|---|---|---|---|---|
| | LCDR1 | LCDR2 | LCDR3 | HCDR1 | HCDR2 | HCDR3 |
| M_1 | 3 | 4 | 5 | 7 | 8 | 9 |
| M_2 | 11 | 12 | 13 | 15 | 16 | 17 |
| M_3 | 19 | 20 | 21 | 23 | 24 | 25 |
| M_4 | 27 | 28 | 29 | 31 | 32 | 33 |
| M_5 | 303 | 304 | 305 | 307 | 308 | 309 |

Rabbit-derived IL-19 antibodies of the present invention are generated after obtaining antibody gene sequences directly from B cells. Briefly, a rabbit is immunized with recombinant human IL-19 and mRNA is isolated from antigen-specific. B cells enriched from PBMCs. Nucleic acid sequence encoding the heavy and light chain variable regions from this library are then cloned into a cell-based display system. Functional binding fragments are isolated from library, the individual genie sequences determined, cloned for recombinant IgG expression, and purified essentially as described above with regard to murine-derived IL-19 antibodies. CDR sequences of exemplified embodiments of rabbit-derived IL-19 antibodies of the present invention, which have been affinity optimized as known in the art, are provided in Table 2.

TABLE 2

Rabbitt Immunization-Derived Antibody CDR Amino Acid Sequences.

| Antibody | Light Chain CDRs SEQ ID NOs. | | | Heavy Chain CDRs SEQ ID NOs. | | |
|---|---|---|---|---|---|---|
| | LCDR1 | LCDR2 | LCDR3 | HCDR1 | HCDR2 | HCDR3 |
| R_1 | 35 | 36 | 37 | 39 | 40 | 41 |
| R_2 | 43 | 44 | 45 | 47 | 48 | 49 |
| R_3 | 51 | 52 | 53 | 55 | 56 | 57 |
| R_4 | 59 | 60 | 61 | 63 | 64 | 65 |
| R_5 | 90 | 91 | 92 | 93 | 94 | 95 |
| R_6 | 96 | 97 | 98 | 99 | 100 | 101 |
| R_7 | 102 | 103 | 104 | 105 | 106 | 107 |
| R_8 | 108 | 109 | 110 | 111 | 112 | 113 |
| R_9 | 114 | 115 | 116 | 117 | 118 | 119 |
| R_10 | 120 | 121 | 122 | 123 | 124 | 125 |
| R_11 | 126 | 127 | 128 | 129 | 130 | 131 |
| R_12 | 132 | 133 | 134 | 135 | 136 | 137 |
| R_13 | 138 | 139 | 140 | 141 | 142 | 143 |
| R_14 | 144 | 145 | 146 | 147 | 148 | 149 |
| R_15 | 150 | 151 | 152 | 153 | 154 | 155 |
| R_16 | 156 | 157 | 158 | 159 | 160 | 161 |
| R_17 | 162 | 163 | 164 | 165 | 166 | 167 |
| R_18 | 168 | 169 | 170 | 171 | 172 | 173 |
| R_19 | 174 | 175 | 176 | 177 | 178 | 179 |
| R_20 | 180 | 181 | 182 | 183 | 184 | 185 |
| R_21 | 186 | 187 | 188 | 189 | 190 | 191 |
| R_22 | 192 | 193 | 194 | 195 | 196 | 197 |
| R_23 | 198 | 199 | 200 | 201 | 202 | 203 |
| R_24 | 204 | 205 | 206 | 207 | 208 | 209 |
| R_25 | 210 | 211 | 212 | 213 | 214 | 215 |
| R_26 | 216 | 217 | 218 | 219 | 220 | 221 |
| R_27 | 222 | 223 | 224 | 225 | 226 | 227 |
| R_28 | 228 | 229 | 230 | 231 | 232 | 233 |
| R_29 | 234 | 235 | 236 | 237 | 238 | 239 |
| R_30 | 240 | 241 | 242 | 243 | 244 | 245 |
| R_31 | 246 | 247 | 248 | 249 | 250 | 251 |
| R_32 | 252 | 253 | 254 | 255 | 256 | 257 |
| R_33 | 258 | 259 | 260 | 261 | 262 | 263 |
| R_34 | 264 | 265 | 266 | 267 | 268 | 269 |
| R_35 | 270 | 271 | 272 | 273 | 274 | 275 |
| R_36 | 276 | 277 | 278 | 279 | 280 | 281 |
| R_37 | 282 | 283 | 284 | 285 | 286 | 287 |
| R_38 | 286 | 287 | 288 | 289 | 290 | 291 |
| R_39 | 295 | 296 | 297 | 299 | 300 | 301 |

Phage-derived IL-19 antibodies of the present invention are isolated from antibody phage libraries employing common techniques such as described above, as described in McCafferty et al, Nature, 348:552-554 (1990) Clackson et al., Nature, 352:624-628 (1991) and Marks et al, J. Mol. Biol, 222:581-597 (1991). cDNA sequences encoding the heavy and light chains of phage-derived antibodies of the present invention may be cloned and engineered into a GS (glutamine synthetase) expression vector for recombinant expression in a competent cell line, such as CHO cells. CDR sequences of exemplified embodiments of phage-derived IL-19 antibodies of the present invention are provided in Table 3.

TABLE 3

Phage-Derived Antibody CDR Amino Acid Sequences.

| Antibody | Light Chain CDRs SEQ ID NOs. | | | Heavy Chain CDRs SEQ ID NOs. | | |
|---|---|---|---|---|---|---|
|  | LCDR1 | LCDR2 | LCDR3 | HCDR1 | HCDR2 | HCDR3 |
| P_1 | 67 | 68 | 69 | 71 | 72 | 73 |
| P_2 | 75 | 76 | 77 | 79 | 80 | 81 |
| P_3 | 83 | 84 | 85 | 87 | 88 | 89 |

Binding Kinetics and Affinity

Bio-layer interferometry (BLI) assay, measured with a Octet Red96® instrument available from ForteBio (using HBS-EP+ running buffer (GE Healthcare, 10 mM Hepes pH7.4+150 mM NaCl+3 mM EDTA+0.05% surfactant P20) at 25° C.), is used to measure binding of the exemplified IL-19 antibodies of the present invention to recombinant human IL-19 (having the amino acid sequence set for in SEQ ID NO: 1).

Except as noted, all reagents and materials are from ForteBio (Freemont, Calif.). An AMQ biosensor is used to immobilize antibody of interest for analysis. Exemplified antibody samples of the present invention (R_1, R_2, R_3, R_4, R_39, M_1, M_2 and M_5) are prepared at 5 pg/mL by dilution into running buffer. Recombinant human IL-19 is prepared to concentrations of 270, 90, 30, 10, 3.33, 1.11, 0.370, and 0 (blank) nM by dilution into running buffer. Each analysis consists of: (1) capturing antibody samples on biosensors for 300 secs; (2) establishing a baseline by incubating antibody loaded biosensors with running buffer for 60 secs; (3) incubating antibody loaded biosensors with serially diluted recombinant human IL-19 for 300 secs to monitor association phase; (4) return of biosensor to running buffer to monitor dissociation phase.

Binding data is processed using standard double-referencing and fit to a 1:1 binding model using Data Analysis v9.0 evaluation software, to determine the association rate ($k_{on}$, $M^{-1}$ $s^{-1}$ units), dissociation rate ($k_{off}$, $s^{-1}$ units), and $R_{max}$ (nm units). The equilibrium dissociation constant ($K_D$) was calculated from the relationship $K_D = k_{off}/k_{on}$, and is in molar units. Results are provided in Table 4.

TABLE 4

SPR binding data to recombinant human IL-19.

| Exemplified Antibody | $k_{on}$ ($M^{-1}s^{-1}$ units) | $k_{off}$ ($M^{-1}s^{-1}$ units) | $K_D$* (M) |
|---|---|---|---|
| R_1 | 3.33 × 10$^4$ | 1.04 × 10$^{-5}$ | 3.11 × 10$^{-10}$ |
| R_2 | 4.28 × 10$^5$ | 4.42 × 10$^{-5}$ | 1.03 × 10$^{-10}$ |
| R_3 | 3.91 × 10$^5$ | <1.00 × 10$^{-7}$ | <1.00 × 10$^{-12}$ |
| R_4 | 1.52 × 10$^5$ | 1.30 × 10$^{-3}$ | 8.52 × 10$^{-9}$ |

TABLE 4-continued

SPR binding data to recombinant human IL-19.

| Exemplified Antibody | $k_{on}$ ($M^{-1}s^{-1}$ units) | $k_{off}$ ($M^{-1}s^{-1}$ units) | $K_D$* (M) |
|---|---|---|---|
| R_39 | 2.06 × 10$^5$ | 3.48 × 10$^{-2}$ | 1.70 × 10$^{-7}$ |
| M_1 | 1.10 × 10$^6$ | 6.32 × 10$^{-5}$ | 5.76 × 10$^{-11}$ |
| M_2 | 6.37 × 10$^4$ | 1.85 × 10$^{-4}$ | 2.90 × 10$^{-9}$ |
| M_5 | 6.88 × 10$^5$ | 3.58 × 10$^{-5}$ | 5.21 × 10$^{-11}$ |

*$K_D$ results are considered relative as the results are not normalized for influence of avidity.

Epitope Mapping

PEPperCHIP® peptide microarray linear epitope mapping of exemplified antibody M_1 against human IL-19 is performed, according to manufacturer instructions, for high resolution linear epitope mapping. Briefly, exemplified antibody M-1 is incubated with a custom PEPperCHIP® peptide microarray comprising overlapping 12-mer peptide fragments of human IL-19. Scanning intensity is resolved using manufacturer software. An epitope, consisting of residues 95-102 (EPNPKILR) of SEQ ID NO. 1 is revealed, according to PEPperCHIP® analysis, for exemplified antibody M_1. Other murine-derived and rabbit-derived exemplified antibodies of the present invention do not yield a linear epitope, indicating human IL-19 conformational epitope binding.

Hydrogen deuterium exchange coupled with mass spectrometry (HDX-MS) is performed to map epitope regions of human IL-19 recombinant protein for exemplified antibodies M_2, M_3, M_5 and R_39. Briefly, HDX-MS is performed on a Waters nanoACQUITY system with HDX technology, including a LEAP HDX robotic liquid handling system and mass analysis is performed on a Waters Xevo G2-Tof mass spectrometer. The complex of human IL-19 with exemplified antibodies M_2, M_3, M_5, and R_39 is prepared at the molar ratio of 1:1.2 in 10 mM sodium phosphate buffer, pH 7.4 containing 150 mM NaCl (1×PBS buffer). The deuterium exchange experiment is initiated adding 55 uL of D$_2$O buffer containing 0.1×PBS to 5 ul of human IL-19 or the human IL-19/antibody complex at 15° C. for various amounts of time (0 s, 10 s, 1 min, 10 min, 60 min, 120/240 min). The reaction is quenched using equal volume of was 0.32M TCEP, 0.1M phosphate pH 2.5 for two minutes at 1° C. 50 μL of the quenched reaction is injected on to an on-line pepsin column (Waters BEH Enzymate) at 14° C., using 0.2% formic acid in water as the mobile phase at a flow rate of 100 μL/min for 4 min. The resulting peptic peptides are then separated on a C18 column (Waters, Acquity UPLC BEH C18, 1.7 m, 1.0 mm×50 mm) fit with a Vanguard trap column using a 3 to 85% acetonitrile (containing 0.2% formic acid) gradient over 10 min at a flow rate of 50 L/min. The separated peptides are directed into a Waters Xevo G2 time-of-flight (qTOF) mass spectrometer. The mass spectrometer is set to collect data in the MS$^E$, ESI$^+$ mode; in a mass acquisition range of m/z 255.00-1950.00; with a scan time of 0.5 s. The Xevo G2 is calibrated with Glu-fibrinopeptide prior to use. All acquired data is mass corrected using a 2 pg/ml solution of LeuEnk in 50% ACN, 50% H$_2$O and 0.1% FA at a flowrate of 5 µl/min every 30 s (m z of 556.2771). The peptides are initially identified by Waters Protein Lynx Global Server 3.02. The processing parameters are set to low energy threshold at 100.0 counts, an elevated energy threshold at 50.0 counts and an intensity threshold at 1500.0 counts. The resulting peptide list is imported to Waters DynamX 3.0 software, with threshold of 5 ppm mass error, 20% fragments ions per peptide based on peptide length. The relative deuterium incorporation for each peptide is determined by processing the MS data for deuterated samples along with the non-deuterated control in DynamX.

Sequence coverage from 90.9 to 94.8% of human IL-19 protein, with HDX-MS as described, is observed. When in complex with the exemplified antibodies, decreased deuterium uptake is observed at the residues of SEQ ID NO. 1 as denoted: M_2 and M_3: residues 67-75 (QIIKPLDVC) and 125-136 (RQCHCRQEATNA); M_5 residues 90-100 (FKDHQEPNPKI); and R_39 residues 42-60 (QEIKRAI-QAKDTFPNVTIL), 90-107 (FKDHQEPNPKILRKISSI), and 149-160 (VHAAAIKSLGEL).

Binning Experiments

Binning experiments involve competing monoclonal antibodies against one another in a pairwise and combinatorial fashion for binding to a specific antigen. A "bin" is a relative concept, based upon the epitope regions represented within the panel of monoclonal antibodies being tested. Two antibodies belong to the same bin if they cannot pair with one another and share the same blocking profile when tested against the other antibodies (or bins of antibodies) in the test panel. Binning of exemplified antibodies of the present invention may be performed by cross-competition binding assays using the Octet Red96®, available from ForteBio, according to manufacturer instruction. Briefly, to determine if two antibodies share overlapping epitope regions, an exemplified antibody is labeled with biotin and captured onto streptavidin sensor tip. The coated biosensor up is then incubated with recombinant human IL-19 to saturate the capture antibody binding sites. The capture antibody-antigen complex is then incubated with a detection antibody. A change in wavelength is detected if the detection antibody is capable of binding. Antibodies with a same binding profile are grouped together into the same bin. Results are presented in Table 5.

TABLE 5

Antibody Binning Groups

| Exemplified Antibody | Binning Group |
| --- | --- |
| M_1 | 1 |
| M_2 | 2 |
| M_3 | 2 |
| M_4 | 1 |
| M_5 | 1 |
| R_1 | 3 |
| R_2 | 3 |
| R_3 | 3 |
| R_4 | 4 |

Neutralization of IL-19 In Vitro

Antibodies of the present invention are expected to neutralize IL-19. Neutralization of IL-19 activity by antibodies of the present invention may be assessed by one or more of the IL-19/IL-19 receptor binding assay formats, as well as IL-19 binding assays, for example, as described below.

In an example, IL-19 is radiolabeled, for example, with iodine-125 or tritium. Cells (e.g., transfected with the IL-19 receptor, transformed keratinocytes that endogenously express the IL-19 receptor, or primary human cells such as keratinocytes that express the IL-19 receptor) expressing the IL-19 receptor such as IL-20R1 are used in the assay which may be conducted in buffered media, such as HBSS with calcium and magnesium and with whole cells. Accordingly, the cells may be incubated with the labeled IL-19 in the assay buffer at 4, 20 or 37° C. for 1 to 6 hours. A readout provides the amount of label bound to the cells after separation of unbound tracer, such as with filtration though a glass fiber filter. Alternatively, neutralization may be assessed by way of a proximity based assay, such as with SPA beads. Further, a neutralization assay utilizing non-radioactive label IL-19 protein may be used.

Such neutralization assays involve pre-incubation of the antibody being assessed with the labeled IL-19 (for example, for 1 hour) before addition to the binding assay (as well as control samples in which no antibody targeting IL-19 is involved). Concentrations of labeled IL-19 near the 50% binding level (EC50) may be used, as well as varying concentrations (for example, in assessing a dose response of the antibody such as from about 100 micromolar down to about 1 picomolar). Antibody inhibition assessed for a range allows for determination of potency (IC50).

According to another method for assessing neutralization of IL-19 by antibodies of the present invention, the IL-19 protein is labeled with a fluorescent dye for flow cytometry (e.g., Alexa-647) and used to label cells, such as human keratinocytes. The binding may then be measured using flow cytometry. Neutralization of IL-19 by the antibody is assessed by pre-incubating the antibody with the labeled IL-19 (for example, for 1 hour at 4° C.) before adding the mixture to the cells (with staining occurring for 5 about 3 hours at 4° C.). Concentrations of fluorescently labeled IL-19 near its 50% binding level (EC50) may used, as well as varying concentrations (for example, in assessing a dose response of the antibody such as from about 100 micromolar down to about 1 picomolar). Antibody inhibition of binding of the labeled IL-19 to its receptor is reflected by measurement of loss of labeled cells, and a potency (IC50) for the antibody may be determined.

Alternatively, a biophysical assay such as bio-layer interferometry (BLI) may be used for assessing neutralization of IL-19 by antibodies of the present invention. Binding between a ligand immobilized on the biosensor tip surface and an analyte in solution produces an increase in optical thickness at the biosensor tip, which results in a wavelength shift (expressed in nm). According to such assay, the IL-19 receptor (i.e., IL-20R1) is expressed in a membrane-free manner (such as with an Fc-fusion e.g. IL20Rbeta Fc chimera protein from R&D Systems catalog 1788-IR-050). AMQ or anti-rabbit conjugated biosensors (ForteBio) are used to immobilize anti-IL-19 antibody of interest (M_1, M_2, M_3, M_5 and R_39). The immobilized antibodies are then incubated with recombinant human IL-19 protein diluted to 100 nM using HBS-EP+ running buffer (GE Healthcare, 10 mM Hepes pH7.4+150 mM NaCl+3 mM EDTA+0.05% surfactant P20) for 240-300 secs. The human IL-19, after binding to the anti-IL-19 antibody, is assessed by incubation with human IL-20R beta Fc-fusion protein for 240-300 secs. The ability of the antibody to block or neutralize binding of the IL-19 ligand to the soluble receptor is observed as a minimal (<0.025 nm) increase in the wavelength during this step of the assay. Results are provided in Table 6.

TABLE 6

In vitro neutralization.

| Exemplified Antibody | IL-20R beta Fc protein binding response (nm) | Neutralization |
|---|---|---|
| M_1 | −0.0075 | Yes |
| M_2 | 0.3614 | No |
| M_3 | 0.3539 | No |
| M_5 | −0.0124 | Yes |
| R_39 | −0.0421 | Yes |

Another method of assessing neutralization of IL-19 by antibodies of the present invention includes addition of such antibody, pre-incubated with human IL-19, to human keratinocytes. Exogenous IL-19 to human keratinocytes induces expression of additional IL-19 and other inflammatory molecules such as IL-8, CCL20 and S100A7. After pre-incubation of the antibody and IL-19 (for example, for 1 hr at 4° C.), the antibody-IL-19 mixture is added to cultured human keratinocytes. The cells are then cultured for 1 to 48 hrs and one or more of IL-19, IL-8, CCL20 and S100A7 (or other molecule expressed downstream of IL-19) in the supernatant is measured, for example, by ELISA (alternatively, mRNA of the downstream molecule may be measured). Antibody inhibited IL-19 function will demonstrate a reduced expression of the downstream molecule by the cultured keratinocytes.

PathHunter® eXpress IL20RA/IL20RB dimerization assay (DiscoverX product code 93-1027E3) is used to assess ability of exemplified antibodies to prevent binding of human IL-19 recombinant protein in a cell-based assay format. The assay detects ligand induced dimerization of two subunits of a receptor-dimer pair. The cells have been engineered to co-express one receptor subunit fused to enzyme donor and a second dimer partner fused to enzyme acceptor. Binding of an agonist to one receptor subunit induces it to interact with its dimer partner, forcing complementation of the two enzyme fragments resulting in the formation of a functional enzyme that hydrolizes a substrate to generate a chemiluminescent signal. Briefly, cells are plated at 2500 cells per well and cultured at 37° C./5% $CO_2$ for 4 hours before addition of human IL-19 recombinant protein pre-mixed with various concentrations, ranging from 10 to 0.00001 pg/ml including a buffer only control, of exemplified antibodies (M_1 and M_5). Human IL-19 recombinant protein with and without exemplified antibodies mixture is then incubated with cells overnight at 37° C./5% $CO_2$. Substrate buffer is added to cells and incubated at room temperature for 1 hour in the dark before luminescent detection. The concentration of exemplified antibody resulting in inhibition of 50% of signal (IC50) and the maximum signal inhibition percentage (% inhibition) is tabulated for eight experiments with standard error of the mean (SEM) denoted below. Results are provided in Table 7.

TABLE 7

Cell-based neutralization.

| Exemplified Antibody | IC50 +/− SEM (μg/ml) | % inhibition +/− SEM |
|---|---|---|
| M_1 | 0.48 +/− 0.06 | 98.59 +/− 0.42 |
| M_5 | 0.64 +/− 0.20 | 105.03 +/− 1.38 |

IL-19 Assay

Plaque type psoriasis is currently measured based on measures of overall body surface involvement (BSA) and/or assessments of degree of erythema, thickness and scale of psoriasis lesions (PASI). However, given subjective input required with these methods they may not be linear depending on severity of skin involvement. No single blood-derived marker has been identified which allows for assessing overall psoriasis activity. Therefore, a more objective and reproducible method to determine severity is desired. The present invention provides a highly sensitive and specific assay to measure IL-19 levels in patients samples such as blood, serum and plasma. As illustrated herein, the IL-19 assay of the present invention provides an accurate diagnostic tool for therapy responsiveness (i.e., a predictive biomarker), disease reoccurrence (i.e., a prognostic biomarker), disease onset, and disease severity in patients with moderate-to-severe Ps0.

According to an exemplified embodiment, a sandwich ELISA assay for the sensitive detection of IL-19 is provided herein. The assay utilizes exemplified IL-19 antibodies of the present invention, for example, as set forth in Table 1, 2 or 3. According to an exemplified embodiment, a first IL-19 antibody (selected from Table 1, 2 or 3) is utilized as an IL-19 capture antibody and a second IL-19 antibody (selected from Table 1, 2 or 3) is utilized as an IL-19 reporter antibody. In some embodiments the first and second IL-19 antibodies are selected from separate epitope bins (for example, in specific embodiments, exemplified IL-19 antibody M_1 is paired with exemplified IL-19 antibody M_2). According to some embodiments, one milligram of the first IL-19 antibody (the capture antibody) is biotinylated using Pierce biotinylation kit (Cat #) and one milligram of the second IL-19 antibody (the reporter antibody) is labeled with ruthenium using MesoScale Discovery (MSD) kit for electrochemiluminescent (ECL) detection. According to such embodiment, labeled antibodies are evaluated using MALDI-TOF to ensure suitable labeling, and then diluted in 50% glycerol and stored at −20° C. prior to use.

Streptavidin-coated 96-well MSD plates are washed three times with TBST (Tris buffered saline containing 10 mmol/L Tris pH 7.40, 150 mmol/L NaCl with 1 mL Tween 20/L) and then blocked with TBS-T plus 1% BSA for 1 hour at room temperature. Plates are again washed and wells are then incubated with biotinylated IL-19 capture antibody (1 mg/L) for 1 hour. Thereafter, plates are again washed prior to patient sample testing.

During patient sample testing, a standard curve is generated using 50 μL of recombinant human IL-19 control standard (serially diluted IL-19 recombinant protein ranging from 100-0.0001 ng/L, and including a zero blank, in assay buffer of 50 mmol/L HEPES, pH 7.40, 150 mmol/L NaCl, 10 mL/L Triton X-100, 5 mmol/L EDTA, and 5 mmol/L EGTA). Data from ten separate standard curves, prepared as described herein, shows a dynamic range of $10^1$ pg/mL to $10^5$ pg/mL of IL-19 (providing an sensitive and broad dynamic range in the therapeutic and diagnostic assays provided herein). Patient samples (which, according to the present invention, may include blood, serum or plasma) are diluted 1:4 in assay buffer and added to respective wells. The plate is incubated overnight at 4° C. Following incubation, wells are aspirated and washed 3 times with TBST. Thereafter, 50 µL of ruthenium-labeled IL-19 detection antibody (0.5 mg/L) is added to the wells for a 1-hour incubation at room temperature. Following incubation, wells are aspirated and washed 3 times with TBST. Thereafter, 150 µl of 2×MSD read buffer is added. Ruthenium electrochemiluminescence in the wells is detected using a MSD Sector 6000 plate reader. Data is analyzed and IL-19 MSD immunoassay calibration curve fitting is performed using MesoScale Discovery software. SAS® software version 9.4 (PROC MIXED) is used for assessing treatment effects on IL-19 levels using a mixed effects model with an unstructured covariance matrix and $\log_{10}$ transformed IL-19 concentrations (SAS. Version 9.4 for UNIX; SAS Institute Inc.: Cary, N.C., 2016). Statistical analysis is generated with the ggplot and pROC packages using R version 3.3.3 statistical computing environment (www.R-project.org, Vienna, Austria, 2017).

IL-19 Serum Concentrations in Ps0 Patients Versus Healthy Groups

A study of IL-19 levels in serum of 125 Ps0 patients, pre-treatment, were compared to IL-19 serum levels of 36 healthy volunteer samples. Using an IL-19 assay essentially as described above, with a capture antibody selected from bin 1 (specifically, exemplified IL-19 antibody M_1) and a detection antibody selected from bin 2 (specifically, exemplified IL-19 antibody M_2), serum IL-19 concentrations (pg/ml) of each patient sample is measured. The geometric mean of serum IL-19 concentrations for healthy volunteers (n=36) is measured at 11 pg/mL (with a range of 4 to 51 pg/mL, and a 95% confidence level at less than 21 pg/mL) whereas the geometric mean of serum IL-19 concentrations for Ps0 patients (pre-treatment) (n=112) is measured at 87 pg/mL. Thus, the present invention provides an IL-19 blood-based assay allowing for the diagnosis of Ps0 patients.

Ps0 Study in Anti-IL-17 Treatment Groups

A study of IL-19 levels, in serum of 125 Ps0 patients treated with a therapeutic antibody targeting IL-17, ixekizumab, is performed. The study includes five treatment group doses of: 10 mg (n=24), 25 mg (n=23), 75 mg (n=26), or 150 mg (n=28) of ixekizumab or placebo (n=24). Administration of all treatment doses is subcutaneous, and doses are administered starting at week 0 and every 2 weeks thereafter up to week 16 (inclusive). Using an IL-19 assay as described above, with a capture antibody selected from bin 1 (specifically, exemplified IL-19 antibody M_1]) and a detection antibody selected from bin 5 (specifically, exemplified IL-19 antibody M_2), serum IL-19 concentrations (pg/ml) of each patient is measured at week 0 (pre-treatment dosing), week 2 and week 12. Serum IL-19 concentration levels, percent PASI change and PASI 75 response are provided in Tables 8-10.

As shown, 36 out of 41 (87.8%) patients with a greater than or equal to 5-fold reduction in IL-19 from week 0 to week 2 achieved PASI 75 or greater by week 16 (whereas only 24 of 56 (42.9%) patients with less than a 5-fold reduction in IL19 from week 0 to week 2 achieved a PASI 75 response by week 16. Further, 37 out of 42 (88%) patients with a greater than or equal to 5-fold reduction in IL-19 from week 0 to week 9 achieved PASI 75 or greater by week 12 (whereas only 22 out of 53 (41.5%) patients with less than a 5-fold reduction in IL19 from week 0 to week 16 achieved a PASI 75 response by week 16 (data reflects a drop-out of 2 patients between weeks 2 and 12). For the placebo treatment group, no significant change in IL-19 concentrations were observed during the 16-week trial period.

TABLE 8

IL-19 serum levels (geometric mean) per treatment group.

| Treatment Group | Week 0 (baseline IL-19 pg/mL) | Week 2 (IL-19 pg/mL) | Week 16 (IL-19 pg/mL) |
|---|---|---|---|
| 150 (n = 28) | 87.1 | 13.9 | 11.9 |
| 75 (n = 26) | 86.7 | 11.6 | 9.4 |
| 25 (n = 23) | 89.0 | 22.3 | 13.6 |
| 10 (n = 24) | 111.6 | 45.3 | 57.3 |
| Placebo (n = 24) | 67.4 | 66.7 | 57.2 |

Table 8 provides data showing IL-19 measured in treatment groups over 16 weeks of treatment with placebo or various ixekizumab doses.

TABLE 9

Patients achieving at least PASI 75 at week 16 per treatment group.

| Treatment Group | Week 2 (number of patients achieving at least PASI 75) |
|---|---|
| 150 (n = 24) | 22 |
| 75 (n = 24) | 21 |
| 25 (n = 20) | 16 |
| 10 (n = 19) | 5 |
| Placebo (n = 20) | 1 |

Table 9 provides the number of patients, per treatment group, achieving PASI 75 by week 16.

TABLE 10

Assessment of serum IL-19 concentration and PASI at week 16.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| 150 (n = 25) | 92% (23/25) | 95% (19/20) | 5% (1/20) |
| 75 (n = 24) | 91.7% (22/24) | 86.4% (19/22) | 13.6% (3/22) |
| 25 (n = 20) | 70% (14/20) | 92.9% (13/14) | 7.1% (1/14) |
| 10 (n = 19) | 42.1% (8/19) | 62.5% (5/8) | 37.5% (3/8) |
| Placebo (n = 20) | 25% (5/20) | 20% (1/5) | 80% (4/5) |

Table 10 presents correlations of IL-19 serum levels and PASI in psoriasis patients after 16 weeks of placebo or various ixekizumab treatments (21 ng/L indicates the upper limit of the normal range of IL-19 in healthy subjects). It was noted that PASI 100 improvements at 16 weeks were preceded by reduction of circulating IL-19 to near normal concentrations after 2 weeks of treatment.

The data provided in Tables 8-10 demonstrate that the IL-19 assay of the present invention provides a valuable tool for diagnosis and therapeutic prognostication of Ps0 patients treated with IL-17 antibodies.

Ps0 Study in Anti-TNFα Treatment Groups

A study of IL-19 levels, in serum of 35 Ps0 patients that were complete responders when treated with the FDA approved TNFα antagonist, entanercept, is performed. Treatment groups of 50 mg of etanercept (n=35) administered biweekly or placebo are compared. Administration of both treatment groups is subcutaneous. Using an IL-19 assay as described above, with a capture antibody selected from bin 1 (specifically, exemplified IL-19 antibody M_1) and a detection antibody selected from bin 2 (specifically, exemplified IL-19 antibody M_2), serum IL-19 concentrations (pg/ml) of each patient is measured at week 0 (pre-treatment dosing), week 1, week 4 and week 12. IL-19 levels are assessed for prognostic value with PASI improvement at weeks 4 and 12. Serum IL-19 concentration levels are presented in Table 11; prognostic values at week 4 showing correlations of IL-19 serum levels and PASI in psoriasis patients (21 ng/L indicates the upper limit of the normal range of IL-19 in healthy subjects) is presented in Table 12; prognostic values at week 12 showing correlations of IL-19 serum levels and PASI in psoriasis patients (21 ng/L indicates the upper limit of the normal range of IL-19 in healthy subjects) is presented in Table 13.

TABLE 11

IL-19 (pg/mL) serum levels (geometric mean) per treatment group.

| Treatment Group | Week 0 (baseline) | Week 1 | Week 4 | Week 12 |
|---|---|---|---|---|
| Etanercept (n = 35) | 98.2 | 42.3 | 24.3 | 14.2 |

TABLE 12

Assessment of serum IL-19 concentration and PASI at week 4.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| Etanercept (n = 160) | 37.9% (44/116) | 22.7% (10/44) | 77.3% (34/44) |

TABLE 13

Assessment of serum IL-19 concentration and PASI at week 12.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| Etanercept (n = 161) | 42.9% (69/161) | 49.3% (34/69) | 50.7% (35/69) |

As shown above, on average TNF antagonist-treated patients experienced a 10 median reduction in serum IL-19 of greater than 40 (pg/mL) after 1 week and a median reduction in serum IL-19 of grater than 70 (pg/mL) at week 4. The data provided in Tables 11-13 demonstrate that the IL-19 assay of the present invention provides a valuable tool for diagnosis and therapeutic prognostication of Ps0 patients treated with TNFα antibodies.

Ps0 Study in Anti-IL-23 Treatment Groups

A study of IL-19 levels, in serum of Ps0 patients treated with a therapeutic antibody targeting IL-23, mirikizumab, is performed. Eight treatment groups of: 5 mg, 20 mg, 60 mg, 120 mg, 200 mg, 350 mg, and 600 mg of mirikizumab, or placebo, are 20 assessed. Administration of each treatment group, as a single subcutaneous dose, occurs at day 0. Using an IL-19 assay as described above, with a capture antibody selected from bin 1 (specifically, exemplified IL-19 antibody M_1) and a detection antibody selected from bin 2 (specifically, exemplified IL-19 antibody M_2), serum IL-19 concentrations (pg/ml) of each patient is measured between visits 2 and 12. IL-19 levels are also assessed for prognostic value with PASI improvement between visits 2 and 12. Serum IL-19 concentration levels are presented in Table 14; a comparative of serum levels at week 8 is presented in Table 15; and prognostic values at week 8 showing correlations of IL-19 serum levels and PASI in psoriasis patients (21 ng/L, indicates the upper limit of the normal range of IL-19 in healthy subjects) are presented in Table 16. Decreases in serum IL-19 correlated with improvement in PASI score demonstrating the IL-19 assay of the present invention provides a valuable tool for diagnosis and therapeutic prognostication of Ps0 patients treated with IL-23 antibodies.

TABLE 14

IL-19 (geometric mean) serum levels per treatment group.

| Treatment Group | Day 1 (baseline) | Day 15 | Day 29 | Day 57 | Day 71 |
|---|---|---|---|---|---|
| 5 (n = 5) | 16.2 | 13.9 | 10.4 | 13.2 | 14.5 |
| 20 (n = 5) | 37.2 | 27.2 | 25.4 | 33.5 | 28.4 |
| 60 (n = 5) | 49.8 | 9.0 | 10.8 | 11.9 | 10.9 |
| 120 (n = 5) | 52.4 | 26.6 | 25.2 | 22.2 | 18.2 |
| 200 (n = 5) | 69.6 | 36.0 | 23.3 | 21.9 | 22.5 |
| 350 (n = 5) | 58.4 | 35.2 | 22.4 | 23.7. | 18.0 |
| 600 (n = 5) | 57.3 | 30.1 | 21.8 | 14.4. | 15.8 |
| placebo (n = 7) | 58.9 | 52.2 | 47.0 | 40.4. | 47.1 |

TABLE 15

IL-19 (geometric mean) serum levels per treatment group.

| Treatment Group | Week 0 (Baseline) | Week 8 (End of induction) |
|---|---|---|
| LY 300 mg (n = 50) | 106.5 | 18.2 |
| Placebo (n = 52) | 158.0 | 154.9 |

TABLE 16

Assessment of serum IL-19 concentration and PASI at week 8.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| LY 300 mg (n = 48) | 58.3% (28/48) | 71.4% (20/28) | 28.6% (8/28) |
| Placebo (n = 51) | 13.7% (7/51) | 28.6% (2/7) | 71.4% (5/7) |

Ps0 Study in JAK1 and JAK2 Kinase Inhibitor Treatment Groups

A study of IL-19 levels, in serum of Ps0 patients treated with the therapeutic selective JAK1 and JAK2 inhibitor, baricitinib, is performed. Treatment groups of 2 mg, 4 mg, 8 mg, and 10 mg of baricitinib, or placebo, are assessed. Each treatment group is orally administered once daily. Using an IL-19 assay as described above, with a capture antibody selected from bin 1 (specifically, exemplified IL-19 antibody M_1) and a detection antibody selected from bin 2 (specifically, exemplified IL-19 antibody M_2), serum IL-19 concentrations (pg/ml) of each patient is measured at baseline and following each treatment. IL-19 levels are also assessed for prognostic value with PASI improvement. Serum IL-19 concentration levels are presented in Table 17. PASI prognostic data (at week 12) showing correlations of IL-19 serum levels and PASI in psoriasis patients (21 ng/L indicates the upper limit of the normal range of IL-19 in healthy subjects) are presented in Table 18. The data demonstrates a decreases in serum IL-19 correlates with improvement in PASI score demonstrating the IL-19 assay of the present invention provides a valuable tool for diagnosis and therapeutic prognostication of Ps0 patients treated with JAK1 and JAK2 inhibitors.

TABLE 17

IL-19 serum levels (geometric mean) per treatment group.

| Treatment Group | Week 0 (baseline) | Week 2 | Week 12 |
|---|---|---|---|
| 2 (n = 32) | 182.3 | 98.5 | 64.8 |
| 4 (n = 72) | 134.9 | 70.2 | 60.1 |
| 8 (n = 64) | 177.3 | 67.0 | 47.5 |
| 10 (n = 69) | 110.1 | 39.7 | 25.7 |
| placebo (n = 34) | 116.9 | 131.8 | 95.3 |

TABLE 18

Assessment of serum IL-19 concentration and PASI at week 12.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| 2 (n = 29) | 13.8% (4/29) | 50% (2/4) | 50% (2/4) |
| 4 (n = 66) | 31.8% (21/66) | 47.6% (10/21) | 52.4% (11/21) |
| 8 (n = 54) | 38.9% (21/54) | 85.7% (18/21) | 14.3% (3/21) |
| 10 (n = 58) | 46.6% (27/58) | 77.8% (21/27) | 22.2% (6/27) |
| Placebo (n = 27) | 14.8% (4/27) | 100% (4/4) | 0% (0/4) |

AD Study in JAK1 and JAK2 Kinase Inhibitor Treatment Groups

A study of IL-19 levels, in serum of 123 patients with moderate-to-sever atopic 10 dermatitis treated with the therapeutic selective JAK1 and JAK2 inhibitor, baricitinib, is performed. Treatment groups of 2 mg and 4 mg of baricitinib, or placebo, are compared. Each treatment group is orally administered once daily. Using an IL-19 assay as described above, with a capture antibody selected from bin 1 (specifically, exemplified IL-19 antibody M_1) and a detection antibody selected from bin 2 (specifically, exemplified IL-19 antibody M_2), serum IL-19 concentrations (pg/ml) of each patient is measured at baseline (pre-treatment) and at weeks 4 and 16. IL-19 levels are assessed for prognostic value with EASI score improvement. Serum IL-19 concentration levels are presented in Table 19; EASI prognostic values (at week 16) showing correlations of IL-19 serum levels in AD patients (21 ng/L indicates the upper limit of the normal range of IL-19 in healthy subjects) are presented in Table 20. The data demonstrates baseline IL-19 concentrations in AD patients were found to be elevated compared to normal (geometric mean of 34 pg/mL in AD patients). The data also demonstrates a decreases in serum IL-19 at weeks 4 and 16 correlates with improvement in EASI score at week 16 demonstrating the IL-19 assay of the present invention provides a valuable tool for diagnosis and therapeutic prognostication of Ps0 patients treated with JAK1 and JAK2 inhibitors.

TABLE 19

IL-19 (geometric mean) serum levels per treatment group.

| Treatment Group | Week 0 (baseline) | Week 4 | Week 16 |
|---|---|---|---|
| 2 (n = 37) | 27.8 | 18.8 | 25.1 |
| 4 (n = 38) | 30.3 | 18.0 | 21.1 |
| placebo (n = 49) | 44.4 | 27.5 | 23.6 |

TABLE 20

Assessment of serum IL-19 concentration and EASI at week 16.

| Treatment Group | % of patients with serum IL-19 concentration ≤ 21 pg/mL | % patients with serum IL-19 concentration ≤ 21 pg/mL achieving at least EASI 75 | % patients with serum IL-19 concentration ≤ 21 pg/mL not achieving at least EASI 75 |
|---|---|---|---|
| 2 (n = 27) | 51.9% (14/27) | 64.3% (9/14) | 35.7% (5/14) |
| 4 (n = 27) | 63.0% (17/27) | 58.8% (10/17) | 41.2% (7/17) |
| Placebo (n = 28) | 50% (14/28) | 64.3% (9/14) | 35.7% (5/14) |

IL-19 Serum Concentrations in Renal Failure and Diabetes Patient Groups

IL-19 levels are measured in healthy donors (n=20), renal failure patients (n=16), diabetes patients without renal failure (n=20), and diabetes patients with renal failure (n=21). Using an IL-19 assay as described above, with a capture antibody selected from bin 1 (specifically, exemplified IL-19 antibody M_1) and a detection antibody selected from bin 2 (specifically, exemplified IL-19 antibody M_2), baseline serum IL-19 concentrations (pg/ml) of each patient is measured. The data demonstrates markedly elevated IL-19 levels in renal failure patients (40±6 pg/mL), diabetes patients without renal failure (17±3 pg/mL), and diabetes patients with renal failure (46±9 pg/mL) as compared to healthy donors (8±1 pg/mL) IL-19 levels. Thus, the IL-19 assay of the present invention provides a valuable tool for diagnosis and therapeutic prognostication of diabetes and renal failure patients.

PsA Study in Anti-IL-17 Treatment Groups

A study of IL-19 levels, in serum of 309 PsA patients treated with a therapeutic antibody targeting IL-17, ixekizumab, is performed. The study includes three treatment groups: (i.) anti-IL-17 treatment group, administered ixekizumab 160 mg at baseline followed by an 80 mg dose administered every two weeks thereafter for 12 weeks (n=103); (ii.) anti-IL-17 treatment group, administered ixekizumab 160 mg at baseline followed by an 80 mg dose administered every four weeks thereafter for 12 weeks (n=107); or (iii.) placebo (n=105). Administration of all treatment doses is subcutaneous. Using an IL-19 assay as described above, with a capture antibody selected from bin 1 (specifically, exemplified IL-19 antibody M_1) and a detection antibody selected from bin 2 (specifically, exemplified IL-19 antibody M_2), serum IL-19 concentrations (pg/ml) of each patient is measured at week 0 (pre-treatment dosing), week 4 and week 12. Serum IL-19 concentration levels are presented in Table 21; week 4 and 12 PASI prognostic values showing correlations of IL-19 serum levels and PASI in patients (21 ng/L, indicates the upper limit of the normal range of IL-19 in healthy subjects) are presented in Tables 22 and 23, respectively.

TABLE 21

IL-19 (geometric mean) serum levels per treatment group.

| Treatment Group | Week 0 (baseline) | Week 4 | Week 12 |
|---|---|---|---|
| Ixe Q2W (n = 103) | 23.0 | 6.0 | 6.1 |
| Ixe Q4W (n = 107) | 31.3 | 7.6 | 7.3 |
| placebo (n = 105) | 23.7 | 27.0 | 28.4 |

TABLE 22

Assessment of serum IL-19 concentration at week 4 and PASI at week 12.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| Ixe Q2W (n = 81) | 97.5% (79/81) | 72.2% (57/79) | 27.8% (22/79) |
| Ixe Q4W (n = 87) | 90.8% (79/87) | 73.4% (58/79) | 26.6% (21/79) |
| Placebo (n = 84) | 46.4% (39/84) | 20.5% (8/39) | 79.5% (31/39) |

TABLE 23

Assessment of serum IL-19 concentration at week 12 and PASI at week 12.

| Treatment Group | % of patients with serum IL-19 concentration ≤ 21 pg/mL | % patients with serum IL-19 concentration ≤ 21 pg/mL achieving at least PASI 75 | % patients with serum IL-19 concentration ≤ 21 pg/mL not achieving at least PASI 75 |
|---|---|---|---|
| Ixe Q2W (n = 90) | 96.7% (87/90) | 73.1% (57/78) | 26.9% (21/78) |
| Ixe Q4W (n = 93) | 93.5% (87/93) | 74.1% (60/81) | 25.9% (21/81) |
| Placebo (n = 86) | 43.0% (37/86) | 24.3% (9/37) | 75.7% (28/37) |

Table 21 shows baseline IL-19 levels in psoriatic arthritis patients are increased compared to the reference value of healthy volunteers (represented by the shaded grey region). Placebo treatment does not result in significant change in IL-19 over the 12-week time study. However, both ixekizumab treatment groups show lowering of IL-19 to near normal levels after 4 weeks; lowering which is sustained over the 12 week treatment. Tables 22 and 23 show the relationship between IL-19 levels in PsA patients after either 4 or 12 weeks of placebo or ixekizumab treatment groups and the PASI score at 12 weeks. PASI 100 improvements at 12 weeks were correlated with a reduction of circulating IL-19 concentrations to near normal levels, with the majority of the poor PASI responders being in the placebo group. The data provided in Tables 21-23 demonstrate that the IL-19 assay of the present invention provides a valuable tool for diagnosis and therapeutic prognostication of PsA patients treated with IL-17 antibodies.

Sequence Listing

SEQ ID NO: 1 (human IL-19)
MKLQCVSLWLLGTILILCSVDNHGLRRCLISTDMHHIEESFQEIKRAIQAKDTFPN
VTILSTLETLQIIKPLDVCCVTKNLLAFYVDRVFKDHQEPNPKILRKISSIANSFLY
MQKTLRQCQEQRQCHCRQEATNATRVIHDNYDQLEVHAAAIKSLGELDVFLAW
INKNHEVMFSA SEQ ID NO: 2 (LC of murine derived IL-19 Ab 1 ("M_1"))
DIVMTQSPSSLAMSVGQKVTMSCKSSQSLLSSYNQKNYLAWYQQKPGQSPKLLV
YFASTRPPGVPDRFIGSGSGSDFTLTISSVQAEDLADYFCQQHERLPITFGAGTKLE
LKRADAAPTVSIFPPSSEQLTSGGASVVCFLNNFYPKDINVKWKIDGSERQNGVL
NSWTDQDSKDSTYSMSSTLTLTKDEYERHNSYTCEATHKTSTSPIVKSFNRNEC SEQ ID NO: 3 (LCDR1 of murine derived IL-19 Ab 1)
KSSQSLLSSYNQKNYLA SEQ ID NO: 4 (LCDR2 of murine derived IL-19 Ab 1)
FASTRPP SEQ ID NO: 5 (LCDR3 of murine derived IL-19 Ab 1)
QQHERLPIT SEQ ID NO: 6 (HC of murine derived IL-19 Ab 1 ("M_1"))
EVQLQQSGPVLVKPGASVKMSCKASGYKFTDYFVGWVKQSHGKSLEWIGYVDP
ENGYTRCNQKFKGKATLTVDKSSSTAYMELNSLTSEDSAVYYCARYDYDWAWF
TNWGQGTLVTVSAAKTTPPSVYPLAPGSAAQTNSMVTLGCLVKGYFPEPVTVT
WNSGSLSSGVHTFPAVLQSDLYTLSSSVTVPSSTWPSETVTCNVAHPASSTKVDK
KIVPRDCGCKPCICTVPEVSSVFIFPPKPKDVLTITLTPKVTCVVVDISKDDPEVQF
SWFVDDVEVHTAQTQPREEQFNSTFRSVSELPIMHQDWLNGKEFKCRVNSAAFP
APIEKTISKTKGRPKAPQVYTIPPPKEQMAKDKVSLTCMITDFFPEDITVEWQWNG
QPAENYKNTQPIMDTDGSYFVYSKLNVQKSNWEAGNTFTCSVLHEGLHNHHTE
KSLSHSPGK SEQ ID NO: 7 (HCDR1 of murine derived IL-19 Ab 1)
GYKFTDYFVG SEQ ID NO: 8 (HCDR2 of murine derived IL-19 Ab 1)
YVDPENGYTRCNQKFKG SEQ ID NO: 9 (HCDR3 of murine derived IL-19 Ab 1)
YDYDWAWFTN SEQ ID NO: 10 (LC of murine derived IL-19 Ab 2 ("M_2"))
DIVLTQSPESLAVSLGQRATISCRASESVDNYGISFIHWYQQKPGQPPKLLIYRASN
LKSGIPARFSGRGSRTDFTLTINPVETDDVATYYCQQINKDPLTFGAGTKLELKRA
DAAPTVSIFPPSSEQLTSGGASVVCFLNNFYPKDINVKWKIDGSERQNGVLNSWT
DQDSKDSTYSMSSTLTLTKDEYERHNSYTCEATHKTSTSPIVKSFNRNEC SEQ ID NO: 11 (LCDR1 of murine derived IL-19 Ab 2)
RASESVDNYGISFIH SEQ ID NO: 12 (LCDR2 of murine derived IL-19 Ab 2)
RASNLKS SEQ ID NO: 13 (LCDR3 of murine derived IL-19 Ab 2)
QQINKDPLT SEQ ID NO: 14 (HC of murine derived IL-19 Ab 2 ("M_2"))
LVQLQQSDAELVKPGASLKISCKVSGYTFTDHALHWMKQRPEQGLEWIGYIYPR
DGSTKYNEKFKGKATLTADRSSSTAYMELNSLTSEDSAVYFCARGWDFAMDYW
GQGTSVTVSSAKTTPPSVYPLAPGSAAQTNSMVTLGCLVKGYFPEPVTVTWNSG
SLSSGVHTFPAVLQSDLYTLSSSVTVPSSTWPSETVTCNVAHPASSTKVDKKIVPR
DCGCKPCICTVPEVSSVFIFPPKPKDVLTITLTPKVTCVVVDISKDDPEVQFSWFVD
DVEVHTAQTQPREEQFNSTFRSVSELPIMHQDWLNGKEFKCRVNSAAFPAPIEKT
ISKTKGRPKAPQVYTIPPPKEQMAKDKVSLTCMITDFFPEDITVEWQWNGQPAEN
YKNTQPIMDTDGSYFVYSKLNVQKSNWEAGNTFTCSVLHEGLHNHHTEKSLSHS
PGK SEQ ID NO: 15 (HCDR1 of murine derived IL-19 Ab 2)
GYTFTDHALH SEQ ID NO: 16 (HCDR2 of murine derived IL-19 Ab 2)
YIYPRDGSTKYNEKFKG SEQ ID NO: 17 (HCDR3 of murine derived IL-19 Ab 2)
GWDFAMDY SEQ ID NO: 18 (LC of murine derived IL-19 Ab 3 ("M_3"))
DIKMTQSPSSMYASLGERVTITCKASQDINSYLSWFQQKPGKSPKTLIYRANRLV
DGVPSRFSGSGSGQDYSLTISSLEYEDMGIYFCLQYDDFPYTFGGGTKLEIKRADA APTVSIFPPSSEQLTSGGASVVCFLNNFYPKDINVKWKIDGSERQNGVLNSWTDQ
DSKDSTYSMSSTLTLTKDEYERHNSYTCEATHKTSTSPIVKSFNRNEC SEQ ID NO: 19 (LCDR1 of murine derived IL-19 Ab 3)
KASQDINSYLS SEQ ID NO: 20 (LCDR2 of murine derived IL-19 Ab 3)
RANRLVD SEQ ID NO: 21 (LCDR3 of murine derived IL-19 Ab 3)
LQYDDFPYT SEQ ID NO: 22 (HC of murine derived IL-19 Ab 3 ("M_3"))
QIQLVQSGPELKKPGETVKISCKASGYTFTTYGMSWVKQAPGKGLKWMVWINT
YSGVPTYVDDFKGRFAFSLETSASTAYLQINNLKNEDTATYFCARRDEGFAYWG
QGTLVTVSAAKTTPPSVYPLAPGSAAQTNSMVTLGCLVKGYFPEPVTVTWNSGS
LSSGVHTFPAVLQSDLYTLSSSVTVPSSTWPSETVTCNVAHPASSTKVDKKIVPRD
CGCKPCICTVPEVSSVFIFPPKPKDVLTITLTPKVTCVVVDISKDDPEVQFSWFVDD
VEVHTAQTQPREEQFNSTFRSVSELPIMHQDWLNGKEFKCRVNSAAFPAPIEKTIS
KTKGRPKAPQVYTIPPPKEQMAKDKVSLTCMITDFFPEDITVEWQWNGQPAENY
KNTQPIMDTDGSYFVYSKLNVQKSNWEAGNTFTCSVLHEGLHNHHTEKSLSHSP
GK SEQ ID NO: 23 (HCDR1 of murine derived IL-19 Ab 3)
GYTFTTYGMS SEQ ID NO: 24 (HCDR2 of murine derived IL-19 Ab 3)
WINTYSGVPTYVDDFKG SEQ ID NO: 25 (HCDR3 of murine derived IL-19 Ab 3)
RDEGFAY SEQ ID NO: 26 (LC of murine derived IL-19 Ab 4 ("M_4"))
DIVMTQSPSSLAMSVGQKVTMSCKSSQSLLSSYNQKNYLAWYQQKPGQSPKLLV
YFASTRESGVPDRFIGSGSGSDFTLTISSVQAEDLADYFCQQHYSTPLTFGAGTKL
ELKRADAAPTVSIFPPSSEQLTSGGASVVCFLNNFYPKDINVKWKIDGSERQNGV
LNSWTDQDSKDSTYSMSSTLTLTKDEYERHNSYTCEATHKTSTSPIVKSFNRNEC SEQ ID NO: 27 (LCDR1 of murine derived IL-19 Ab 4)
KSSQSLLSSYNQKNYLA SEQ ID NO: 28 (LCDR2 of murine derived IL-19 Ab 4)
FASTRES SEQ ID NO: 29 (LCDR3 of murine derived IL-19 Ab 4)
QQHYSTPLT SEQ ID NO: 30 (HC of murine derived IL-19 Ab 4 ("M_4"))
EVQLQQSGPVLVKPGASVKMSCKASGYTFTDYYMNWVKQSHGKSLEWIGFINP
YNDDTRCNQKFKGKATLTVDKSSSTAYMELNSLTSEDSAVYYCARYDGYWAW
FAYWGQGTLVTVSAAKTTPPSVYPLAPGSAAQTNSMVTLGCLVKGYFPEPVTVT
WNSGSLSSGVHTFPAVLQSDLYTLSSSVTVPSSTWPSETVTCNVAHPASSTKVDK
KIVPRDCGCKPCICTVPEVSSVFIFPPKPKDVLTITLTPKVTCVVVDISKDDPEVQF
SWFVDDVEVHTAQTQPREEQFNSTFRSVSELPIMHQDWLNGKEFKCRVNSAAFP
APIEKTISKTKGRPKAPQVYTIPPPKEQMAKDKVSLTCMITDFFPEDITVEWQWNG
QPAENYKNTQPIMDTDGSYFVYSKLNVQKSNWEAGNTFTCSVLHEGLHNHHTE
KSLSHSPGK SEQ ID NO: 31 (HCDR1 of murine derived IL-19 Ab 4)
GYTFTDYYMN SEQ ID NO: 32 (HCDR2 of murine derived IL-19 Ab 4)
FINPYNDDTRCNQKFKG SEQ ID NO: 33 (HCDR3 of murine derived IL-19 Ab 4)
YDGYWAWFAY SEQ ID NO: 34 (LCVR of rabbit derived IL-19 Ab 1 ("R_1"))
AIDMTQTPASVSEPVGGTVTIKCQASQSISSYLAWYQQKPGQPPKLLIYSASTLAS
GVPSRFRGSGSGREFTLTISDLECADAATYYCQCHYHGSSYWDNSFGGGTEVVV
K SEQ ID NO: 35 (LCDR1 of rabbit derived IL-19 Ab 1)
QASQSISSYLA SEQ ID NO: 36 (LCDR2 of rabbit derived IL-19 Ab 1)
SASTLAS SEQ ID NO: 37 (LCDR3 of rabbit derived IL-19 Ab 1)
QCHYHGSSYWDNS SEQ ID NO: 38 (HCVR of rabbit derived IL-19 Ab 1 ("R_1"))
QQLEESGGGLVQPEGSLTLTCTASGFSFSSSYWICWVRQAPGKGLEWLACIDTGV
SGDTYYANWAEGRFTISKTSSTTVTLQMTSLTAADTATYFCARDIFGSAIDNSLW
GPGTLVTVSS SEQ ID NO: 39 (HCDR1 of rabbit derived IL-19 Ab 1)
GFSFSSSYWIC SEQ ID NO: 40 (HCDR2 of rabbit derived IL-19 Ab 1)
CIDTGVSGDTYYANWAEG SEQ ID NO: 41 (HCDR3 of rabbit derived IL-19 Ab 1)
DIFGSAIDNSL SEQ ID NO: 42 (LCVR of rabbit derived IL-19 Ab 2 ("R_2"))
ADVVMTQTPASVEAAVGGTVTIKCQASESIGNALAWYQQKPGQPPKLLIYDASK
LASGVPSRFKGSGSGTQFTLTISDLECADAATYYCQCHYHGSSYWDNSFGGGTE
VVVK SEQ ID NO: 43 (LCDR1 of rabbit derived IL-19 Ab 2)
QASESIGNALA SEQ ID NO: 44 (LCDR2 of rabbit derived IL-19 Ab 2)
DASKLAS SEQ ID NO: 45 (LCDR3 of rabbit derived IL-19 Ab 2)
QCHYHGSSYWDNS SEQ ID NO: 46 (HCVR of rabbit derived IL-19 Ab 2 ("R_2"))
QQLEESGGGLVQPEGSLTLTCTASGFSFSSSYWICWVRQAPGKGLEWLACIDTGV
SGDTYYANWAKGRFTISKTSSTTVTIQMTSLTAADTATYFCARDIFGSAIDNSLW
GPGTLVTVSS SEQ ID NO: 47 (HCDR1 of rabbit derived IL-19 Ab 2)
GFSFSSSYWIC SEQ ID NO: 48 (HCDR2 of rabbit derived IL-19 Ab 2)
CIDTGVSGDTYYANWAKG SEQ ID NO: 49 (HCDR3 of rabbit derived IL-19 Ab 2)
DIFGSAIDNSL SEQ ID NO: 50 (LCVR of rabbit derived IL-19 Ab 4 ("R_3"))
ADVVMTQTPSSVEAAVGGTVTIKCQASQSIGSSIAWYQQKPGQRPKLLIYGASTL
ASGVPSRFKGSGSGTEFTLTISDLECADAATYYCQCHYHGSSYWDNSFGGGTEV
VVK SEQ ID NO: 51 (LCDR1 of rabbit derived IL-19 Ab 3)
QASQSIGSSLA SEQ ID NO: 52 (LCDR2 of rabbit derived IL-19 Ab 3)
GASTLAS SEQ ID NO: 53 (LCDR3 of rabbit derived IL-19 Ab 3)
QCHYHGSSYWDNS SEQ ID NO: 54 (HCVR of rabbit derived IL-19 Ab 4 ("R_3"))
QCQSLEESGGGLVEPEGSLTLTCKASGFSFSSSYWICWVRQAPGKGLEWIACTDT
FSGDTYYASWAKGRFTISKTSSTTVTLRMTSLTDADTATYFCARDIFGTAVHISL
WGPGTLVTVSS SEQ ID NO: 55 (HCDR1 of rabbit derived IL-19 Ab 3)
GFSFSSSYWIC SEQ ID NO: 56 (HCDR2 of rabbit derived IL-19 Ab 3)
CTDTFSGDTYYASWAKG SEQ ID NO: 57 (HCDR3 of rabbit derived IL-19 Ab 3)
DIFGTAVHISL -continued

| Sequence Listing |
|---|

SEQ ID NO: 58 (LCVR of rabbit derived IL-19 Ab 5 ("R_4"))
ADVVMTQTPSSVSEPVGGTVTIKCQASQSIYSYLSWYQQKPGQPPKLLIYEASKL
ASGVPSRFKGSGSGTQFTLTISGVECADAATYYCQQGYSSSNVDNTFGGGTEVV
VT SEQ ID NO: 59 (LCDR1 of rabbit derived IL-19 Ab 4)
QASQSIYSYLS SEQ ID NO: 60 (LCDR2 of rabbit derived IL-19 Ab 4)
EASKLAS SEQ ID NO: 61 (LCDR3 of rabbit derived IL-19 Ab 4)
QQGYSSSNVDNT SEQ ID NO: 62 (HCVR of rabbit derived IL-19 Ab 5 ("R_4"))
QCQSVEESGGRLVTPGTPLTLTCTVSGIDLSIYAMGWVRQAPGKGLEYIGIIDTTG
TAYYARWAKGRFTISKTSATVALKITSPTTEDTATYFCARDSGSLYYGSYALWGP
GTLVTVSS SEQ ID NO: 63 (HCDR1 of rabbit derived IL-19 Ab 4)
GIDLSIYAMG SEQ ID NO: 64 (HCDR2 of rabbit derived IL-19 Ab 4)
IIDTTGTAYYARWAKG SEQ ID NO: 65 (HCDR3 of rabbit derived IL-19 Ab 4)
DSGSLYYGSYAL SEQ ID NO: 66 (LCVR of phage derived IL-19 Ab 1 ("P_1"))
EIVMTQSPGTLSLSPGERATLSCRASQSISSGYLAWYQQKPGQAPRLLIYGASSRA
TGIPDRFSGSGSGTDFTLTISRLEPEDFATYYCLQFKSFPLTFGQGTKLEIKR SEQ ID NO: 67 (LCDR1 of phage derived IL-19 Ab 1)
RASQSISSGYLA SEQ ID NO: 68 (LCDR2 of phage derived IL-19 Ab 1)
GASSRAT SEQ ID NO: 69 (LCDR3 of phage derived IL-19 Ab 1)
LQFKSFPLT SEQ ID NO: 70 (HCVR of phage derived IL-19 Ab 1 ("P_1"))
QVQLVQSGAEVKKPGSSVKVSCKASGGTFSSYAISWVRQAPGQGLEWMGGIIPIF
GTANYAQKFQGRVTITADESTSTAYMELSSLRSEDTAVYYCARDGGDYGDMGY
WGQGTLVTVSS SEQ ID NO: 71 (HCDR1 of phage derived IL-19 Ab 1)
GGTFSSYAIS SEQ ID NO: 72 (HCDR2 of phage derived IL-19 Ab 1)
GIIPIFGTANYAQKFQG SEQ ID NO: 73 (HCDR3 of phage derived IL-19 Ab 1)
DGGDYGDMGY SEQ ID NO: 74 (LCVR of phage derived IL-19 Ab 2 ("P_2"))
EIVMTQSPDSLAVSLGERATINCKSSQSVLYRSNSKSYLAWYQQKPGQPPKLLIY
WASTRESGVPDRFSGSGSGTDFTLTISSLQAEDVAVYYCQQYYSTPGSFGPGTKV
EIKR SEQ ID NO: 75 (LCDR1 of phage derived IL-19 Ab 2)
KSSQSVLYRSNSKSYLA SEQ ID NO: 76 (LCDR2 of phage derived IL-19 Ab 2)
WASTRES SEQ ID NO: 77 (LCDR3 of phage derived IL-19 Ab 2)
QQYYSTPGS SEQ ID NO: 78 (HCVR of phage derived IL-19 Ab 2 ("P_2"))
EVQLLESGGGLVQPGGSLRLSCAASGFTFSSYAMSWVRQAPGKGLEWVSAISQS
GGSTYYADSVKGRFTISRDNSKNTLYLQMNSLRAEDTAVYYCARHPERGSRRGP
YYYYMDVWGKGTTVTVSS SEQ ID NO: 79 (HCDR1 of phage derived IL-19 Ab 2)
GFTFSSYAMS

Sequence Listing

SEQ ID NO: 80 (HCDR2 of phage derived IL-19 Ab 2)
AISQSGGSTYYADSVKG

SEQ ID NO: 81 (HCDR3 of phage derived IL-19 Ab 2)
HPERGSRRGPYYYYMDV

SEQ ID NO: 82 (LCVR of phage derived IL-19 Ab 3 ("P_3"))
DIQLTQSPSSLSASLGDRVTITCRASQGISSWLAWYQQKPGKAPKLLIYAASTLQS
GVPSRFSGSGSGTDFTLTISSLQPEDVATYYCQQYYDYSPWAFGQGTKLEIKR SEQ ID NO: 83 (LCDR1 of phage derived IL-19 Ab 3)
RASQGISSWLA SEQ ID NO: 84 (LCDR2 of phage derived IL-19 Ab 3)
AASTLQS SEQ ID NO: 85 (LCDR3 of phage derived IL-19 Ab 3)
QQYYDYSPWA SEQ ID NO: 86 (HCVR of phage derived IL-19 Ab 3 ("P_3"))
EVQLLESGGGLVQPGGSLRLSCAASGFTFSSYAMSWVRQAPGKGLEWVSAISGS
GGSTYYADSVKGRFTISRDNSKNTLYLQMNSLRAEDTAVYYCARGLSLLYYDLS
ENYFDYWGQGTTVTVSS SEQ ID NO: 87 (HCDR1 of phage derived IL-19 Ab 3)
GFTFSSYAMS SEQ ID NO: 88 (HCDR2 of phage derived IL-19 Ab 3)
AISGSGGSTYYADSVKG SEQ ID NO: 89 (HCDR3 of phage derived IL-19 Ab 3)
GLSLLYYDLSENYFDY SEQ ID NO: 90 (LCDR1 of rabbit derived IL-19 Ab 5)
QASQSIYSYLS SEQ ID NO: 91 (LCDR2 of rabbit derived IL-19 Ab 5)
EASKLAS SEQ ID NO: 92 (LCDR3 of rabbit derived IL-19 Ab 5)
QQGYSSSNVDNT SEQ ID NO: 93 (HCDR1 of rabbit derived IL-19 Ab 5)
GIDLSIYAMG SEQ ID NO: 94 (HCDR2 of rabbit derived IL-19 Ab 5)
IIDTTGTAYYARWAKG SEQ ID NO: 95 (HCDR3 of rabbit derived IL-19 Ab 5)
DSGSLYYGSYAL SEQ ID NO: 96 (LCDR1 of rabbit derived IL-19 Ab 6)
QASESIYSSLA SEQ ID NO: 97 (LCDR2 of rabbit derived IL-19 Ab 6)
GASTLAS SEQ ID NO: 98 (LCDR3 of rabbit derived IL-19 Ab 6)
QCHYGSSYWDNS SEQ ID NO: 99 (HCDR1 of rabbit derived IL-19 Ab 6)
GFSFSSSYWIC SEQ ID NO: 100 (HCDR2 of rabbit derived IL-19 Ab 6)
CTDTFSGDTYYASWAKG SEQ ID NO: 101 (HCDR3 of rabbit derived IL-19 Ab 6)
DIFGTAVHISL SEQ ID NO: 102 (LCDR1 of rabbit derived IL-19 Ab 7)
QASESIYSSLA SEQ ID NO: 103 (LCDR2 of rabbit derived IL-19 Ab 7)
GASTLAS SEQ ID NO: 104 (LCDR3 of rabbit derived IL-19 Ab 7)
QCHYGSSYWDNS -continued

| Sequence Listing |
|---|

SEQ ID NO: 105 (HCDR1 of rabbit derived IL-19 Ab 7)
GFSFSSSYWIC

SEQ ID NO: 106 (HCDR2 of rabbit derived IL-19 Ab 7)
CTDTFSGDTYYASWAKG

SEQ ID NO: 107 (HCDR3 of rabbit derived IL-19 Ab 7)
DIFGTAVHISL

SEQ ID NO: 108 (LCDR1 of rabbit derived IL-19 Ab 8)
QASQSIGSSLA

SEQ ID NO: 109 (LCDR2 of rabbit derived IL-19 Ab 8)
GASTLAS

SEQ ID NO: 110 (LCDR3 of rabbit derived IL-19 Ab 8)
QCHYGSSYWDNS

SEQ ID NO: 111 (HCDR1 of rabbit derived IL-19 Ab 8)
GFSFSSSYWIC

SEQ ID NO: 112 (HCDR2 of rabbit derived IL-19 Ab 8)
CTDTFSGDTYYASWAKG

SEQ ID NO: 113 (HCDR3 of rabbit derived IL-19 Ab 8)
DIFGTAVHISL

SEQ ID NO: 114 (LCDR1 of rabbit derived IL-19 Ab 9)
QASESIYSSLA

SEQ ID NO: 115 (LCDR2 of rabbit derived IL-19 Ab 9)
GASTLAS

SEQ ID NO: 116 (LCDR3 of rabbit derived IL-19 Ab 9)
QCHYGSSYWDNS

SEQ ID NO: 117 (HCDR1 of rabbit derived IL-19 Ab 9)
GFSFSSSYWIC

SEQ ID NO: 118 (HCDR2 of rabbit derived IL-19 Ab 9)
CTDTFSGDTYYASWAKG

SEQ ID NO: 119 (HCDR3 of rabbit derived IL-19 Ab 9)
DIFGTAVHISL

SEQ ID NO: 120 (LCDR1 of rabbit derived IL-19 Ab 10)
QASQSISSYLA

SEQ ID NO: 121 (LCDR2 of rabbit derived IL-19 Ab 10)
GASTLAS

SEQ ID NO: 122 (LCDR3 of rabbit derived IL-19 Ab 10)
QCHYGSSYWDNS

SEQ ID NO: 123 (HCDR1 of rabbit derived IL-19 Ab 10)
GFSFSSSYWIC

SEQ ID NO: 124 (HCDR2 of rabbit derived IL-19 Ab 10)
CTDTFSGDTYYASWAKG

SEQ ID NO: 125 (HCDR3 of rabbit derived IL-19 Ab 10)
DIFGTAVHISL

SEQ ID NO: 126 (LCDR1 of rabbit derived IL-19 Ab 11)
QASQSISSYLA

SEQ ID NO: 127 (LCDR2 of rabbit derived IL-19 Ab 11)
GASTLAS

SEQ ID NO: 128 (LCDR3 of rabbit derived IL-19 Ab 11)
QSAVYSSSSGYGVP

SEQ ID NO: 129 (HCDR1 of rabbit derived IL-19 Ab 11)
GFSLSSYDMS

-continued

Sequence Listing

SEQ ID NO: 130 (HCDR2 of rabbit derived IL-19 Ab 11)
IIDSIGSIWYANWAKG

SEQ ID NO: 131 (HCDR3 of rabbit derived IL-19 Ab 11)
ESGPINTDYDL

SEQ ID NO: 132 (LCDR1 of rabbit derived IL-19 Ab 12)
QTSESFYSNNILS

SEQ ID NO: 133 (LCDR2 of rabbit derived IL-19 Ab 12)
EASKLAS

SEQ ID NO: 134 (LCDR3 of rabbit derived IL-19 Ab 12)
QSAIYDGSYIVT

SEQ ID NO: 135 (HCDR1 of rabbit derived IL-19 Ab 12)
GFSLSSYDMS

SEQ ID NO: 136 (HCDR2 of rabbit derived IL-19 Ab 12)
IIDSIGSIWYANWAKG

SEQ ID NO: 137 (HCDR3 of rabbit derived IL-19 Ab 12)
ESGPINTDYDL

SEQ ID NO: 138 (LCDR1 of rabbit derived IL-19 Ab 13)
QASQSISSYLA

SEQ ID NO: 139 (LCDR2 of rabbit derived IL-19 Ab 13)
GASTLAS

SEQ ID NO: 140 (LCDR3 of rabbit derived IL-19 Ab 13)
QSAVYSSSSGYGVP

SEQ ID NO: 141 (HCDR1 of rabbit derived IL-19 Ab 13)
GFSLSSYDMS

SEQ ID NO: 142 (HCDR2 of rabbit derived IL-19 Ab 13)
IIDSIGSIWYANWAKG

SEQ ID NO: 143 (HCDR3 of rabbit derived IL-19 Ab 13)
ESGPINTDYDL

SEQ ID NO: 144 (LCDR1 of rabbit derived IL-19 Ab 14)
QASQSISSYLA

SEQ ID NO: 145 (LCDR2 of rabbit derived IL-19 Ab 14)
GASTLAS

SEQ ID NO: 146 (LCDR3 of rabbit derived IL-19 Ab 14)
QSAVYSSSSGYGVP

SEQ ID NO: 147 (HCDR1 of rabbit derived IL-19 Ab 14)
GFSLSSYDMS

SEQ ID NO: 148 (HCDR2 of rabbit derived IL-19 Ab 14)
IIDSIGSIWYANWAKG

SEQ ID NO: 149 (HCDR3 of rabbit derived IL-19 Ab 14)
ESGPINTDYDL

SEQ ID NO: 150 (LCDR1 of rabbit derived IL-19 Ab 15)
QASESISSYLA

SEQ ID NO: 151 (LCDR2 of rabbit derived IL-19 Ab 15)
GASTLAS

SEQ ID NO: 152 (LCDR3 of rabbit derived IL-19 Ab 15)
QGYFGDYIYG

SEQ ID NO: 153 (HCDR1 of rabbit derived IL-19 Ab 15)
GFSLTSYAMS

SEQ ID NO: 154 (HCDR2 of rabbit derived IL-19 Ab 15)
IIGSPGTTGYATWAKG

-continued

Sequence Listing

SEQ ID NO: 155 (HCDR3 of rabbit derived IL-19 Ab 15)
GWFYYGMAL

SEQ ID NO: 156 (LCDR1 of rabbit derived IL-19 Ab 16)
PXQEHLTP

SEQ ID NO: 157 (LCDR2 of rabbit derived IL-19 Ab 16)
GASTLAX

SEQ ID NO: 158 (LCDR3 of rabbit derived IL-19 Ab 16)
QGYFGDYIYG

SEQ ID NO: 159 (HCDR1 of rabbit derived IL-19 Ab 16)
GFSLTSYAMS

SEQ ID NO: 160 (HCDR2 of rabbit derived IL-19 Ab 16)
IIGSPGTTGYATWAKG

SEQ ID NO: 161 (HCDR3 of rabbit derived IL-19 Ab 16)
GWFYYGMAL

SEQ ID NO: 162 (LCDR1 of rabbit derived IL-19 Ab 17)
QASESISSYLA

SEQ ID NO: 163 (LCDR2 of rabbit derived IL-19 Ab 17)
GASTLAS

SEQ ID NO: 164 (LCDR3 of rabbit derived IL-19 Ab 17)
QGYFGDYIYG

SEQ ID NO: 165 (HCDR1 of rabbit derived IL-19 Ab 17)
GFSLTSYAMS

SEQ ID NO: 166 (HCDR2 of rabbit derived IL-19 Ab 17)
IIGSPGTTGYATWAKG

SEQ ID NO: 167 (HCDR3 of rabbit derived IL-19 Ab 17)
GWFYYGMAL

SEQ ID NO: 168 (LCDR1 of rabbit derived IL-19 Ab 18)
QASESISSYLA

SEQ ID NO: 169 (LCDR2 of rabbit derived IL-19 Ab 18)
GASTLAS

SEQ ID NO: 170 (LCDR3 of rabbit derived IL-19 Ab 18)
QGYFGDYIYG

SEQ ID NO: 171 (HCDR1 of rabbit derived IL-19 Ab 18)
GFSLTSYAMS

SEQ ID NO: 172 (HCDR2 of rabbit derived IL-19 Ab 18)
IIGSPGTTGYATWAKG

SEQ ID NO: 173 (HCDR3 of rabbit derived IL-19 Ab 18)
GWFYYGMAL

SEQ ID NO: 174 (LCDR1 of rabbit derived IL-19 Ab 19)
QASESISSYLA

SEQ ID NO: 175 (LCDR2 of rabbit derived IL-19 Ab 19)
GASTLAS

SEQ ID NO: 176 (LCDR3 of rabbit derived IL-19 Ab 19)
QGYFGDYIYG

SEQ ID NO: 177 (HCDR1 of rabbit derived IL-19 Ab 19)
GFSLTSYAMS

SEQ ID NO: 178 (HCDR2 of rabbit derived IL-19 Ab 19)
IIGSPGTTGYATWAKG

SEQ ID NO: 179 (HCDR3 of rabbit derived IL-19 Ab 19)
GWFYYGMAL

Sequence Listing

SEQ ID NO: 180 (LCDR1 of rabbit derived IL-19 Ab 20)
QASESISSYLA

SEQ ID NO: 181 (LCDR2 of rabbit derived IL-19 Ab 20)
GASTLAS

SEQ ID NO: 182 (LCDR3 of rabbit derived IL-19 Ab 20)
QGYFGDYIYG

SEQ ID NO: 183 (HCDR1 of rabbit derived IL-19 Ab 20)
GFSLTSYAMS

SEQ ID NO: 184 (HCDR2 of rabbit derived IL-19 Ab 20)
IIGSPGTTGYATWAKG

SEQ ID NO: 185 (HCDR3 of rabbit derived IL-19 Ab 20)
GWFYYGMAL

SEQ ID NO: 186 (LCDR1 of rabbit derived IL-19 Ab 21)
QASQSISNYLS

SEQ ID NO: 187 (LCDR2 of rabbit derived IL-19 Ab 21)
WASNLAS

SEQ ID NO: 188 (LCDR3 of rabbit derived IL-19 Ab 21)
LGEFSCSSADCFA

SEQ ID NO: 189 (HCDR1 of rabbit derived IL-19 Ab 21)
GFDLSNYAMT

SEQ ID NO: 190 (HCDR2 of rabbit derived IL-19 Ab 21)
AIHGSGVTDCASWTRG

SEQ ID NO: 191 (HCDR3 of rabbit derived IL-19 Ab 21)
ESAGINTDYDL

SEQ ID NO: 192 (LCDR1 of rabbit derived IL-19 Ab 22)
QASQSISNYLS

SEQ ID NO: 193 (LCDR2 of rabbit derived IL-19 Ab 22)
WASNLAS

SEQ ID NO: 194 (LCDR3 of rabbit derived IL-19 Ab 22)
LGEFSCSSADCFA

SEQ ID NO: 195 (HCDR1 of rabbit derived IL-19 Ab 22)
GFDLSNYAMT

SEQ ID NO: 196 (HCDR2 of rabbit derived IL-19 Ab 22)
AIHGSGVTDCASWTRG

SEQ ID NO: 197 (HCDR3 of rabbit derived IL-19 Ab 22)
ESAGINTDYDL

SEQ ID NO: 198 (LCDR1 of rabbit derived IL-19 Ab 23)
QASKSIGSYLS

SEQ ID NO: 199 (LCDR2 of rabbit derived IL-19 Ab 23)
RASTLAS

SEQ ID NO: 200 (LCDR3 of rabbit derived IL-19 Ab 23)
QAYYGDYIYD

SEQ ID NO: 201 (HCDR1 of rabbit derived IL-19 Ab 23)
GFSLSSYPMS

SEQ ID NO: 202 (HCDR2 of rabbit derived IL-19 Ab 23)
IIGSTGSTGYANWAKG

SEQ ID NO: 203 (HCDR3 of rabbit derived IL-19 Ab 23)
GWFYYGLDL

SEQ ID NO: 204 (LCDR1 of rabbit derived IL-19 Ab 24)
QASQSIGSYLS

-continued

Sequence Listing

SEQ ID NO: 205 (LCDR2 of rabbit derived IL-19 Ab 24)
RASTLAS

SEQ ID NO: 206 (LCDR3 of rabbit derived IL-19 Ab 24)
QAYYGDYIYD

SEQ ID NO: 207 (HCDR1 of rabbit derived IL-19 Ab 24)
GFSLSSYPMS

SEQ ID NO: 208 (HCDR2 of rabbit derived IL-19 Ab 24)
IIGSTGSTGYANWAKG

SEQ ID NO: 209 (HCDR3 of rabbit derived IL-19 Ab 24)
GWFYYGLDL

SEQ ID NO: 210 (LCDR1 of rabbit derived IL-19 Ab 25)
QASQSIGSYLA

SEQ ID NO: 211 (LCDR2 of rabbit derived IL-19 Ab 25)
DASDLAS

SEQ ID NO: 212 (LCDR3 of rabbit derived IL-19 Ab 25)
QSAVYDSSYVVT

SEQ ID NO: 213 (HCDR1 of rabbit derived IL-19 Ab 25)
GFSLSSYDMS

SEQ ID NO: 214 (HCDR2 of rabbit derived IL-19 Ab 25)
ISDSLGTTWYANWAKG

SEQ ID NO: 215 (HCDR3 of rabbit derived IL-19 Ab 25)
ESGDIRIDYDL

SEQ ID NO: 216 (LCDR1 of rabbit derived IL-19 Ab 26)
QASQSIGSYLA

SEQ ID NO: 217 (LCDR2 of rabbit derived IL-19 Ab 26)
DASDLAS

SEQ ID NO: 218 (LCDR3 of rabbit derived IL-19 Ab 26)
QSAVYDSSYVVT

SEQ ID NO: 219 (HCDR1 of rabbit derived IL-19 Ab 26)
GFSLSSYDMS

SEQ ID NO: 220 (HCDR2 of rabbit derived IL-19 Ab 26)
ISDSLGTTWYANWAKG

SEQ ID NO: 221 (HCDR3 of rabbit derived IL-19 Ab 26)
ESGDIRIDYDL

SEQ ID NO: 222 (LCDR1 of rabbit derived IL-19 Ab 27)
QASQSIGSYLA

SEQ ID NO: 223 (LCDR2 of rabbit derived IL-19 Ab 27)
DASDLAS

SEQ ID NO: 224 (LCDR3 of rabbit derived IL-19 Ab 27)
QSAVYDSSYVVT

SEQ ID NO: 225 (HCDR1 of rabbit derived IL-19 Ab 27)
GFSLSSYDMS

SEQ ID NO: 226 (HCDR2 of rabbit derived IL-19 Ab 27)
ISDSLGTTWYANWAKG

SEQ ID NO: 227 (HCDR3 of rabbit derived IL-19 Ab 27)
ESGDIRIDYDL

SEQ ID NO: 228 (LCDR1 of rabbit derived IL-19 Ab 28)
QASQSIGSYLA

SEQ ID NO: 229 (LCDR2 of rabbit derived IL-19 Ab 28)
DASDLAS

SEQ ID NO: 230 (LCDR3 of rabbit derived IL-19 Ab 28)
QSAVYDSSYVVT

-continued

Sequence Listing

SEQ ID NO: 231 (HCDR1 of rabbit derived IL-19 Ab 28)
GFSLSSYDMS

SEQ ID NO: 232 (HCDR2 of rabbit derived IL-19 Ab 28)
ISDSLGTTWYANWAKG

SEQ ID NO: 233 (HCDR3 of rabbit derived IL-19 Ab 28)
ESGDIRIDYDL

SEQ ID NO: 234 (LCDR1 of rabbit derived IL-19 Ab 29)
QASQSLNINYLS

SEQ ID NO: 235 (LCDR2 of rabbit derived IL-19 Ab 29)
SASTLAS

SEQ ID NO: 236 (LCDR3 of rabbit derived IL-19 Ab 29)
QQSVNYGRVDNI

SEQ ID NO: 237 (HCDR1 of rabbit derived IL-19 Ab 29)
GFTISNYHMS

SEQ ID NO: 238 (HCDR2 of rabbit derived IL-19 Ab 29)
RIVSYGGTYYANWAKG

SEQ ID NO: 239 (HCDR3 of rabbit derived IL-19 Ab 29)
DSSGSGFSFAL

SEQ ID NO: 240 (LCDR1 of rabbit derived IL-19 Ab 30)
QASQSITTSYLS

SEQ ID NO: 241 (LCDR2 of rabbit derived IL-19 Ab 30)
KASTLAS

SEQ ID NO: 242 (LCDR3 of rabbit derived IL-19 Ab 30)
QQSHNYGRVDNI

SEQ ID NO: 243 (HCDR1 of rabbit derived IL-19 Ab 30)
GFTISNYHMS

SEQ ID NO: 244 (HCDR2 of rabbit derived IL-19 Ab 30)
RIVSYGGTYYANWAKG

SEQ ID NO: 245 (HCDR3 of rabbit derived IL-19 Ab 30)
DSSGSGFSFAL

SEQ ID NO: 246 (LCDR1 of rabbit derived IL-19 Ab 31)
QASQSITTSYLS

SEQ ID NO: 247 (LCDR2 of rabbit derived IL-19 Ab 31)
KASTLAS

SEQ ID NO: 248 (LCDR3 of rabbit derived IL-19 Ab 31)
QQSHNYGRVDNI

SEQ ID NO: 249 (HCDR1 of rabbit derived IL-19 Ab 31)
GFTISNYHMS

SEQ ID NO: 250 (HCDR2 of rabbit derived IL-19 Ab 31)
RIVSYGGTYYANWAKG

SEQ ID NO: 251 (HCDR3 of rabbit derived IL-19 Ab 31)
DSSGSGFSFAL

SEQ ID NO: 252 (LCDR1 of rabbit derived IL-19 Ab 32)
QASQSITTSYLS

SEQ ID NO: 253 (LCDR2 of rabbit derived IL-19 Ab 32)
KASTLAS

SEQ ID NO: 254 (LCDR3 of rabbit derived IL-19 Ab 32)
QQSHNYGRVDNI

SEQ ID NO: 255 (HCDR1 of rabbit derived IL-19 Ab 32)
GFTISNYHMS

-continued

| Sequence Listing |
|---|

SEQ ID NO: 256 (HCDR2 of rabbit derived IL-19 Ab 32)
RIVSYGGTYYANWAKG

SEQ ID NO: 257 (HCDR3 of rabbit derived IL-19 Ab 32)
DSSGSGFSFAL

SEQ ID NO: 258 (LCDR1 of rabbit derived IL-19 Ab 33)
QASQSITTSYLS

SEQ ID NO: 259 (LCDR2 of rabbit derived IL-19 Ab 33)
KASTLAS

SEQ ID NO: 260 (LCDR3 of rabbit derived IL-19 Ab 33)
QQSHNYGRVDNI

SEQ ID NO: 261 (HCDR1 of rabbit derived IL-19 Ab 33)
GFTISNYHMS

SEQ ID NO: 262 (HCDR2 of rabbit derived IL-19 Ab 33)
RIVSYGGTYYANWAKG

SEQ ID NO: 263 (HCDR3 of rabbit derived IL-19 Ab 33)
DSSGSGFSFAL

SEQ ID NO: 264 (LCDR1 of rabbit derived IL-19 Ab 34)
QASQNIYSNLA

SEQ ID NO: 265 (LCDR2 of rabbit derived IL-19 Ab 34)
KASTLAS

SEQ ID NO: 266 (LCDR3 of rabbit derived IL-19 Ab 34)
QAYVGNYIYT

SEQ ID NO: 267 (HCDR1 of rabbit derived IL-19 Ab 34)
GFSLSSYPMS

SEQ ID NO: 268 (HCDR2 of rabbit derived IL-19 Ab 34)
IIGSSGSIGYASWAKG

SEQ ID NO: 269 (HCDR3 of rabbit derived IL-19 Ab 34)
GWFYYGMDL

SEQ ID NO: 270 (LCDR1 of rabbit derived IL-19 Ab 35)
QASQSIGSNLA

SEQ ID NO: 271 (LCDR2 of rabbit derived IL-19 Ab 35)
RASTLAS

SEQ ID NO: 272 (LCDR3 of rabbit derived IL-19 Ab 35)
QGYYGDGIYG

SEQ ID NO: 273 (HCDR1 of rabbit derived IL-19 Ab 35)
GFSLSSYPMS

SEQ ID NO: 274 (HCDR2 of rabbit derived IL-19 Ab 35)
LIGSSGTIYFATWAKG

SEQ ID NO: 275 (HCDR3 of rabbit derived IL-19 Ab 35)
GWFYYGMDL

SEQ ID NO: 276 (LCDR1 of rabbit derived IL-19 Ab 36)
QASQSISSWLS

SEQ ID NO: 277 (LCDR2 of rabbit derived IL-19 Ab 36)
GASTLAS

SEQ ID NO: 278 (LCDR3 of rabbit derived IL-19 Ab 36)
QSYYYISSSSYT

SEQ ID NO: 279 (HCDR1 of rabbit derived IL-19 Ab 36)
GFSLSSYPMS

SEQ ID NO: 280 (HCDR2 of rabbit derived IL-19 Ab 36)
LIGSSGTIYFATWAKG

SEQ ID NO: 281 (HCDR3 of rabbit derived IL-19 Ab 36)
GWFYYGMDL

| Sequence Listing |
|---|

SEQ ID NO: 282 (LCDR1 of rabbit derived IL-19 Ab 37)
QASQSISSYLA

SEQ ID NO: 283 (LCDR2 of rabbit derived IL-19 Ab 37)
SASTLAS

SEQ ID NO: 284 (LCDR3 of rabbit derived IL-19 Ab 37)
QCHYHGSSYWDNS

SEQ ID NO: 285 (HCDR1 of rabbit derived IL-19 Ab 37)
GFSFSSSYWIC

SEQ ID NO: 286 (HCDR2 of rabbit derived IL-19 Ab 37)
CIDTGVSGDTYYANWAEG

SEQ ID NO: 287 (HCDR3 of rabbit derived IL-19 Ab 37)
DIFGSAIDNSL

SEQ ID NO: 288 (LCDR1 of rabbit derived IL-19 Ab 38)
QASQNIYSNLA

SEQ ID NO: 289 (LCDR2 of rabbit derived IL-19 Ab 38)
GASNLES

SEQ ID NO: 290 (LCDR3 of rabbit derived IL-19 Ab 38)
QGGYSGGIYA

SEQ ID NO: 291 (HCDR1 of rabbit derived IL-19 Ab 38)
GFSLTRHAMS

SEQ ID NO: 292 (HCDR2 of rabbit derived IL-19 Ab 38)
AIHGSGVTDYASWAKG

SEQ ID NO: 293 (HCDR3 of rabbit derived IL-19 Ab 38)
GSGL

SEQ ID NO: 294 (LCVR of rabbit derived IL-19 Ab 39 ("R_39"))
DIVMTQTPASVEAAVGGTVTIKCQASQSIYRYLSWYQQKPGQRPKLLIYGASNLA
SGVSSRFKGSGSGTEFTLTISDLECADAATYYCQSYYYSSSSGYGNVFGGGTEVV
VK SEQ ID NO: 295 (LCDR1 of rabbit derived IL-19 Ab 39)
QASQSIYRYLS SEQ ID NO: 296 (LCDR2 of rabbit derived IL-19 Ab 39)
GASNLAS SEQ ID NO: 297 (LCDR3 of rabbit derived IL-19 Ab 39)
QSYYYSSSSGYGNV SEQ ID NO: 298 (HCVR of rabbit derived IL-19 Ab 39 ("R_39"))
QEQLKESGGGLVQPGGSLKLSCKASGFDLSSYGVSWVRQAPGKGLEWIGYIDPV
FGSTYYANWVNGRFTISSDNAQNTLYLQLNSLTAADTATYFCARGSGYVYYGYT
YDLWGPGTLVTVSS SEQ ID NO: 299 (HCDR1 of rabbit derived IL-19 Ab 39)
GFDLSSYGVS SEQ ID NO: 300 (HCDR2 of rabbit derived IL-19 Ab 39)
YIDPVFGSTYYANWVNG SEQ ID NO: 301 (HCDR3 of rabbit derived IL-19 Ab 39)
GSGYVYYGYTYDL SEQ ID NO: 302 (LCVR of murine derived IL-19 Ab 5 ("M_5"))
DIVMTQSPSSLAMSVGQKVTMSCKSSQSLLSSYNQKNYLAWYQRKPGQSPKLLV
YFASQRATGVPDRFIGSGSGSDFTLTISSVQAEDLADYFCQQHTRLPITFGAGTKL
ELK SEQ ID NO: 303 (LCDR1 of murine derived IL-19 Ab 5)
KSSQSLLSSYNQKNYLA SEQ ID NO: 304 (LCDR2 of murine derived IL-19 Ab 5)
FASQRAT

| Sequence Listing |
|---|

SEQ ID NO: 305 (LCDR3 of murine derived IL-19 Ab 5)
QQHTRLPIT

SEQ ID NO: 306 (HCVR of murine derived IL-19 Ab 5 ("M_5"))
EVQLQQSGPVLVKPGASVKMSCKASGYPFNDYFLGWVKQSHGKSLEWIGSINPD
NDYTMSNQKFKGKATLTVDKSSSTAYMELNSLTSEDSAVYYCARYDYDWAWF
AHWGQGTLVTVSA SEQ ID NO: 307 (HCDR1 of murine derived IL-19 Ab 5)
GYPFNDYFLG SEQ ID NO: 308 (HCDR2 of murine derived IL-19 Ab 5)
SINPDNDYTMSNQKFKG SEQ ID NO: 309 (HCDR3 of murine derived IL-19 Ab 5)
YDYDWAWFAH SEQ ID NO: 310 (LC of rabbit derived IL-19 Ab 39 ("R_39"))
DIVMTQTPASVEAAVGGTVTIKCQASQSIYRYLSWYQQKPGQRPKLLIYGASNLA
SGVSSRFKGSGSGTEFTLTISDLECADAATYYCQSYYYSSSSGYGNVFGGGTEVV
VKGDPVAPTVLIFPPAADQVATGTVTIVCVANKYFPDVTVTWEVDGTTQTTGIEN
SKTPQNSADCTYNLSSTLTLTSTQYNSHKEYTCKVTQGTTSVVQSFNRGDC SEQ ID NO: 311 (HC of rabbit derived IL-19 Ab 39 ("R_39"))
QEQLKESGGGLVQPGGSLKLSCKASGFDLSSYGVSWVRQAPGKGLEWIGYIDPV
FGSTYYANWVNGRFTISSDNAQNTLYLQLNSLTAADTATYFCARGSGYVYYGYT
YDLWGPGTLVTVSSGQPKAPSVFPLAPCCGDTPSSTVTLGCLVKGYLPEPVTVT
WNSGTLTNGVRTFPSVRQSSGLYSLSSVVSVTSSSQPVTCNVAHPATNTKVDKTV
APSTCSKPTCPPPELLGGPSVFIFPPKPKDTLMISRTPEVTCVVVDVSQDDPEVQFT
WYINNEQVRTARPPLREQQFNSTIRVVSTLPIAHQDWLRGKEFKCKVHNKALPAP
IEKTISKARGQPLEPKVYTMGPPREELSSRSVSLTCMINGFYPSDISVEWEKNGKA
EDNYKTTPAVLDSDGSYFLYSKLSVPTSEWQRGDVFTCSVMHEALHNHYTQKSI
SRSPGK SEQ ID NO: 312 (LC of murine derived IL-19 Ab 5 ("M_5"))
DIVMTQSPSSLAMSVGQKVTMSCKSSQSLLSSYNQKNYLAWYQRKPGQSPKLLV
YFASQRATGVPDRFIGSGSGSDFTLTISSVQAEDLADYFCQQHTRLPITFGAGTKL
ELKRADAAPTVSIFPPSSEQLTSGGASVVCFLNNFYPKDINVKWKIDGSERQNGV
LNSWTDQDSKDSTYSMSSTLTLTKDEYERHNSYTCEATHKTSTSPIVKSFNRNEC SEQ ID NO: 313 (HC of murine derived IL-19 Ab 5 ("M_5"))
EVQLQQSGPVLVKPGASVKMSCKASGYPFNDYFLGWVKQSHGKSLEWIGSINPD
NDYTMSNQKFKGKATLTVDKSSSTAYMELNSLTSEDSAVYYCARYDYDWAWF
AHWGQGTLVTVSAAKTTPPSVYPLAPGSAAQTNSMVTLGCLVKGYFPEPVTVT
WNSGSLSSGVHTFPAVLQSDLYTLSSSVTVPSSTWPSETVTCNVAHPASSTKVDK
KIVPRDCGCKPCICTVPEVSSVFIFPPKPKDVLTITLTPKVTCVVVDISKDDPEVQF
SWFVDDVEVHTAQTQPREEQFNSTFRSVSELPIMHQDWLNGKEFKCRVNSAAFP
APIEKTISKTKGRPKAPQVYTIPPPKEQMAKDKVSLTCMITDFFPEDITVEWQWNG
QPAENYKNTQPIMDTDGSYFVYSKLNVQKSNWEAGNTFTCSVLHEGLHNHHTE
KSLSHSPGK

| SEQUENCE LISTING |
|---|

Sequence total quantity: 313
SEQ ID NO: 1              moltype = AA  length = 177
FEATURE                   Location/Qualifiers
source                    1..177
                          mol_type = protein
                          organism = Homo sapiens
SEQUENCE: 1
MKLQCVSLWL LGTILILCSV DNHGLRRCLI STDMHHIEES FQEIKRAIQA KDTFPNVTIL    60
STLETLQIIK PLDVCCVTKN LLAFYVDRVF KDHQEPNPKI LRKISSIANS FLYMQKTLRQ  120
CQEQRQCHCR QEATNATRVI HDNYDQLEVH AAAIKSLGEL DVFLAWINKN HEVMFSA    177

SEQ ID NO: 2              moltype = AA  length = 220
FEATURE                   Location/Qualifiers
REGION                    1..220
                          note = synthetic construct
source                    1..220
                          mol_type = protein
                          organism = synthetic construct
SEQUENCE: 2
DIVMTQSPSS LAMSVGQKVT MSCKSSQSLL SSYNQKNYLA WYQQKPGQSP KLLVYFASTR    60

```
PPGVPDRFIG SGSGSDFTLT ISSVQAEDLA DYFCQQHERL PITFGAGTKL ELKRADAAPT    120
VSIFPPSSEQ LTSGGASVVC FLNNFYPKDI NVKWKIDGSE RQNGVLNSWT DQDSKDSTYS    180
MSSTLTLTKD EYERHNSYTC EATHKTSTSP IVKSFNRNEC                         220

SEQ ID NO: 3              moltype = AA   length = 17
FEATURE                   Location/Qualifiers
REGION                    1..17
                          note = synthetic construct
source                    1..17
                          mol_type = protein
                          organism = synthetic construct
SEQUENCE: 3
KSSQSLLSSY NQKNYLA                                                   17

SEQ ID NO: 4              moltype = AA   length = 7
FEATURE                   Location/Qualifiers
REGION                    1..7
                          note = synthetic construct
source                    1..7
                          mol_type = protein
                          organism = synthetic construct
SEQUENCE: 4
FASTRPP                                                              7

SEQ ID NO: 5              moltype = AA   length = 9
FEATURE                   Location/Qualifiers
REGION                    1..9
                          note = synthetic construct
source                    1..9
                          mol_type = protein
                          organism = synthetic construct
SEQUENCE: 5
QQHERLPIT                                                            9

SEQ ID NO: 6              moltype = AA   length = 443
FEATURE                   Location/Qualifiers
REGION                    1..443
                          note = synthetic construct
source                    1..443
                          mol_type = protein
                          organism = synthetic construct
SEQUENCE: 6
EVQLQQSGPV LVKPGASVKM SCKASGYKFT DYFVGWVKQS HGKSLEWIGY VDPENGYTRC    60
NQKFKGKATL TVDKSSSTAY MELNSLTSED SAVYYCARYD YDWAWFTNWG QGTLVTVSAA    120
KTTPPSVYPL APGSAAQTNS MVTLGCLVKG YFPEPVTVTW NSGSLSSGVH TFPAVLQSDL    180
YTLSSSVTVP SSTWPSETVT CNVAHPASST KVDKKIVPRD CGCKPCICTV PEVSSVFIFP    240
PKPKDVLTIT LTPKVTCVVV DISKDDPEVQ FSWFVDDVEV HTAQTQPREE QFNSTFRSVS    300
ELPIMHQDWL NGKEFKCRVN SAAFPAPIEK TISKTKGRPK APQVYTIPPP KEQMAKDKVS    360
LTCMITDFFP EDITVEWQWN GQPAENYKNT QPIMDTDGSY FVYSKLNVQK SNWEAGNTFT    420
CSVLHEGLHN HHTEKSLSHS PGK                                           443

SEQ ID NO: 7              moltype = AA   length = 10
FEATURE                   Location/Qualifiers
REGION                    1..10
                          note = synthetic construct
source                    1..10
                          mol_type = protein
                          organism = synthetic construct
SEQUENCE: 7
GYKFTDYFVG                                                           10

SEQ ID NO: 8              moltype = AA   length = 17
FEATURE                   Location/Qualifiers
REGION                    1..17
                          note = synthetic construct
source                    1..17
                          mol_type = protein
                          organism = synthetic construct
SEQUENCE: 8
YVDPENGYTR CNQKFKG                                                   17

SEQ ID NO: 9              moltype = AA   length = 10
FEATURE                   Location/Qualifiers
REGION                    1..10
                          note = synthetic construct
source                    1..10
                          mol_type = protein
                          organism = synthetic construct
SEQUENCE: 9
```

```
YDYDWAWFTN                                                                    10

SEQ ID NO: 10            moltype = AA   length = 218
FEATURE                  Location/Qualifiers
REGION                   1..218
                         note = synthetic construct
source                   1..218
                         mol_type = protein
                         organism = synthetic construct
SEQUENCE: 10
DIVLTQSPES LAVSLGQRAT ISCRASESVD NYGISFIHWY QQKPGQPPKL LIYRASNLKS              60
GIPARFSGRG SRTDFTLTIN PVETDDVATY YCQQINKDPL TFGAGTKLEL KRADAAPTVS             120
IFPPSSEQLT SGGASVVCFL NNFYPKDINV KWKIDGSERQ NGVLNSWTDQ DSKDSTYSMS             180
STLTLTKDEY ERHNSYTCEA THKTSTSPIV KSFNRNEC                                     218

SEQ ID NO: 11            moltype = AA   length = 15
FEATURE                  Location/Qualifiers
REGION                   1..15
                         note = synthetic construct
source                   1..15
                         mol_type = protein
                         organism = synthetic construct
SEQUENCE: 11
RASESVDNYG ISFIH                                                              15

SEQ ID NO: 12            moltype = AA   length = 7
FEATURE                  Location/Qualifiers
REGION                   1..7
                         note = synthetic construct
source                   1..7
                         mol_type = protein
                         organism = synthetic construct
SEQUENCE: 12
RASNLKS                                                                        7

SEQ ID NO: 13            moltype = AA   length = 9
FEATURE                  Location/Qualifiers
REGION                   1..9
                         note = synthetic construct
source                   1..9
                         mol_type = protein
                         organism = synthetic construct
SEQUENCE: 13
QQINKDPLT                                                                      9

SEQ ID NO: 14            moltype = AA   length = 441
FEATURE                  Location/Qualifiers
REGION                   1..441
                         note = synthetic construct
source                   1..441
                         mol_type = protein
                         organism = synthetic construct
SEQUENCE: 14
LVQLQQSDAE LVKPGASLKI SCKVSGYTFT DHALHWMKQR PEQGLEWIGY IYPRDGSTKY              60
NEKFKGKATL TADRSSSTAY MELNSLTSED SAVYFCARGW DFAMDYWGQG TSVTVSSAKT             120
TPPSVYPLAP GSAAQTNSMV TLGCLVKGYF PEPVTVTWNS GSLSSGVHTF PAVLQSDLYT             180
LSSSVTVPSS TWPSETVTCN VAHPASSTKV DKKIVPRDCG CKPCICTVPE VSSVFIFPPK             240
PKDVLTITLT PKVTCVVVDI SKDDPEVQFS WFVDDVEVHT AQTQPREEQF NSTFRSVSEL             300
PIMHQDWLNG KEFKCRVNSA AFPAPIEKTI SKTKGRPKAP QVYTIPPPKE QMAKDKVSLT             360
CMITDFFPED ITVEWQWNGQ PAENYKNTQP IMDTDGSYFV YSKLNVQKSN WEAGNTFTCS             420
VLHEGLHNHH TEKSLSHSPG K                                                       441

SEQ ID NO: 15            moltype = AA   length = 10
FEATURE                  Location/Qualifiers
REGION                   1..10
                         note = synthetic construct
source                   1..10
                         mol_type = protein
                         organism = synthetic construct
SEQUENCE: 15
GYTFTDHALH                                                                    10

SEQ ID NO: 16            moltype = AA   length = 17
FEATURE                  Location/Qualifiers
REGION                   1..17
                         note = synthetic construct
source                   1..17
                         mol_type = protein
                         organism = synthetic construct
```

```
SEQUENCE: 16
YIYPRDGSTK YNEKFKG                                                      17

SEQ ID NO: 17           moltype = AA   length = 8
FEATURE                 Location/Qualifiers
REGION                  1..8
                        note = synthetic construct
source                  1..8
                        mol_type = protein
                        organism = synthetic construct
SEQUENCE: 17
GWDFAMDY                                                                 8

SEQ ID NO: 18           moltype = AA   length = 214
FEATURE                 Location/Qualifiers
REGION                  1..214
                        note = synthetic construct
source                  1..214
                        mol_type = protein
                        organism = synthetic construct
SEQUENCE: 18
DIKMTQSPSS MYASLGERVT ITCKASQDIN SYLSWFQQKP GKSPKTLIYR ANRLVDGVPS       60
RFSGSGSGQD YSLTISSLEY EDMGIYFCLQ YDDFPYTFGG GTKLEIKRAD AAPTVSIFPP      120
SSEQLTSGGA SVVCFLNNFY PKDINVKWKI DGSERQNGVL NSWTDQDSKD STYSMSSTLT      180
LTKDEYERHN SYTCEATHKT STSPIVKSFN RNEC                                   214

SEQ ID NO: 19           moltype = AA   length = 11
FEATURE                 Location/Qualifiers
REGION                  1..11
                        note = synthetic construct
source                  1..11
                        mol_type = protein
                        organism = synthetic construct
SEQUENCE: 19
KASQDINSYL S                                                            11

SEQ ID NO: 20           moltype = AA   length = 7
FEATURE                 Location/Qualifiers
REGION                  1..7
                        note = synthetic construct
source                  1..7
                        mol_type = protein
                        organism = synthetic construct
SEQUENCE: 20
RANRLVD                                                                  7

SEQ ID NO: 21           moltype = AA   length = 9
FEATURE                 Location/Qualifiers
REGION                  1..9
                        note = synthetic construct
source                  1..9
                        mol_type = protein
                        organism = synthetic construct
SEQUENCE: 21
LQYDDFPYT                                                                9

SEQ ID NO: 22           moltype = AA   length = 440
FEATURE                 Location/Qualifiers
REGION                  1..440
                        note = synthetic construct
source                  1..440
                        mol_type = protein
                        organism = synthetic construct
SEQUENCE: 22
QIQLVQSGPE LKKPGETVKI SCKASGYTFT TYGMSWVKQA PGKGLKWMVW INTYSGVPTY       60
VDDFKGRFAF SLETSASTAY LQINNLKNED TATYFCARRD EGFAYWGQGT LVTVSAAKTT      120
PPSVYPLAPG SAAQTNSMVT LGCLVKGYFP EPVTVTWNSG SLSSGVHTFP AVLQSDLYTL      180
SSSVTVPSST WPSETVTCNV AHPASSTKVD KKIVPRDCGC KPCICTVPEV SSVFIFPPKP      240
KDVLTITLTP KVTCVVVDIS KDDPEVQFSW FVDDVEVHTA QTQPREEQFN STFRSVSELP      300
IMHQDWLNGK EFKCRVNSAA FPAPIEKTIS KTKGRPKAPQ VYTIPPPKEQ MAKDKVSLTC      360
MITDFFPEDI TVEWQWNGQP AENYKNTQPI MDTDGSYFVY SKLNVQKSNW EAGNTFTCSV      420
LHEGLHNHHT EKSLSHSPGK                                                   440

SEQ ID NO: 23           moltype = AA   length = 10
FEATURE                 Location/Qualifiers
REGION                  1..10
                        note = synthetic construct
source                  1..10
                        mol_type = protein
```

```
                            organism = synthetic construct
SEQUENCE: 23
GYTFTTYGMS                                                                    10

SEQ ID NO: 24           moltype = AA   length = 17
FEATURE                 Location/Qualifiers
REGION                  1..17
                        note = synthetic construct
source                  1..17
                        mol_type = protein
                        organism = synthetic construct
SEQUENCE: 24
WINTYSGVPT YVDDFKG                                                            17

SEQ ID NO: 25           moltype = AA   length = 7
FEATURE                 Location/Qualifiers
REGION                  1..7
                        note = synthetic construct
source                  1..7
                        mol_type = protein
                        organism = synthetic construct
SEQUENCE: 25
RDEGFAY                                                                        7

SEQ ID NO: 26           moltype = AA   length = 220
FEATURE                 Location/Qualifiers
REGION                  1..220
                        note = synthetic construct
source                  1..220
                        mol_type = protein
                        organism = synthetic construct
SEQUENCE: 26
DIVMTQSPSS LAMSVGQKVT MSCKSSQSLL SSYNQKNYLA WYQQKPGQSP KLLVYFASTR             60
ESGVPDRFIG SGSGSDFTLT ISSVQAEDLA DYFCQQHYST PLTFGAGTKL ELKRADAAPT            120
VSIFPPSSEQ LTSGGASVVC FLNNFYPKDI NVKWKIDGSE RQNGVLNSWT DQDSKDSTYS            180
MSSTLTLTKD EYERHNSYTC EATHKTSTSP IVKSFNRNEC                                  220

SEQ ID NO: 27           moltype = AA   length = 17
FEATURE                 Location/Qualifiers
REGION                  1..17
                        note = synthetic construct
source                  1..17
                        mol_type = protein
                        organism = synthetic construct
SEQUENCE: 27
KSSQSLLSSY NQKNYLA                                                            17

SEQ ID NO: 28           moltype = AA   length = 7
FEATURE                 Location/Qualifiers
REGION                  1..7
                        note = synthetic construct
source                  1..7
                        mol_type = protein
                        organism = synthetic construct
SEQUENCE: 28
FASTRES                                                                        7

SEQ ID NO: 29           moltype = AA   length = 9
FEATURE                 Location/Qualifiers
REGION                  1..9
                        note = synthetic construct
source                  1..9
                        mol_type = protein
                        organism = synthetic construct
SEQUENCE: 29
QQHYSTPLT                                                                      9

SEQ ID NO: 30           moltype = AA   length = 443
FEATURE                 Location/Qualifiers
REGION                  1..443
                        note = synthetic construct
source                  1..443
                        mol_type = protein
                        organism = synthetic construct
SEQUENCE: 30
EVQLQQSGPV LVKPGASVKM SCKASGYTFT DYYMNWVKQS HGKSLEWIGF INPYNDDTRC             60
NQKFKGKATL TVDKSSSTAY MELNSLTSED SAVYYCARYD GYWAWFAYWG QGTLVTVSAA            120
KTTPPSVYPL APGSAAQTNS MVTLGCLVKG YFPEPVTVTW NSGSLSSGVH TFPAVLQSDL            180
YTLSSSVTVP SSTWPSETVT CNVAHPASST KVDKKIVPRD CGCKPCICTV PEVSSVFIFP            240
```

```
PKPKDVLTIT LTPKVTCVVV DISKDDPEVQ FSWFVDDVEV HTAQTQPREE QFNSTFRSVS    300
ELPIMHQDWL NGKEFKCRVN SAAFPAPIEK TISKTKGRPK APQVYTIPPP KEQMAKDKVS    360
LTCMITDFFP EDITVEWQWN GQPAENYKNT QPIMDTDGSY FVYSKLNVQK SNWEAGNTFT    420
CSVLHEGLHN HHTEKSLSHS PGK                                           443

SEQ ID NO: 31           moltype = AA   length = 10
FEATURE                 Location/Qualifiers
REGION                  1..10
                        note = synthetic construct
source                  1..10
                        mol_type = protein
                        organism = synthetic construct
SEQUENCE: 31
GYTFTDYYMN                                                           10

SEQ ID NO: 32           moltype = AA   length = 17
FEATURE                 Location/Qualifiers
REGION                  1..17
                        note = synthetic construct
source                  1..17
                        mol_type = protein
                        organism = synthetic construct
SEQUENCE: 32
FINPYNDDTR CNQKFKG                                                   17

SEQ ID NO: 33           moltype = AA   length = 10
FEATURE                 Location/Qualifiers
REGION                  1..10
                        note = synthetic construct
source                  1..10
                        mol_type = protein
                        organism = synthetic construct
SEQUENCE: 33
YDGYWAWFAY                                                           10

SEQ ID NO: 34           moltype = AA   length = 111
FEATURE                 Location/Qualifiers
REGION                  1..111
                        note = synthetic construct
source                  1..111
                        mol_type = protein
                        organism = synthetic construct
SEQUENCE: 34
AIDMTQTPAS VSEPVGGTVT IKCQASQSIS SYLAWYQQKP GQPPKLLIYS ASTLASGVPS     60
RFRGSGSGRE FTLTISDLEC ADAATYYCQC HYHGSSYWDN SFGGGTEVVV K             111

SEQ ID NO: 35           moltype = AA   length = 11
FEATURE                 Location/Qualifiers
REGION                  1..11
                        note = synthetic construct
source                  1..11
                        mol_type = protein
                        organism = synthetic construct
SEQUENCE: 35
QASQSISSYL A                                                         11

SEQ ID NO: 36           moltype = AA   length = 7
FEATURE                 Location/Qualifiers
REGION                  1..7
                        note = synthetic construct
source                  1..7
                        mol_type = protein
                        organism = synthetic construct
SEQUENCE: 36
SASTLAS                                                               7

SEQ ID NO: 37           moltype = AA   length = 13
FEATURE                 Location/Qualifiers
REGION                  1..13
                        note = synthetic construct
source                  1..13
                        mol_type = protein
                        organism = synthetic construct
SEQUENCE: 37
QCHYHGSSYW DNS                                                       13

SEQ ID NO: 38           moltype = AA   length = 120
FEATURE                 Location/Qualifiers
REGION                  1..120
```

-continued

```
                        note = synthetic construct
source                  1..120
                        mol_type = protein
                        organism = synthetic construct
SEQUENCE: 38
QQLEESGGGL VQPEGSLTLT CTASGFSFSS SYWICWVRQA PGKGLEWLAC IDTGVSGDTY    60
YANWAEGRFT ISKTSSTTVT LQMTSLTAAD TATYFCARDI FGSAIDNSLW GPGTLVTVSS   120

SEQ ID NO: 39           moltype = AA  length = 11
FEATURE                 Location/Qualifiers
REGION                  1..11
                        note = synthetic construct
source                  1..11
                        mol_type = protein
                        organism = synthetic construct
SEQUENCE: 39
GFSFSSSYWI C                                                         11

SEQ ID NO: 40           moltype = AA  length = 18
FEATURE                 Location/Qualifiers
REGION                  1..18
                        note = synthetic construct
source                  1..18
                        mol_type = protein
                        organism = synthetic construct
SEQUENCE: 40
CIDTGVSGDT YYANWAEG                                                  18

SEQ ID NO: 41           moltype = AA  length = 11
FEATURE                 Location/Qualifiers
REGION                  1..11
                        note = synthetic construct
source                  1..11
                        mol_type = protein
                        organism = synthetic construct
SEQUENCE: 41
DIFGSAIDNS L                                                         11

SEQ ID NO: 42           moltype = AA  length = 112
FEATURE                 Location/Qualifiers
REGION                  1..112
                        note = synthetic construct
source                  1..112
                        mol_type = protein
                        organism = synthetic construct
SEQUENCE: 42
ADVVMTQTPA SVEAAVGGTV TIKCQASESI GNALAWYQQK PGQPPKLLIY DASKLASGVP    60
SRFKGSGSGT QFTLTISDLE CADAATYYCQ CHYHGSSYWD NSFGGGTEVV VK           112

SEQ ID NO: 43           moltype = AA  length = 11
FEATURE                 Location/Qualifiers
REGION                  1..11
                        note = synthetic construct
source                  1..11
                        mol_type = protein
                        organism = synthetic construct
SEQUENCE: 43
QASESIGNAL A                                                         11

SEQ ID NO: 44           moltype = AA  length = 7
FEATURE                 Location/Qualifiers
REGION                  1..7
                        note = synthetic construct
source                  1..7
                        mol_type = protein
                        organism = synthetic construct
SEQUENCE: 44
DASKLAS                                                               7

SEQ ID NO: 45           moltype = AA  length = 13
FEATURE                 Location/Qualifiers
REGION                  1..13
                        note = synthetic construct
source                  1..13
                        mol_type = protein
                        organism = synthetic construct
SEQUENCE: 45
QCHYHGSSYW DNS                                                       13
```

```
SEQ ID NO: 46            moltype = AA   length = 120
FEATURE                  Location/Qualifiers
REGION                   1..120
                         note = synthetic construct
source                   1..120
                         mol_type = protein
                         organism = synthetic construct
SEQUENCE: 46
QQLEESGGGL VQPEGSLTLT CTASGFSFSS SYWICWVRQA PGKGLEWLAC IDTGVSGDTY    60
YANWAKGRFT ISKTSSTTVT LQMTSLTAAD TATYFCARDI FGSAIDNSLW GPGTLVTVSS   120

SEQ ID NO: 47            moltype = AA   length = 11
FEATURE                  Location/Qualifiers
REGION                   1..11
                         note = synthetic construct
source                   1..11
                         mol_type = protein
                         organism = synthetic construct
SEQUENCE: 47
GFSFSSSYWI C                                                         11

SEQ ID NO: 48            moltype = AA   length = 18
FEATURE                  Location/Qualifiers
REGION                   1..18
                         note = synthetic construct
source                   1..18
                         mol_type = protein
                         organism = synthetic construct
SEQUENCE: 48
CIDTGVSGDT YYANWAKG                                                  18

SEQ ID NO: 49            moltype = AA   length = 11
FEATURE                  Location/Qualifiers
REGION                   1..11
                         note = synthetic construct
source                   1..11
                         mol_type = protein
                         organism = synthetic construct
SEQUENCE: 49
DIFGSAIDNS L                                                         11

SEQ ID NO: 50            moltype = AA   length = 112
FEATURE                  Location/Qualifiers
REGION                   1..112
                         note = synthetic construct
source                   1..112
                         mol_type = protein
                         organism = synthetic construct
SEQUENCE: 50
ADVVMTQTPS SVEAAVGGTV TIKCQASQSI GSSLAWYQQK PGQRPKLLIY GASTLASGVP    60
SRFKGSGSGT EFTLTISDLE CADAATYYCQ CHYHGSSYWD NSFGGGTEVV VK           112

SEQ ID NO: 51            moltype = AA   length = 11
FEATURE                  Location/Qualifiers
REGION                   1..11
                         note = synthetic construct
source                   1..11
                         mol_type = protein
                         organism = synthetic construct
SEQUENCE: 51
QASQSIGSSL A                                                         11

SEQ ID NO: 52            moltype = AA   length = 7
FEATURE                  Location/Qualifiers
REGION                   1..7
                         note = synthetic construct
source                   1..7
                         mol_type = protein
                         organism = synthetic construct
SEQUENCE: 52
GASTLAS                                                               7

SEQ ID NO: 53            moltype = AA   length = 13
FEATURE                  Location/Qualifiers
REGION                   1..13
                         note = synthetic construct
source                   1..13
                         mol_type = protein
                         organism = synthetic construct
```

```
                                         -continued

SEQUENCE: 53
QCHYHGSSYW DNS                                                          13

SEQ ID NO: 54          moltype = AA  length = 121
FEATURE                Location/Qualifiers
REGION                 1..121
                       note = synthetic construct
source                 1..121
                       mol_type = protein
                       organism = synthetic construct
SEQUENCE: 54
QCQSLEESGG GLVEPEGSLT LTCKASGFSF SSSYWICWVR QAPGKGLEWI ACTDTFSGDT        60
YYASWAKGRF TISKTSSTTV TLRMTSLTDA DTATYFCARD IFGTAVHISL WGPGTLVTVS       120
S                                                                      121

SEQ ID NO: 55          moltype = AA  length = 11
FEATURE                Location/Qualifiers
REGION                 1..11
                       note = synthetic construct
source                 1..11
                       mol_type = protein
                       organism = synthetic construct
SEQUENCE: 55
GFSFSSSYWI C                                                            11

SEQ ID NO: 56          moltype = AA  length = 17
FEATURE                Location/Qualifiers
REGION                 1..17
                       note = synthetic construct
source                 1..17
                       mol_type = protein
                       organism = synthetic construct
SEQUENCE: 56
CTDTFSGDTY YASWAKG                                                      17

SEQ ID NO: 57          moltype = AA  length = 11
FEATURE                Location/Qualifiers
REGION                 1..11
                       note = synthetic construct
source                 1..11
                       mol_type = protein
                       organism = synthetic construct
SEQUENCE: 57
DIFGTAVHIS L                                                            11

SEQ ID NO: 58          moltype = AA  length = 111
FEATURE                Location/Qualifiers
REGION                 1..111
                       note = synthetic construct
source                 1..111
                       mol_type = protein
                       organism = synthetic construct
SEQUENCE: 58
ADVVMTQTPS SVSEPVGGTV TIKCQASQSI YSYLSWYQQK PGQPPKLLIY EASKLASGVP        60
SRFKGSGSGT QFTLTISGVE CADAATYYCQ QGYSSSNVDN TFGGGTEVVV T                111

SEQ ID NO: 59          moltype = AA  length = 11
FEATURE                Location/Qualifiers
REGION                 1..11
                       note = synthetic construct
source                 1..11
                       mol_type = protein
                       organism = synthetic construct
SEQUENCE: 59
QASQSIYSYL S                                                            11

SEQ ID NO: 60          moltype = AA  length = 7
FEATURE                Location/Qualifiers
REGION                 1..7
                       note = synthetic construct
source                 1..7
                       mol_type = protein
                       organism = synthetic construct
SEQUENCE: 60
EASKLAS                                                                 7

SEQ ID NO: 61          moltype = AA  length = 12
FEATURE                Location/Qualifiers
REGION                 1..12
```

```
                        note = synthetic construct
source                  1..12
                        mol_type = protein
                        organism = synthetic construct
SEQUENCE: 61
QQGYSSSNVD NT                                                              12

SEQ ID NO: 62           moltype = AA  length = 119
FEATURE                 Location/Qualifiers
REGION                  1..119
                        note = synthetic construct
source                  1..119
                        mol_type = protein
                        organism = synthetic construct
SEQUENCE: 62
QCQSVEESGG RLVTPGTPLT LTCTVSGIDL SIYAMGWVRQ APGKGLEYIG IIDTTGTAYY           60
ARWAKGRFTI SKTSATVALK ITSPTTEDTA TYFCARDSGS LYYGSYALWG PGTLVTVSS            119

SEQ ID NO: 63           moltype = AA  length = 10
FEATURE                 Location/Qualifiers
REGION                  1..10
                        note = synthetic construct
source                  1..10
                        mol_type = protein
                        organism = synthetic construct
SEQUENCE: 63
GIDLSIYAMG                                                                 10

SEQ ID NO: 64           moltype = AA  length = 16
FEATURE                 Location/Qualifiers
REGION                  1..16
                        note = synthetic construct
source                  1..16
                        mol_type = protein
                        organism = synthetic construct
SEQUENCE: 64
IIDTTGTAYY ARWAKG                                                          16

SEQ ID NO: 65           moltype = AA  length = 12
FEATURE                 Location/Qualifiers
REGION                  1..12
                        note = synthetic construct
source                  1..12
                        mol_type = protein
                        organism = synthetic construct
SEQUENCE: 65
DSGSLYYGSY AL                                                              12

SEQ ID NO: 66           moltype = AA  length = 109
FEATURE                 Location/Qualifiers
REGION                  1..109
                        note = synthetic construct
source                  1..109
                        mol_type = protein
                        organism = synthetic construct
SEQUENCE: 66
EIVMTQSPGT LSLSPGERAT LSCRASQSIS SGYLAWYQQK PGQAPRLLIY GASSRATGIP           60
DRFSGSGSGT DFTLTISRLE PEDFATYYCL QFKSFPLTFG QGTKLEIKR                      109

SEQ ID NO: 67           moltype = AA  length = 12
FEATURE                 Location/Qualifiers
REGION                  1..12
                        note = synthetic construct
source                  1..12
                        mol_type = protein
                        organism = synthetic construct
SEQUENCE: 67
RASQSISSGY LA                                                              12

SEQ ID NO: 68           moltype = AA  length = 7
FEATURE                 Location/Qualifiers
REGION                  1..7
                        note = synthetic construct
source                  1..7
                        mol_type = protein
                        organism = synthetic construct
SEQUENCE: 68
GASSRAT                                                                    7
```

```
SEQ ID NO: 69              moltype = AA   length = 9
FEATURE                    Location/Qualifiers
REGION                     1..9
                           note = synthetic construct
source                     1..9
                           mol_type = protein
                           organism = synthetic construct
SEQUENCE: 69
LQFKSFPLT                                                                9

SEQ ID NO: 70              moltype = AA   length = 119
FEATURE                    Location/Qualifiers
REGION                     1..119
                           note = synthetic construct
source                     1..119
                           mol_type = protein
                           organism = synthetic construct
SEQUENCE: 70
QVQLVQSGAE VKKPGSSVKV SCKASGGTFS SYAISWVRQA PGQGLEWMGG IIPIFGTANY      60
AQKFQGRVTI TADESTSTAY MELSSLRSED TAVYYCARDG GDYGDMGYWG QGTLVTVSS      119

SEQ ID NO: 71              moltype = AA   length = 10
FEATURE                    Location/Qualifiers
REGION                     1..10
                           note = synthetic construct
source                     1..10
                           mol_type = protein
                           organism = synthetic construct
SEQUENCE: 71
GGTFSSYAIS                                                              10

SEQ ID NO: 72              moltype = AA   length = 17
FEATURE                    Location/Qualifiers
REGION                     1..17
                           note = synthetic construct
source                     1..17
                           mol_type = protein
                           organism = synthetic construct
SEQUENCE: 72
GIIPIFGTAN YAQKFQG                                                      17

SEQ ID NO: 73              moltype = AA   length = 10
FEATURE                    Location/Qualifiers
REGION                     1..10
                           note = synthetic construct
source                     1..10
                           mol_type = protein
                           organism = synthetic construct
SEQUENCE: 73
DGGDYGDMGY                                                              10

SEQ ID NO: 74              moltype = AA   length = 114
FEATURE                    Location/Qualifiers
REGION                     1..114
                           note = synthetic construct
source                     1..114
                           mol_type = protein
                           organism = synthetic construct
SEQUENCE: 74
EIVMTQSPDS LAVSLGERAT INCKSSQSVL YRSNSKSYLA WYQQKPGQPP KLLIYWASTR      60
ESGVPDRFSG SGSGTDFTLT ISSLQAEDVA VYYCQQYYST PGSFGPGTKV EIKR           114

SEQ ID NO: 75              moltype = AA   length = 17
FEATURE                    Location/Qualifiers
REGION                     1..17
                           note = synthetic construct
source                     1..17
                           mol_type = protein
                           organism = synthetic construct
SEQUENCE: 75
KSSQSVLYRS NSKSYLA                                                      17

SEQ ID NO: 76              moltype = AA   length = 7
FEATURE                    Location/Qualifiers
REGION                     1..7
                           note = synthetic construct
source                     1..7
                           mol_type = protein
                           organism = synthetic construct
```

```
SEQUENCE: 76
WASTRES                                                                              7

SEQ ID NO: 77           moltype = AA  length = 9
FEATURE                 Location/Qualifiers
REGION                  1..9
                        note = synthetic construct
source                  1..9
                        mol_type = protein
                        organism = synthetic construct
SEQUENCE: 77
QQYYSTPGS                                                                            9

SEQ ID NO: 78           moltype = AA  length = 126
FEATURE                 Location/Qualifiers
REGION                  1..126
                        note = synthetic construct
source                  1..126
                        mol_type = protein
                        organism = synthetic construct
SEQUENCE: 78
EVQLLESGGG LVQPGGSLRL SCAASGFTFS SYAMSWVRQA PGKGLEWVSA ISQSGGSTYY                    60
ADSVKGRFTI SRDNSKNTLY LQMNSLRAED TAVYYCARHP ERGSRRGPYY YYMDVWGKGT                   120
TVTVSS                                                                             126

SEQ ID NO: 79           moltype = AA  length = 10
FEATURE                 Location/Qualifiers
REGION                  1..10
                        note = synthetic construct
source                  1..10
                        mol_type = protein
                        organism = synthetic construct
SEQUENCE: 79
GFTFSSYAMS                                                                          10

SEQ ID NO: 80           moltype = AA  length = 17
FEATURE                 Location/Qualifiers
REGION                  1..17
                        note = synthetic construct
source                  1..17
                        mol_type = protein
                        organism = synthetic construct
SEQUENCE: 80
AISQSGGSTY YADSVKG                                                                  17

SEQ ID NO: 81           moltype = AA  length = 17
FEATURE                 Location/Qualifiers
REGION                  1..17
                        note = synthetic construct
source                  1..17
                        mol_type = protein
                        organism = synthetic construct
SEQUENCE: 81
HPERGSRRGP YYYYMDV                                                                  17

SEQ ID NO: 82           moltype = AA  length = 109
FEATURE                 Location/Qualifiers
REGION                  1..109
                        note = synthetic construct
source                  1..109
                        mol_type = protein
                        organism = synthetic construct
SEQUENCE: 82
DIQLTQSPSS LSASLGDRVT ITCRASQGIS SWLAWYQQKP GKAPKLLIYA ASTLQSGVPS                    60
RFSGSGSGTD FTLTISSLQP EDVATYYCQQ YDYSPWAFG QGTKLEIKR                               109

SEQ ID NO: 83           moltype = AA  length = 11
FEATURE                 Location/Qualifiers
REGION                  1..11
                        note = synthetic construct
source                  1..11
                        mol_type = protein
                        organism = synthetic construct
SEQUENCE: 83
RASQGISSWL A                                                                        11

SEQ ID NO: 84           moltype = AA  length = 7
FEATURE                 Location/Qualifiers
REGION                  1..7
```

```
                       note = synthetic construct
source                 1..7
                       mol_type = protein
                       organism = synthetic construct
SEQUENCE: 84
AASTLQS                                                                    7

SEQ ID NO: 85          moltype = AA  length = 10
FEATURE                Location/Qualifiers
REGION                 1..10
                       note = synthetic construct
source                 1..10
                       mol_type = protein
                       organism = synthetic construct
SEQUENCE: 85
QQYYDYSPWA                                                                10

SEQ ID NO: 86          moltype = AA  length = 125
FEATURE                Location/Qualifiers
REGION                 1..125
                       note = synthetic construct
source                 1..125
                       mol_type = protein
                       organism = synthetic construct
SEQUENCE: 86
EVQLLESGGG LVQPGGSLRL SCAASGFTFS SYAMSWVRQA PGKGLEWVSA ISGSGGSTYY           60
ADSVKGRFTI SRDNSKNTLY LQMNSLRAED TAVYYCARGL SLLYYDLSEN YFDYWGQGTT          120
VTVSS                                                                    125

SEQ ID NO: 87          moltype = AA  length = 10
FEATURE                Location/Qualifiers
REGION                 1..10
                       note = synthetic construct
source                 1..10
                       mol_type = protein
                       organism = synthetic construct
SEQUENCE: 87
GFTFSSYAMS                                                                10

SEQ ID NO: 88          moltype = AA  length = 17
FEATURE                Location/Qualifiers
REGION                 1..17
                       note = synthetic construct
source                 1..17
                       mol_type = protein
                       organism = synthetic construct
SEQUENCE: 88
AISGSGGSTY YADSVKG                                                        17

SEQ ID NO: 89          moltype = AA  length = 16
FEATURE                Location/Qualifiers
REGION                 1..16
                       note = synthetic construct
source                 1..16
                       mol_type = protein
                       organism = synthetic construct
SEQUENCE: 89
GLSLLYYDLS ENYFDY                                                         16

SEQ ID NO: 90          moltype = AA  length = 11
FEATURE                Location/Qualifiers
REGION                 1..11
                       note = synthetic construct
source                 1..11
                       mol_type = protein
                       organism = synthetic construct
SEQUENCE: 90
QASQSIYSYL S                                                              11

SEQ ID NO: 91          moltype = AA  length = 7
FEATURE                Location/Qualifiers
REGION                 1..7
                       note = synthetic construct
source                 1..7
                       mol_type = protein
                       organism = synthetic construct
SEQUENCE: 91
EASKLAS                                                                    7
```

```
SEQ ID NO: 92           moltype = AA  length = 12
FEATURE                 Location/Qualifiers
REGION                  1..12
                        note = synthetic construct
source                  1..12
                        mol_type = protein
                        organism = synthetic construct
SEQUENCE: 92
QQGYSSSNVD NT                                                                       12

SEQ ID NO: 93           moltype = AA  length = 10
FEATURE                 Location/Qualifiers
REGION                  1..10
                        note = synthetic construct
source                  1..10
                        mol_type = protein
                        organism = synthetic construct
SEQUENCE: 93
GIDLSIYAMG                                                                          10

SEQ ID NO: 94           moltype = AA  length = 16
FEATURE                 Location/Qualifiers
REGION                  1..16
                        note = synthetic construct
source                  1..16
                        mol_type = protein
                        organism = synthetic construct
SEQUENCE: 94
IIDTTGTAYY ARWAKG                                                                   16

SEQ ID NO: 95           moltype = AA  length = 12
FEATURE                 Location/Qualifiers
REGION                  1..12
                        note = synthetic construct
source                  1..12
                        mol_type = protein
                        organism = synthetic construct
SEQUENCE: 95
DSGSLYYGSY AL                                                                       12

SEQ ID NO: 96           moltype = AA  length = 11
FEATURE                 Location/Qualifiers
REGION                  1..11
                        note = synthetic construct
source                  1..11
                        mol_type = protein
                        organism = synthetic construct
SEQUENCE: 96
QASESIYSSL A                                                                        11

SEQ ID NO: 97           moltype = AA  length = 7
FEATURE                 Location/Qualifiers
REGION                  1..7
                        note = synthetic construct
source                  1..7
                        mol_type = protein
                        organism = synthetic construct
SEQUENCE: 97
GASTLAS                                                                              7

SEQ ID NO: 98           moltype = AA  length = 13
FEATURE                 Location/Qualifiers
REGION                  1..13
                        note = synthetic construct
source                  1..13
                        mol_type = protein
                        organism = synthetic construct
SEQUENCE: 98
QCHYHGSSYW DNS                                                                      13

SEQ ID NO: 99           moltype = AA  length = 11
FEATURE                 Location/Qualifiers
REGION                  1..11
                        note = synthetic construct
source                  1..11
                        mol_type = protein
                        organism = synthetic construct
SEQUENCE: 99
GFSFSSSYWI C                                                                        11
```

```
SEQ ID NO: 100          moltype = AA   length = 17
FEATURE                 Location/Qualifiers
REGION                  1..17
                        note = synthetic construct
source                  1..17
                        mol_type = protein
                        organism = synthetic construct
SEQUENCE: 100
CTDTFSGDTY YASWAKG                                              17

SEQ ID NO: 101          moltype = AA   length = 11
FEATURE                 Location/Qualifiers
REGION                  1..11
                        note = synthetic construct
source                  1..11
                        mol_type = protein
                        organism = synthetic construct
SEQUENCE: 101
DIFGTAVHIS L                                                    11

SEQ ID NO: 102          moltype = AA   length = 11
FEATURE                 Location/Qualifiers
REGION                  1..11
                        note = synthetic construct
source                  1..11
                        mol_type = protein
                        organism = synthetic construct
SEQUENCE: 102
QASESIYSSL A                                                    11

SEQ ID NO: 103          moltype = AA   length = 7
FEATURE                 Location/Qualifiers
REGION                  1..7
                        note = synthetic construct
source                  1..7
                        mol_type = protein
                        organism = synthetic construct
SEQUENCE: 103
GASTLAS                                                          7

SEQ ID NO: 104          moltype = AA   length = 13
FEATURE                 Location/Qualifiers
REGION                  1..13
                        note = synthetic construct
source                  1..13
                        mol_type = protein
                        organism = synthetic construct
SEQUENCE: 104
QCHYGSSYW DNS                                                   13

SEQ ID NO: 105          moltype = AA   length = 11
FEATURE                 Location/Qualifiers
REGION                  1..11
                        note = synthetic construct
source                  1..11
                        mol_type = protein
                        organism = synthetic construct
SEQUENCE: 105
GFSFSSSYWI C                                                    11

SEQ ID NO: 106          moltype = AA   length = 17
FEATURE                 Location/Qualifiers
REGION                  1..17
                        note = synthetic construct
source                  1..17
                        mol_type = protein
                        organism = synthetic construct
SEQUENCE: 106
CTDTFSGDTY YASWAKG                                              17

SEQ ID NO: 107          moltype = AA   length = 11
FEATURE                 Location/Qualifiers
REGION                  1..11
                        note = synthetic construct
source                  1..11
                        mol_type = protein
                        organism = synthetic construct
SEQUENCE: 107
```

-continued

```
DIFGTAVHIS L                                                           11

SEQ ID NO: 108        moltype = AA  length = 11
FEATURE               Location/Qualifiers
REGION                1..11
                      note = synthetic construct
source                1..11
                      mol_type = protein
                      organism = synthetic construct
SEQUENCE: 108
QASQSIGSSL A                                                           11

SEQ ID NO: 109        moltype = AA  length = 7
FEATURE               Location/Qualifiers
REGION                1..7
                      note = synthetic construct
source                1..7
                      mol_type = protein
                      organism = synthetic construct
SEQUENCE: 109
GASTLAS                                                                7

SEQ ID NO: 110        moltype = AA  length = 13
FEATURE               Location/Qualifiers
REGION                1..13
                      note = synthetic construct
source                1..13
                      mol_type = protein
                      organism = synthetic construct
SEQUENCE: 110
QCHYGSSYW DNS                                                          13

SEQ ID NO: 111        moltype = AA  length = 11
FEATURE               Location/Qualifiers
REGION                1..11
                      note = synthetic construct
source                1..11
                      mol_type = protein
                      organism = synthetic construct
SEQUENCE: 111
GFSFSSSYWI C                                                           11

SEQ ID NO: 112        moltype = AA  length = 17
FEATURE               Location/Qualifiers
REGION                1..17
                      note = synthetic construct
source                1..17
                      mol_type = protein
                      organism = synthetic construct
SEQUENCE: 112
CTDTFSGDTY YASWAKG                                                     17

SEQ ID NO: 113        moltype = AA  length = 11
FEATURE               Location/Qualifiers
REGION                1..11
                      note = synthetic construct
source                1..11
                      mol_type = protein
                      organism = synthetic construct
SEQUENCE: 113
DIFGTAVHIS L                                                           11

SEQ ID NO: 114        moltype = AA  length = 11
FEATURE               Location/Qualifiers
REGION                1..11
                      note = synthetic construct
source                1..11
                      mol_type = protein
                      organism = synthetic construct
SEQUENCE: 114
QASESIYSSL A                                                           11

SEQ ID NO: 115        moltype = AA  length = 7
FEATURE               Location/Qualifiers
REGION                1..7
                      note = synthetic construct
source                1..7
                      mol_type = protein
                      organism = synthetic construct
```

```
SEQUENCE: 115
GASTLAS                                                              7

SEQ ID NO: 116          moltype = AA  length = 13
FEATURE                 Location/Qualifiers
REGION                  1..13
                        note = synthetic construct
source                  1..13
                        mol_type = protein
                        organism = synthetic construct
SEQUENCE: 116
QCHYHGSSYW DNS                                                      13

SEQ ID NO: 117          moltype = AA  length = 11
FEATURE                 Location/Qualifiers
REGION                  1..11
                        note = synthetic construct
source                  1..11
                        mol_type = protein
                        organism = synthetic construct
SEQUENCE: 117
GFSFSSSYWI C                                                        11

SEQ ID NO: 118          moltype = AA  length = 17
FEATURE                 Location/Qualifiers
REGION                  1..17
                        note = synthetic construct
source                  1..17
                        mol_type = protein
                        organism = synthetic construct
SEQUENCE: 118
CTDTFSGDTY YASWAKG                                                  17

SEQ ID NO: 119          moltype = AA  length = 11
FEATURE                 Location/Qualifiers
REGION                  1..11
                        note = synthetic construct
source                  1..11
                        mol_type = protein
                        organism = synthetic construct
SEQUENCE: 119
DIFGTAVHIS L                                                        11

SEQ ID NO: 120          moltype = AA  length = 11
FEATURE                 Location/Qualifiers
REGION                  1..11
                        note = synthetic construct
source                  1..11
                        mol_type = protein
                        organism = synthetic construct
SEQUENCE: 120
QASQSISSYL A                                                        11

SEQ ID NO: 121          moltype = AA  length = 7
FEATURE                 Location/Qualifiers
REGION                  1..7
                        note = synthetic construct
source                  1..7
                        mol_type = protein
                        organism = synthetic construct
SEQUENCE: 121
GASTLAS                                                              7

SEQ ID NO: 122          moltype = AA  length = 13
FEATURE                 Location/Qualifiers
REGION                  1..13
                        note = synthetic construct
source                  1..13
                        mol_type = protein
                        organism = synthetic construct
SEQUENCE: 122
QCHYHGSSYW DNS                                                      13

SEQ ID NO: 123          moltype = AA  length = 11
FEATURE                 Location/Qualifiers
REGION                  1..11
                        note = synthetic construct
source                  1..11
                        mol_type = protein
```

-continued

```
                          organism = synthetic construct
SEQUENCE: 123
GFSFSSSYWI C                                                        11

SEQ ID NO: 124            moltype = AA   length = 17
FEATURE                   Location/Qualifiers
REGION                    1..17
                          note = synthetic construct
source                    1..17
                          mol_type = protein
                          organism = synthetic construct
SEQUENCE: 124
CTDTFSGDTY YASWAKG                                                  17

SEQ ID NO: 125            moltype = AA   length = 11
FEATURE                   Location/Qualifiers
REGION                    1..11
                          note = synthetic construct
source                    1..11
                          mol_type = protein
                          organism = synthetic construct
SEQUENCE: 125
DIFGTAVHIS L                                                        11

SEQ ID NO: 126            moltype = AA   length = 11
FEATURE                   Location/Qualifiers
REGION                    1..11
                          note = synthetic construct
source                    1..11
                          mol_type = protein
                          organism = synthetic construct
SEQUENCE: 126
QASQSISSYL A                                                        11

SEQ ID NO: 127            moltype = AA   length = 7
FEATURE                   Location/Qualifiers
REGION                    1..7
                          note = synthetic construct
source                    1..7
                          mol_type = protein
                          organism = synthetic construct
SEQUENCE: 127
GASTLAS                                                              7

SEQ ID NO: 128            moltype = AA   length = 14
FEATURE                   Location/Qualifiers
REGION                    1..14
                          note = synthetic construct
source                    1..14
                          mol_type = protein
                          organism = synthetic construct
SEQUENCE: 128
QSAVYSSSSG YGVP                                                     14

SEQ ID NO: 129            moltype = AA   length = 10
FEATURE                   Location/Qualifiers
REGION                    1..10
                          note = synthetic construct
source                    1..10
                          mol_type = protein
                          organism = synthetic construct
SEQUENCE: 129
GFSLSSYDMS                                                          10

SEQ ID NO: 130            moltype = AA   length = 16
FEATURE                   Location/Qualifiers
REGION                    1..16
                          note = synthetic construct
source                    1..16
                          mol_type = protein
                          organism = synthetic construct
SEQUENCE: 130
IIDSIGSIWY ANWAKG                                                   16

SEQ ID NO: 131            moltype = AA   length = 11
FEATURE                   Location/Qualifiers
REGION                    1..11
                          note = synthetic construct
source                    1..11
```

```
                          mol_type = protein
                          organism = synthetic construct
SEQUENCE: 131
ESGPINTDYD L                                                              11

SEQ ID NO: 132            moltype = AA   length = 13
FEATURE                   Location/Qualifiers
REGION                    1..13
                          note = synthetic construct
source                    1..13
                          mol_type = protein
                          organism = synthetic construct
SEQUENCE: 132
QTSESFYSNN ILS                                                            13

SEQ ID NO: 133            moltype = AA   length = 7
FEATURE                   Location/Qualifiers
REGION                    1..7
                          note = synthetic construct
source                    1..7
                          mol_type = protein
                          organism = synthetic construct
SEQUENCE: 133
EASKLAS                                                                   7

SEQ ID NO: 134            moltype = AA   length = 12
FEATURE                   Location/Qualifiers
REGION                    1..12
                          note = synthetic construct
source                    1..12
                          mol_type = protein
                          organism = synthetic construct
SEQUENCE: 134
QSAIYDGSYI VT                                                             12

SEQ ID NO: 135            moltype = AA   length = 10
FEATURE                   Location/Qualifiers
REGION                    1..10
                          note = synthetic construct
source                    1..10
                          mol_type = protein
                          organism = synthetic construct
SEQUENCE: 135
GFSLSSYDMS                                                                10

SEQ ID NO: 136            moltype = AA   length = 16
FEATURE                   Location/Qualifiers
REGION                    1..16
                          note = synthetic construct
source                    1..16
                          mol_type = protein
                          organism = synthetic construct
SEQUENCE: 136
IIDSIGSIWY ANWAKG                                                         16

SEQ ID NO: 137            moltype = AA   length = 11
FEATURE                   Location/Qualifiers
REGION                    1..11
                          note = synthetic construct
source                    1..11
                          mol_type = protein
                          organism = synthetic construct
SEQUENCE: 137
ESGPINTDYD L                                                              11

SEQ ID NO: 138            moltype = AA   length = 11
FEATURE                   Location/Qualifiers
REGION                    1..11
                          note = synthetic construct
source                    1..11
                          mol_type = protein
                          organism = synthetic construct
SEQUENCE: 138
QASQSISSYL A                                                              11

SEQ ID NO: 139            moltype = AA   length = 7
FEATURE                   Location/Qualifiers
REGION                    1..7
                          note = synthetic construct
```

```
source                    1..7
                          mol_type = protein
                          organism = synthetic construct
SEQUENCE: 139
GASTLAS                                                                   7

SEQ ID NO: 140            moltype = AA   length = 14
FEATURE                   Location/Qualifiers
REGION                    1..14
                          note = synthetic construct
source                    1..14
                          mol_type = protein
                          organism = synthetic construct
SEQUENCE: 140
QSAVYSSSSG YGVP                                                          14

SEQ ID NO: 141            moltype = AA   length = 10
FEATURE                   Location/Qualifiers
REGION                    1..10
                          note = synthetic construct
source                    1..10
                          mol_type = protein
                          organism = synthetic construct
SEQUENCE: 141
GFSLSSYDMS                                                               10

SEQ ID NO: 142            moltype = AA   length = 16
FEATURE                   Location/Qualifiers
REGION                    1..16
                          note = synthetic construct
source                    1..16
                          mol_type = protein
                          organism = synthetic construct
SEQUENCE: 142
IIDSIGSIWY ANWAKG                                                        16

SEQ ID NO: 143            moltype = AA   length = 11
FEATURE                   Location/Qualifiers
REGION                    1..11
                          note = synthetic construct
source                    1..11
                          mol_type = protein
                          organism = synthetic construct
SEQUENCE: 143
ESGPINTDYD L                                                             11

SEQ ID NO: 144            moltype = AA   length = 11
FEATURE                   Location/Qualifiers
REGION                    1..11
                          note = synthetic construct
source                    1..11
                          mol_type = protein
                          organism = synthetic construct
SEQUENCE: 144
QASQSISSYL A                                                             11

SEQ ID NO: 145            moltype = AA   length = 7
FEATURE                   Location/Qualifiers
REGION                    1..7
                          note = synthetic construct
source                    1..7
                          mol_type = protein
                          organism = synthetic construct
SEQUENCE: 145
GASTLAS                                                                   7

SEQ ID NO: 146            moltype = AA   length = 14
FEATURE                   Location/Qualifiers
REGION                    1..14
                          note = synthetic construct
source                    1..14
                          mol_type = protein
                          organism = synthetic construct
SEQUENCE: 146
QSAVYSSSSG YGVP                                                          14

SEQ ID NO: 147            moltype = AA   length = 10
FEATURE                   Location/Qualifiers
REGION                    1..10
```

```
                        note = synthetic construct
source                  1..10
                        mol_type = protein
                        organism = synthetic construct
SEQUENCE: 147
GFSLSSYDMS                                                             10

SEQ ID NO: 148          moltype = AA   length = 16
FEATURE                 Location/Qualifiers
REGION                  1..16
                        note = synthetic construct
source                  1..16
                        mol_type = protein
                        organism = synthetic construct
SEQUENCE: 148
IIDSIGSIWY ANWAKG                                                      16

SEQ ID NO: 149          moltype = AA   length = 11
FEATURE                 Location/Qualifiers
REGION                  1..11
                        note = synthetic construct
source                  1..11
                        mol_type = protein
                        organism = synthetic construct
SEQUENCE: 149
ESGPINTDYD L                                                           11

SEQ ID NO: 150          moltype = AA   length = 11
FEATURE                 Location/Qualifiers
REGION                  1..11
                        note = synthetic construct
source                  1..11
                        mol_type = protein
                        organism = synthetic construct
SEQUENCE: 150
QASESISSYL A                                                           11

SEQ ID NO: 151          moltype = AA   length = 7
FEATURE                 Location/Qualifiers
REGION                  1..7
                        note = synthetic construct
source                  1..7
                        mol_type = protein
                        organism = synthetic construct
SEQUENCE: 151
GASTLAS                                                                 7

SEQ ID NO: 152          moltype = AA   length = 10
FEATURE                 Location/Qualifiers
REGION                  1..10
                        note = synthetic construct
source                  1..10
                        mol_type = protein
                        organism = synthetic construct
SEQUENCE: 152
QGYFGDYIYG                                                             10

SEQ ID NO: 153          moltype = AA   length = 10
FEATURE                 Location/Qualifiers
REGION                  1..10
                        note = synthetic construct
source                  1..10
                        mol_type = protein
                        organism = synthetic construct
SEQUENCE: 153
GFSLTSYAMS                                                             10

SEQ ID NO: 154          moltype = AA   length = 16
FEATURE                 Location/Qualifiers
REGION                  1..16
                        note = synthetic construct
source                  1..16
                        mol_type = protein
                        organism = synthetic construct
SEQUENCE: 154
IIGSPGTTGY ATWAKG                                                      16

SEQ ID NO: 155          moltype = AA   length = 9
FEATURE                 Location/Qualifiers
```

```
REGION                    1..9
                          note = synthetic construct
source                    1..9
                          mol_type = protein
                          organism = synthetic construct
SEQUENCE: 155
GWFYYGMAL                                                                  9

SEQ ID NO: 156            moltype = AA  length = 8
FEATURE                   Location/Qualifiers
REGION                    1..8
                          note = synthetic construct
SITE                      2
                          note = misc_feature - Xaa can be any naturally occurring
                           amino acid
source                    1..8
                          mol_type = protein
                          organism = synthetic construct
SEQUENCE: 156
PXQEHLTP                                                                   8

SEQ ID NO: 157            moltype = AA  length = 7
FEATURE                   Location/Qualifiers
REGION                    1..7
                          note = synthetic construct
SITE                      7
                          note = misc_feature - Xaa can be any naturally occurring
                           amino acid
source                    1..7
                          mol_type = protein
                          organism = synthetic construct
SEQUENCE: 157
GASTLAX                                                                    7

SEQ ID NO: 158            moltype = AA  length = 10
FEATURE                   Location/Qualifiers
REGION                    1..10
                          note = synthetic construct
source                    1..10
                          mol_type = protein
                          organism = synthetic construct
SEQUENCE: 158
QGYFGDYIYG                                                                10

SEQ ID NO: 159            moltype = AA  length = 10
FEATURE                   Location/Qualifiers
REGION                    1..10
                          note = synthetic construct
source                    1..10
                          mol_type = protein
                          organism = synthetic construct
SEQUENCE: 159
GFSLTSYAMS                                                                10

SEQ ID NO: 160            moltype = AA  length = 16
FEATURE                   Location/Qualifiers
REGION                    1..16
                          note = synthetic construct
source                    1..16
                          mol_type = protein
                          organism = synthetic construct
SEQUENCE: 160
IIGSPGTTGY ATWAKG                                                         16

SEQ ID NO: 161            moltype = AA  length = 9
FEATURE                   Location/Qualifiers
REGION                    1..9
                          note = synthetic construct
source                    1..9
                          mol_type = protein
                          organism = synthetic construct
SEQUENCE: 161
GWFYYGMAL                                                                  9

SEQ ID NO: 162            moltype = AA  length = 11
FEATURE                   Location/Qualifiers
REGION                    1..11
                          note = synthetic construct
source                    1..11
```

```
                        mol_type = protein
                        organism = synthetic construct
SEQUENCE: 162
QASESISSYL A                                                            11

SEQ ID NO: 163          moltype = AA  length = 7
FEATURE                 Location/Qualifiers
REGION                  1..7
                        note = synthetic construct
source                  1..7
                        mol_type = protein
                        organism = synthetic construct
SEQUENCE: 163
GASTLAS                                                                 7

SEQ ID NO: 164          moltype = AA  length = 10
FEATURE                 Location/Qualifiers
REGION                  1..10
                        note = synthetic construct
source                  1..10
                        mol_type = protein
                        organism = synthetic construct
SEQUENCE: 164
QGYFGDYIYG                                                              10

SEQ ID NO: 165          moltype = AA  length = 10
FEATURE                 Location/Qualifiers
REGION                  1..10
                        note = synthetic construct
source                  1..10
                        mol_type = protein
                        organism = synthetic construct
SEQUENCE: 165
GFSLTSYAMS                                                              10

SEQ ID NO: 166          moltype = AA  length = 16
FEATURE                 Location/Qualifiers
REGION                  1..16
                        note = synthetic construct
source                  1..16
                        mol_type = protein
                        organism = synthetic construct
SEQUENCE: 166
IIGSPGTTGY ATWAKG                                                       16

SEQ ID NO: 167          moltype = AA  length = 9
FEATURE                 Location/Qualifiers
REGION                  1..9
                        note = synthetic construct
source                  1..9
                        mol_type = protein
                        organism = synthetic construct
SEQUENCE: 167
GWFYYGMAL                                                               9

SEQ ID NO: 168          moltype = AA  length = 11
FEATURE                 Location/Qualifiers
REGION                  1..11
                        note = synthetic construct
source                  1..11
                        mol_type = protein
                        organism = synthetic construct
SEQUENCE: 168
QASESISSYL A                                                            11

SEQ ID NO: 169          moltype = AA  length = 7
FEATURE                 Location/Qualifiers
REGION                  1..7
                        note = synthetic construct
source                  1..7
                        mol_type = protein
                        organism = synthetic construct
SEQUENCE: 169
GASTLAS                                                                 7

SEQ ID NO: 170          moltype = AA  length = 10
FEATURE                 Location/Qualifiers
REGION                  1..10
                        note = synthetic construct
```

```
                               -continued source                 1..10
                       mol_type = protein
                       organism = synthetic construct
SEQUENCE: 170
QGYFGDYIYG                                                              10

SEQ ID NO: 171         moltype = AA   length = 10
FEATURE                Location/Qualifiers
REGION                 1..10
                       note = synthetic construct
source                 1..10
                       mol_type = protein
                       organism = synthetic construct
SEQUENCE: 171
GFSLTSYAMS                                                              10

SEQ ID NO: 172         moltype = AA   length = 16
FEATURE                Location/Qualifiers
REGION                 1..16
                       note = synthetic construct
source                 1..16
                       mol_type = protein
                       organism = synthetic construct
SEQUENCE: 172
IIGSPGTTGY ATWAKG                                                       16

SEQ ID NO: 173         moltype = AA   length = 9
FEATURE                Location/Qualifiers
REGION                 1..9
                       note = synthetic construct
source                 1..9
                       mol_type = protein
                       organism = synthetic construct
SEQUENCE: 173
GWFYYGMAL                                                                9

SEQ ID NO: 174         moltype = AA   length = 11
FEATURE                Location/Qualifiers
REGION                 1..11
                       note = synthetic construct
source                 1..11
                       mol_type = protein
                       organism = synthetic construct
SEQUENCE: 174
QASESISSYL A                                                            11

SEQ ID NO: 175         moltype = AA   length = 7
FEATURE                Location/Qualifiers
REGION                 1..7
                       note = synthetic construct
source                 1..7
                       mol_type = protein
                       organism = synthetic construct
SEQUENCE: 175
GASTLAS                                                                  7

SEQ ID NO: 176         moltype = AA   length = 10
FEATURE                Location/Qualifiers
REGION                 1..10
                       note = synthetic construct
source                 1..10
                       mol_type = protein
                       organism = synthetic construct
SEQUENCE: 176
QGYFGDYIYG                                                              10

SEQ ID NO: 177         moltype = AA   length = 10
FEATURE                Location/Qualifiers
REGION                 1..10
                       note = synthetic construct
source                 1..10
                       mol_type = protein
                       organism = synthetic construct
SEQUENCE: 177
GFSLTSYAMS                                                              10

SEQ ID NO: 178         moltype = AA   length = 16
FEATURE                Location/Qualifiers
REGION                 1..16
```

```
                    note = synthetic construct
source              1..16
                    mol_type = protein
                    organism = synthetic construct
SEQUENCE: 178
IIGSPGTTGY ATWAKG                                           16

SEQ ID NO: 179      moltype = AA  length = 9
FEATURE             Location/Qualifiers
REGION              1..9
                    note = synthetic construct
source              1..9
                    mol_type = protein
                    organism = synthetic construct
SEQUENCE: 179
GWFYYGMAL                                                    9

SEQ ID NO: 180      moltype = AA  length = 11
FEATURE             Location/Qualifiers
REGION              1..11
                    note = synthetic construct
source              1..11
                    mol_type = protein
                    organism = synthetic construct
SEQUENCE: 180
QASESISSYL A                                                11

SEQ ID NO: 181      moltype = AA  length = 7
FEATURE             Location/Qualifiers
REGION              1..7
                    note = synthetic construct
source              1..7
                    mol_type = protein
                    organism = synthetic construct
SEQUENCE: 181
GASTLAS                                                      7

SEQ ID NO: 182      moltype = AA  length = 10
FEATURE             Location/Qualifiers
REGION              1..10
                    note = synthetic construct
source              1..10
                    mol_type = protein
                    organism = synthetic construct
SEQUENCE: 182
QGYFGDYIYG                                                  10

SEQ ID NO: 183      moltype = AA  length = 10
FEATURE             Location/Qualifiers
REGION              1..10
                    note = synthetic construct
source              1..10
                    mol_type = protein
                    organism = synthetic construct
SEQUENCE: 183
GFSLTSYAMS                                                  10

SEQ ID NO: 184      moltype = AA  length = 16
FEATURE             Location/Qualifiers
REGION              1..16
                    note = synthetic construct
source              1..16
                    mol_type = protein
                    organism = synthetic construct
SEQUENCE: 184
IIGSPGTTGY ATWAKG                                           16

SEQ ID NO: 185      moltype = AA  length = 9
FEATURE             Location/Qualifiers
REGION              1..9
                    note = synthetic construct
source              1..9
                    mol_type = protein
                    organism = synthetic construct
SEQUENCE: 185
GWFYYGMAL                                                    9

SEQ ID NO: 186      moltype = AA  length = 11
FEATURE             Location/Qualifiers
```

```
REGION                  1..11
                        note = synthetic construct
source                  1..11
                        mol_type = protein
                        organism = synthetic construct
SEQUENCE: 186
QASQSISNYL S                                                                11

SEQ ID NO: 187          moltype = AA  length = 7
FEATURE                 Location/Qualifiers
REGION                  1..7
                        note = synthetic construct
source                  1..7
                        mol_type = protein
                        organism = synthetic construct
SEQUENCE: 187
WASNLAS                                                                      7

SEQ ID NO: 188          moltype = AA  length = 13
FEATURE                 Location/Qualifiers
REGION                  1..13
                        note = synthetic construct
source                  1..13
                        mol_type = protein
                        organism = synthetic construct
SEQUENCE: 188
LGEFSCSSAD CFA                                                              13

SEQ ID NO: 189          moltype = AA  length = 10
FEATURE                 Location/Qualifiers
REGION                  1..10
                        note = synthetic construct
source                  1..10
                        mol_type = protein
                        organism = synthetic construct
SEQUENCE: 189
GFDLSNYAMT                                                                  10

SEQ ID NO: 190          moltype = AA  length = 16
FEATURE                 Location/Qualifiers
REGION                  1..16
                        note = synthetic construct
source                  1..16
                        mol_type = protein
                        organism = synthetic construct
SEQUENCE: 190
AIHGSGVTDC ASWTRG                                                           16

SEQ ID NO: 191          moltype = AA  length = 11
FEATURE                 Location/Qualifiers
REGION                  1..11
                        note = synthetic construct
source                  1..11
                        mol_type = protein
                        organism = synthetic construct
SEQUENCE: 191
ESAGINTDYD L                                                                11

SEQ ID NO: 192          moltype = AA  length = 11
FEATURE                 Location/Qualifiers
REGION                  1..11
                        note = synthetic construct
source                  1..11
                        mol_type = protein
                        organism = synthetic construct
SEQUENCE: 192
QASQSISNYL S                                                                11

SEQ ID NO: 193          moltype = AA  length = 7
FEATURE                 Location/Qualifiers
REGION                  1..7
                        note = synthetic construct
source                  1..7
                        mol_type = protein
                        organism = synthetic construct
SEQUENCE: 193
WASNLAS                                                                      7

SEQ ID NO: 194          moltype = AA  length = 13
```

```
FEATURE                 Location/Qualifiers
REGION                  1..13
                        note = synthetic construct
source                  1..13
                        mol_type = protein
                        organism = synthetic construct
SEQUENCE: 194
LGEFSCSSAD CFA                                                           13

SEQ ID NO: 195          moltype = AA  length = 10
FEATURE                 Location/Qualifiers
REGION                  1..10
                        note = synthetic construct
source                  1..10
                        mol_type = protein
                        organism = synthetic construct
SEQUENCE: 195
GFDLSNYAMT                                                               10

SEQ ID NO: 196          moltype = AA  length = 16
FEATURE                 Location/Qualifiers
REGION                  1..16
                        note = synthetic construct
source                  1..16
                        mol_type = protein
                        organism = synthetic construct
SEQUENCE: 196
AIHGSGVTDC ASWTRG                                                        16

SEQ ID NO: 197          moltype = AA  length = 11
FEATURE                 Location/Qualifiers
REGION                  1..11
                        note = synthetic construct
source                  1..11
                        mol_type = protein
                        organism = synthetic construct
SEQUENCE: 197
ESAGINTDYD L                                                             11

SEQ ID NO: 198          moltype = AA  length = 11
FEATURE                 Location/Qualifiers
REGION                  1..11
                        note = synthetic construct
source                  1..11
                        mol_type = protein
                        organism = synthetic construct
SEQUENCE: 198
QASKSIGSYL S                                                             11

SEQ ID NO: 199          moltype = AA  length = 7
FEATURE                 Location/Qualifiers
REGION                  1..7
                        note = synthetic construct
source                  1..7
                        mol_type = protein
                        organism = synthetic construct
SEQUENCE: 199
RASTLAS                                                                   7

SEQ ID NO: 200          moltype = AA  length = 10
FEATURE                 Location/Qualifiers
REGION                  1..10
                        note = synthetic construct
source                  1..10
                        mol_type = protein
                        organism = synthetic construct
SEQUENCE: 200
QAYYGDYIYD                                                               10

SEQ ID NO: 201          moltype = AA  length = 10
FEATURE                 Location/Qualifiers
REGION                  1..10
                        note = synthetic construct
source                  1..10
                        mol_type = protein
                        organism = synthetic construct
SEQUENCE: 201
GFSLSSYPMS                                                               10
```

```
SEQ ID NO: 202           moltype = AA  length = 16
FEATURE                  Location/Qualifiers
REGION                   1..16
                         note = synthetic construct
source                   1..16
                         mol_type = protein
                         organism = synthetic construct
SEQUENCE: 202
IIGSTGSTGY ANWAKG                                                        16

SEQ ID NO: 203           moltype = AA  length = 9
FEATURE                  Location/Qualifiers
REGION                   1..9
                         note = synthetic construct
source                   1..9
                         mol_type = protein
                         organism = synthetic construct
SEQUENCE: 203
GWFYYGLDL                                                                 9

SEQ ID NO: 204           moltype = AA  length = 11
FEATURE                  Location/Qualifiers
REGION                   1..11
                         note = synthetic construct
source                   1..11
                         mol_type = protein
                         organism = synthetic construct
SEQUENCE: 204
QASQSIGSYL S                                                             11

SEQ ID NO: 205           moltype = AA  length = 7
FEATURE                  Location/Qualifiers
REGION                   1..7
                         note = synthetic construct
source                   1..7
                         mol_type = protein
                         organism = synthetic construct
SEQUENCE: 205
RASTLAS                                                                   7

SEQ ID NO: 206           moltype = AA  length = 10
FEATURE                  Location/Qualifiers
REGION                   1..10
                         note = synthetic construct
source                   1..10
                         mol_type = protein
                         organism = synthetic construct
SEQUENCE: 206
QAYYGDYIYD                                                               10

SEQ ID NO: 207           moltype = AA  length = 10
FEATURE                  Location/Qualifiers
REGION                   1..10
                         note = synthetic construct
source                   1..10
                         mol_type = protein
                         organism = synthetic construct
SEQUENCE: 207
GFSLSSYPMS                                                               10

SEQ ID NO: 208           moltype = AA  length = 16
FEATURE                  Location/Qualifiers
REGION                   1..16
                         note = synthetic construct
source                   1..16
                         mol_type = protein
                         organism = synthetic construct
SEQUENCE: 208
IIGSTGSTGY ANWAKG                                                        16

SEQ ID NO: 209           moltype = AA  length = 9
FEATURE                  Location/Qualifiers
REGION                   1..9
                         note = synthetic construct
source                   1..9
                         mol_type = protein
                         organism = synthetic construct
SEQUENCE: 209
GWFYYGLDL                                                                 9
```

```
SEQ ID NO: 210          moltype = AA   length = 11
FEATURE                 Location/Qualifiers
REGION                  1..11
                        note = synthetic construct
source                  1..11
                        mol_type = protein
                        organism = synthetic construct
SEQUENCE: 210
QASQSIGSYL A                                                              11

SEQ ID NO: 211          moltype = AA   length = 7
FEATURE                 Location/Qualifiers
REGION                  1..7
                        note = synthetic construct
source                  1..7
                        mol_type = protein
                        organism = synthetic construct
SEQUENCE: 211
DASDLAS                                                                    7

SEQ ID NO: 212          moltype = AA   length = 12
FEATURE                 Location/Qualifiers
REGION                  1..12
                        note = synthetic construct
source                  1..12
                        mol_type = protein
                        organism = synthetic construct
SEQUENCE: 212
QSAVYDSSYV VT                                                             12

SEQ ID NO: 213          moltype = AA   length = 10
FEATURE                 Location/Qualifiers
REGION                  1..10
                        note = synthetic construct
source                  1..10
                        mol_type = protein
                        organism = synthetic construct
SEQUENCE: 213
GFSLSSYDMS                                                                10

SEQ ID NO: 214          moltype = AA   length = 16
FEATURE                 Location/Qualifiers
REGION                  1..16
                        note = synthetic construct
source                  1..16
                        mol_type = protein
                        organism = synthetic construct
SEQUENCE: 214
ISDSLGTTWY ANWAKG                                                         16

SEQ ID NO: 215          moltype = AA   length = 11
FEATURE                 Location/Qualifiers
REGION                  1..11
                        note = synthetic construct
source                  1..11
                        mol_type = protein
                        organism = synthetic construct
SEQUENCE: 215
ESGDIRIDYD L                                                              11

SEQ ID NO: 216          moltype = AA   length = 11
FEATURE                 Location/Qualifiers
REGION                  1..11
                        note = synthetic construct
source                  1..11
                        mol_type = protein
                        organism = synthetic construct
SEQUENCE: 216
QASQSIGSYL A                                                              11

SEQ ID NO: 217          moltype = AA   length = 7
FEATURE                 Location/Qualifiers
REGION                  1..7
                        note = synthetic construct
source                  1..7
                        mol_type = protein
                        organism = synthetic construct
SEQUENCE: 217
```

-continued

```
DASDLAS                                                                7

SEQ ID NO: 218        moltype = AA   length = 12
FEATURE               Location/Qualifiers
REGION                1..12
                      note = synthetic construct
source                1..12
                      mol_type = protein
                      organism = synthetic construct
SEQUENCE: 218
QSAVYDSSYV VT                                                          12

SEQ ID NO: 219        moltype = AA   length = 10
FEATURE               Location/Qualifiers
REGION                1..10
                      note = synthetic construct
source                1..10
                      mol_type = protein
                      organism = synthetic construct
SEQUENCE: 219
GFSLSSYDMS                                                             10

SEQ ID NO: 220        moltype = AA   length = 16
FEATURE               Location/Qualifiers
REGION                1..16
                      note = synthetic construct
source                1..16
                      mol_type = protein
                      organism = synthetic construct
SEQUENCE: 220
ISDSLGTTWY ANWAKG                                                      16

SEQ ID NO: 221        moltype = AA   length = 11
FEATURE               Location/Qualifiers
REGION                1..11
                      note = synthetic construct
source                1..11
                      mol_type = protein
                      organism = synthetic construct
SEQUENCE: 221
ESGDIRIDYD L                                                           11

SEQ ID NO: 222        moltype = AA   length = 11
FEATURE               Location/Qualifiers
REGION                1..11
                      note = synthetic construct
source                1..11
                      mol_type = protein
                      organism = synthetic construct
SEQUENCE: 222
QASQSIGSYL A                                                           11

SEQ ID NO: 223        moltype = AA   length = 7
FEATURE               Location/Qualifiers
REGION                1..7
                      note = synthetic construct
source                1..7
                      mol_type = protein
                      organism = synthetic construct
SEQUENCE: 223
DASDLAS                                                                7

SEQ ID NO: 224        moltype = AA   length = 12
FEATURE               Location/Qualifiers
REGION                1..12
                      note = synthetic construct
source                1..12
                      mol_type = protein
                      organism = synthetic construct
SEQUENCE: 224
QSAVYDSSYV VT                                                          12

SEQ ID NO: 225        moltype = AA   length = 10
FEATURE               Location/Qualifiers
REGION                1..10
                      note = synthetic construct
source                1..10
                      mol_type = protein
                      organism = synthetic construct
```

```
SEQUENCE: 225
GFSLSSYDMS                                                                      10

SEQ ID NO: 226          moltype = AA  length = 16
FEATURE                 Location/Qualifiers
REGION                  1..16
                        note = synthetic construct
source                  1..16
                        mol_type = protein
                        organism = synthetic construct
SEQUENCE: 226
ISDSLGTTWY ANWAKG                                                               16

SEQ ID NO: 227          moltype = AA  length = 11
FEATURE                 Location/Qualifiers
REGION                  1..11
                        note = synthetic construct
source                  1..11
                        mol_type = protein
                        organism = synthetic construct
SEQUENCE: 227
ESGDIRIDYD L                                                                    11

SEQ ID NO: 228          moltype = AA  length = 11
FEATURE                 Location/Qualifiers
REGION                  1..11
                        note = synthetic construct
source                  1..11
                        mol_type = protein
                        organism = synthetic construct
SEQUENCE: 228
QASQSIGSYL A                                                                    11

SEQ ID NO: 229          moltype = AA  length = 7
FEATURE                 Location/Qualifiers
REGION                  1..7
                        note = synthetic construct
source                  1..7
                        mol_type = protein
                        organism = synthetic construct
SEQUENCE: 229
DASDLAS                                                                         7

SEQ ID NO: 230          moltype = AA  length = 12
FEATURE                 Location/Qualifiers
REGION                  1..12
                        note = synthetic construct
source                  1..12
                        mol_type = protein
                        organism = synthetic construct
SEQUENCE: 230
QSAVYDSSYV VT                                                                   12

SEQ ID NO: 231          moltype = AA  length = 10
FEATURE                 Location/Qualifiers
REGION                  1..10
                        note = synthetic construct
source                  1..10
                        mol_type = protein
                        organism = synthetic construct
SEQUENCE: 231
GFSLSSYDMS                                                                      10

SEQ ID NO: 232          moltype = AA  length = 16
FEATURE                 Location/Qualifiers
REGION                  1..16
                        note = synthetic construct
source                  1..16
                        mol_type = protein
                        organism = synthetic construct
SEQUENCE: 232
ISDSLGTTWY ANWAKG                                                               16

SEQ ID NO: 233          moltype = AA  length = 11
FEATURE                 Location/Qualifiers
REGION                  1..11
                        note = synthetic construct
source                  1..11
                        mol_type = protein
```

-continued

```
SEQUENCE: 233
ESGDIRIDYD L                                                    11

SEQ ID NO: 234          moltype = AA   length = 12
FEATURE                 Location/Qualifiers
REGION                  1..12
                        note = synthetic construct
source                  1..12
                        mol_type = protein
                        organism = synthetic construct
SEQUENCE: 234
QASQSLNINY LS                                                   12

SEQ ID NO: 235          moltype = AA   length = 7
FEATURE                 Location/Qualifiers
REGION                  1..7
                        note = synthetic construct
source                  1..7
                        mol_type = protein
                        organism = synthetic construct
SEQUENCE: 235
SASTLAS                                                          7

SEQ ID NO: 236          moltype = AA   length = 12
FEATURE                 Location/Qualifiers
REGION                  1..12
                        note = synthetic construct
source                  1..12
                        mol_type = protein
                        organism = synthetic construct
SEQUENCE: 236
QQSVNYGRVD NI                                                   12

SEQ ID NO: 237          moltype = AA   length = 10
FEATURE                 Location/Qualifiers
REGION                  1..10
                        note = synthetic construct
source                  1..10
                        mol_type = protein
                        organism = synthetic construct
SEQUENCE: 237
GFTISNYHMS                                                      10

SEQ ID NO: 238          moltype = AA   length = 16
FEATURE                 Location/Qualifiers
REGION                  1..16
                        note = synthetic construct
source                  1..16
                        mol_type = protein
                        organism = synthetic construct
SEQUENCE: 238
RIVSYGGTYY ANWAKG                                               16

SEQ ID NO: 239          moltype = AA   length = 11
FEATURE                 Location/Qualifiers
REGION                  1..11
                        note = synthetic construct
source                  1..11
                        mol_type = protein
                        organism = synthetic construct
SEQUENCE: 239
DSSGSGFSFA L                                                    11

SEQ ID NO: 240          moltype = AA   length = 12
FEATURE                 Location/Qualifiers
REGION                  1..12
                        note = synthetic construct
source                  1..12
                        mol_type = protein
                        organism = synthetic construct
SEQUENCE: 240
QASQSITTSY LS                                                   12

SEQ ID NO: 241          moltype = AA   length = 7
FEATURE                 Location/Qualifiers
REGION                  1..7
                        note = synthetic construct
source                  1..7
```

```
SEQUENCE: 241
KASTLAS                                                              7

SEQ ID NO: 242         moltype = AA  length = 12
FEATURE                Location/Qualifiers
REGION                 1..12
                       note = synthetic construct
source                 1..12
                       mol_type = protein
                       organism = synthetic construct
SEQUENCE: 242
QQSHNYGRVD NI                                                        12

SEQ ID NO: 243         moltype = AA  length = 10
FEATURE                Location/Qualifiers
REGION                 1..10
                       note = synthetic construct
source                 1..10
                       mol_type = protein
                       organism = synthetic construct
SEQUENCE: 243
GFTISNYHMS                                                           10

SEQ ID NO: 244         moltype = AA  length = 16
FEATURE                Location/Qualifiers
REGION                 1..16
                       note = synthetic construct
source                 1..16
                       mol_type = protein
                       organism = synthetic construct
SEQUENCE: 244
RIVSYGGTYY ANWAKG                                                    16

SEQ ID NO: 245         moltype = AA  length = 11
FEATURE                Location/Qualifiers
REGION                 1..11
                       note = synthetic construct
source                 1..11
                       mol_type = protein
                       organism = synthetic construct
SEQUENCE: 245
DSSGSGFSFA L                                                         11

SEQ ID NO: 246         moltype = AA  length = 12
FEATURE                Location/Qualifiers
REGION                 1..12
                       note = synthetic construct
source                 1..12
                       mol_type = protein
                       organism = synthetic construct
SEQUENCE: 246
QASQSITTSY LS                                                        12

SEQ ID NO: 247         moltype = AA  length = 7
FEATURE                Location/Qualifiers
REGION                 1..7
                       note = synthetic construct
source                 1..7
                       mol_type = protein
                       organism = synthetic construct
SEQUENCE: 247
KASTLAS                                                              7

SEQ ID NO: 248         moltype = AA  length = 12
FEATURE                Location/Qualifiers
REGION                 1..12
                       note = synthetic construct
source                 1..12
                       mol_type = protein
                       organism = synthetic construct
SEQUENCE: 248
QQSHNYGRVD NI                                                        12

SEQ ID NO: 249         moltype = AA  length = 10
FEATURE                Location/Qualifiers
REGION                 1..10
                       note = synthetic construct
```

```
source                    1..10
                          mol_type = protein
                          organism = synthetic construct
SEQUENCE: 249
GFTISNYHMS                                                               10

SEQ ID NO: 250            moltype = AA  length = 16
FEATURE                   Location/Qualifiers
REGION                    1..16
                          note = synthetic construct
source                    1..16
                          mol_type = protein
                          organism = synthetic construct
SEQUENCE: 250
RIVSYGGTYY ANWAKG                                                        16

SEQ ID NO: 251            moltype = AA  length = 11
FEATURE                   Location/Qualifiers
REGION                    1..11
                          note = synthetic construct
source                    1..11
                          mol_type = protein
                          organism = synthetic construct
SEQUENCE: 251
DSSGSGFSFA L                                                             11

SEQ ID NO: 252            moltype = AA  length = 12
FEATURE                   Location/Qualifiers
REGION                    1..12
                          note = synthetic construct
source                    1..12
                          mol_type = protein
                          organism = synthetic construct
SEQUENCE: 252
QASQSITTSY LS                                                            12

SEQ ID NO: 253            moltype = AA  length = 7
FEATURE                   Location/Qualifiers
REGION                    1..7
                          note = synthetic construct
source                    1..7
                          mol_type = protein
                          organism = synthetic construct
SEQUENCE: 253
KASTLAS                                                                  7

SEQ ID NO: 254            moltype = AA  length = 12
FEATURE                   Location/Qualifiers
REGION                    1..12
                          note = synthetic construct
source                    1..12
                          mol_type = protein
                          organism = synthetic construct
SEQUENCE: 254
QQSHNYGRVD NI                                                            12

SEQ ID NO: 255            moltype = AA  length = 10
FEATURE                   Location/Qualifiers
REGION                    1..10
                          note = synthetic construct
source                    1..10
                          mol_type = protein
                          organism = synthetic construct
SEQUENCE: 255
GFTISNYHMS                                                               10

SEQ ID NO: 256            moltype = AA  length = 16
FEATURE                   Location/Qualifiers
REGION                    1..16
                          note = synthetic construct
source                    1..16
                          mol_type = protein
                          organism = synthetic construct
SEQUENCE: 256
RIVSYGGTYY ANWAKG                                                        16

SEQ ID NO: 257            moltype = AA  length = 11
FEATURE                   Location/Qualifiers
REGION                    1..11
```

```
                              note = synthetic construct
source                        1..11
                              mol_type = protein
                              organism = synthetic construct
SEQUENCE: 257
DSSGSGFSFA L                                                                  11

SEQ ID NO: 258                moltype = AA  length = 12
FEATURE                       Location/Qualifiers
REGION                        1..12
                              note = synthetic construct
source                        1..12
                              mol_type = protein
                              organism = synthetic construct
SEQUENCE: 258
QASQSITTSY LS                                                                 12

SEQ ID NO: 259                moltype = AA  length = 7
FEATURE                       Location/Qualifiers
REGION                        1..7
                              note = synthetic construct
source                        1..7
                              mol_type = protein
                              organism = synthetic construct
SEQUENCE: 259
KASTLAS                                                                        7

SEQ ID NO: 260                moltype = AA  length = 12
FEATURE                       Location/Qualifiers
REGION                        1..12
                              note = synthetic construct
source                        1..12
                              mol_type = protein
                              organism = synthetic construct
SEQUENCE: 260
QQSHNYGRVD NI                                                                 12

SEQ ID NO: 261                moltype = AA  length = 10
FEATURE                       Location/Qualifiers
REGION                        1..10
                              note = synthetic construct
source                        1..10
                              mol_type = protein
                              organism = synthetic construct
SEQUENCE: 261
GFTISNYHMS                                                                    10

SEQ ID NO: 262                moltype = AA  length = 16
FEATURE                       Location/Qualifiers
REGION                        1..16
                              note = synthetic construct
source                        1..16
                              mol_type = protein
                              organism = synthetic construct
SEQUENCE: 262
RIVSYGGTYY ANWAKG                                                             16

SEQ ID NO: 263                moltype = AA  length = 11
FEATURE                       Location/Qualifiers
REGION                        1..11
                              note = synthetic construct
source                        1..11
                              mol_type = protein
                              organism = synthetic construct
SEQUENCE: 263
DSSGSGFSFA L                                                                  11

SEQ ID NO: 264                moltype = AA  length = 11
FEATURE                       Location/Qualifiers
REGION                        1..11
                              note = synthetic construct
source                        1..11
                              mol_type = protein
                              organism = synthetic construct
SEQUENCE: 264
QASQNIYSNL A                                                                  11

SEQ ID NO: 265                moltype = AA  length = 7
FEATURE                       Location/Qualifiers
```

-continued

```
REGION                      1..7
                            note = synthetic construct
source                      1..7
                            mol_type = protein
                            organism = synthetic construct
SEQUENCE: 265
KASTLAS                                                                         7

SEQ ID NO: 266              moltype = AA   length = 10
FEATURE                     Location/Qualifiers
REGION                      1..10
                            note = synthetic construct
source                      1..10
                            mol_type = protein
                            organism = synthetic construct
SEQUENCE: 266
QAYVGNYIYT                                                                     10

SEQ ID NO: 267              moltype = AA   length = 10
FEATURE                     Location/Qualifiers
REGION                      1..10
                            note = synthetic construct
source                      1..10
                            mol_type = protein
                            organism = synthetic construct
SEQUENCE: 267
GFSLSSYPMS                                                                     10

SEQ ID NO: 268              moltype = AA   length = 16
FEATURE                     Location/Qualifiers
REGION                      1..16
                            note = synthetic construct
source                      1..16
                            mol_type = protein
                            organism = synthetic construct
SEQUENCE: 268
IIGSSGSIGY ASWAKG                                                              16

SEQ ID NO: 269              moltype = AA   length = 9
FEATURE                     Location/Qualifiers
REGION                      1..9
                            note = synthetic construct
source                      1..9
                            mol_type = protein
                            organism = synthetic construct
SEQUENCE: 269
GWFYYGMDL                                                                       9

SEQ ID NO: 270              moltype = AA   length = 11
FEATURE                     Location/Qualifiers
REGION                      1..11
                            note = synthetic construct
source                      1..11
                            mol_type = protein
                            organism = synthetic construct
SEQUENCE: 270
QASQSIGSNL A                                                                   11

SEQ ID NO: 271              moltype = AA   length = 7
FEATURE                     Location/Qualifiers
REGION                      1..7
                            note = synthetic construct
source                      1..7
                            mol_type = protein
                            organism = synthetic construct
SEQUENCE: 271
RASTLAS                                                                         7

SEQ ID NO: 272              moltype = AA   length = 10
FEATURE                     Location/Qualifiers
REGION                      1..10
                            note = synthetic construct
source                      1..10
                            mol_type = protein
                            organism = synthetic construct
SEQUENCE: 272
QGYYGDGIYG                                                                     10

SEQ ID NO: 273              moltype = AA   length = 10
```

-continued

```
FEATURE              Location/Qualifiers
REGION               1..10
                     note = synthetic construct
source               1..10
                     mol_type = protein
                     organism = synthetic construct
SEQUENCE: 273
GFSLSSYPMS                                                                    10

SEQ ID NO: 274       moltype = AA  length = 16
FEATURE              Location/Qualifiers
REGION               1..16
                     note = synthetic construct
source               1..16
                     mol_type = protein
                     organism = synthetic construct
SEQUENCE: 274
LIGSSGTIYF ATWAKG                                                             16

SEQ ID NO: 275       moltype = AA  length = 9
FEATURE              Location/Qualifiers
REGION               1..9
                     note = synthetic construct
source               1..9
                     mol_type = protein
                     organism = synthetic construct
SEQUENCE: 275
GWFYYGMDL                                                                      9

SEQ ID NO: 276       moltype = AA  length = 11
FEATURE              Location/Qualifiers
REGION               1..11
                     note = synthetic construct
source               1..11
                     mol_type = protein
                     organism = synthetic construct
SEQUENCE: 276
QASQSISSWL S                                                                  11

SEQ ID NO: 277       moltype = AA  length = 7
FEATURE              Location/Qualifiers
REGION               1..7
                     note = synthetic construct
source               1..7
                     mol_type = protein
                     organism = synthetic construct
SEQUENCE: 277
GASTLAS                                                                        7

SEQ ID NO: 278       moltype = AA  length = 12
FEATURE              Location/Qualifiers
REGION               1..12
                     note = synthetic construct
source               1..12
                     mol_type = protein
                     organism = synthetic construct
SEQUENCE: 278
QSYYYISSSS YT                                                                 12

SEQ ID NO: 279       moltype = AA  length = 10
FEATURE              Location/Qualifiers
REGION               1..10
                     note = synthetic construct
source               1..10
                     mol_type = protein
                     organism = synthetic construct
SEQUENCE: 279
GFSLSSYPMS                                                                    10

SEQ ID NO: 280       moltype = AA  length = 16
FEATURE              Location/Qualifiers
REGION               1..16
                     note = synthetic construct
source               1..16
                     mol_type = protein
                     organism = synthetic construct
SEQUENCE: 280
LIGSSGTIYF ATWAKG                                                             16
```

-continued

```
SEQ ID NO: 281         moltype = AA   length = 9
FEATURE                Location/Qualifiers
REGION                 1..9
                       note = synthetic construct
source                 1..9
                       mol_type = protein
                       organism = synthetic construct
SEQUENCE: 281
GWFYYGMDL                                                               9

SEQ ID NO: 282         moltype = AA   length = 11
FEATURE                Location/Qualifiers
REGION                 1..11
                       note = synthetic construct
source                 1..11
                       mol_type = protein
                       organism = synthetic construct
SEQUENCE: 282
QASQSISSYL A                                                           11

SEQ ID NO: 283         moltype = AA   length = 7
FEATURE                Location/Qualifiers
REGION                 1..7
                       note = synthetic construct
source                 1..7
                       mol_type = protein
                       organism = synthetic construct
SEQUENCE: 283
SASTLAS                                                                 7

SEQ ID NO: 284         moltype = AA   length = 13
FEATURE                Location/Qualifiers
REGION                 1..13
                       note = synthetic construct
source                 1..13
                       mol_type = protein
                       organism = synthetic construct
SEQUENCE: 284
QCHYHGSSYW DNS                                                         13

SEQ ID NO: 285         moltype = AA   length = 11
FEATURE                Location/Qualifiers
REGION                 1..11
                       note = synthetic construct
source                 1..11
                       mol_type = protein
                       organism = synthetic construct
SEQUENCE: 285
GFSFSSSYWI C                                                           11

SEQ ID NO: 286         moltype = AA   length = 18
FEATURE                Location/Qualifiers
REGION                 1..18
                       note = synthetic construct
source                 1..18
                       mol_type = protein
                       organism = synthetic construct
SEQUENCE: 286
CIDTGVSGDT YYANWAEG                                                    18

SEQ ID NO: 287         moltype = AA   length = 11
FEATURE                Location/Qualifiers
REGION                 1..11
                       note = synthetic construct
source                 1..11
                       mol_type = protein
                       organism = synthetic construct
SEQUENCE: 287
DIFGSAIDNS L                                                           11

SEQ ID NO: 288         moltype = AA   length = 11
FEATURE                Location/Qualifiers
REGION                 1..11
                       note = synthetic construct
source                 1..11
                       mol_type = protein
                       organism = synthetic construct
SEQUENCE: 288
QASQNIYSNL A                                                           11
```

```
SEQ ID NO: 289           moltype = AA   length = 7
FEATURE                  Location/Qualifiers
REGION                   1..7
                         note = synthetic construct
source                   1..7
                         mol_type = protein
                         organism = synthetic construct
SEQUENCE: 289
GASNLES                                                                   7

SEQ ID NO: 290           moltype = AA   length = 10
FEATURE                  Location/Qualifiers
REGION                   1..10
                         note = synthetic construct
source                   1..10
                         mol_type = protein
                         organism = synthetic construct
SEQUENCE: 290
QGGYSGGIYA                                                               10

SEQ ID NO: 291           moltype = AA   length = 10
FEATURE                  Location/Qualifiers
REGION                   1..10
                         note = synthetic construct
source                   1..10
                         mol_type = protein
                         organism = synthetic construct
SEQUENCE: 291
GFSLTRHAMS                                                               10

SEQ ID NO: 292           moltype = AA   length = 16
FEATURE                  Location/Qualifiers
REGION                   1..16
                         note = synthetic construct
source                   1..16
                         mol_type = protein
                         organism = synthetic construct
SEQUENCE: 292
AIHGSGVTDY ASWAKG                                                        16

SEQ ID NO: 293           moltype = AA   length = 4
FEATURE                  Location/Qualifiers
REGION                   1..4
                         note = synthetic construct
source                   1..4
                         mol_type = protein
                         organism = synthetic construct
SEQUENCE: 293
GSGL                                                                      4

SEQ ID NO: 294           moltype = AA   length = 112
FEATURE                  Location/Qualifiers
REGION                   1..112
                         note = synthetic construct
source                   1..112
                         mol_type = protein
                         organism = synthetic construct
SEQUENCE: 294
DIVMTQTPAS VEAAVGGTVT IKCQASQSIY RYLSWYQQKP GQRPKLLIYG ASNLASGVSS        60
RFKGSGSGTE FTLTISDLEC ADAATYYCQS YYYSSSSGYG NVFGGGTEVV VK               112

SEQ ID NO: 295           moltype = AA   length = 11
FEATURE                  Location/Qualifiers
REGION                   1..11
                         note = synthetic construct
source                   1..11
                         mol_type = protein
                         organism = synthetic construct
SEQUENCE: 295
QASQSIYRYL S                                                             11

SEQ ID NO: 296           moltype = AA   length = 7
FEATURE                  Location/Qualifiers
REGION                   1..7
                         note = synthetic construct
source                   1..7
                         mol_type = protein
                         organism = synthetic construct
```

```
SEQUENCE: 296
GASNLAS                                                                  7

SEQ ID NO: 297          moltype = AA  length = 14
FEATURE                 Location/Qualifiers
REGION                  1..14
                        note = synthetic construct
source                  1..14
                        mol_type = protein
                        organism = synthetic construct
SEQUENCE: 297
QSYYYSSSSG YGNV                                                         14

SEQ ID NO: 298          moltype = AA  length = 122
FEATURE                 Location/Qualifiers
REGION                  1..122
                        note = synthetic construct
source                  1..122
                        mol_type = protein
                        organism = synthetic construct
SEQUENCE: 298
QEQLKESGGG LVQPGGSLKL SCKASGFDLS SYGVSWVRQA PGKGLEWIGY IDPVFGSTYY        60
ANWVNGRFTI SSDNAQNTLY LQLNSLTAAD TATYFCARGS GYVYYGYTYD LWGPGTLVTV       120
SS                                                                     122

SEQ ID NO: 299          moltype = AA  length = 10
FEATURE                 Location/Qualifiers
REGION                  1..10
                        note = synthetic construct
source                  1..10
                        mol_type = protein
                        organism = synthetic construct
SEQUENCE: 299
GFDLSSYGVS                                                              10

SEQ ID NO: 300          moltype = AA  length = 17
FEATURE                 Location/Qualifiers
REGION                  1..17
                        note = synthetic construct
source                  1..17
                        mol_type = protein
                        organism = synthetic construct
SEQUENCE: 300
YIDPVFGSTY YANWVNG                                                      17

SEQ ID NO: 301          moltype = AA  length = 13
FEATURE                 Location/Qualifiers
REGION                  1..13
                        note = synthetic construct
source                  1..13
                        mol_type = protein
                        organism = synthetic construct
SEQUENCE: 301
GSGYVYYGYT YDL                                                          13

SEQ ID NO: 302          moltype = AA  length = 113
FEATURE                 Location/Qualifiers
REGION                  1..113
                        note = synthetic construct
source                  1..113
                        mol_type = protein
                        organism = synthetic construct
SEQUENCE: 302
DIVMTQSPSS LAMSVGQKVT MSCKSSQSLL SSYNQKNYLA WYQRKPGQSP KLLVYFASQR        60
ATGVPDRFIG SGSGSDFTLT ISSVQAEDLA DYFCQQHTRL PITFGAGTKL ELK              113

SEQ ID NO: 303          moltype = AA  length = 17
FEATURE                 Location/Qualifiers
REGION                  1..17
                        note = synthetic construct
source                  1..17
                        mol_type = protein
                        organism = synthetic construct
SEQUENCE: 303
KSSQSLLSSY NQKNYLA                                                      17

SEQ ID NO: 304          moltype = AA  length = 7
FEATURE                 Location/Qualifiers
REGION                  1..7
```

```
                              note = synthetic construct
source                        1..7
                              mol_type = protein
                              organism = synthetic construct
SEQUENCE: 304
FASQRAT                                                                      7

SEQ ID NO: 305                moltype = AA  length = 9
FEATURE                       Location/Qualifiers
REGION                        1..9
                              note = synthetic construct
source                        1..9
                              mol_type = protein
                              organism = synthetic construct
SEQUENCE: 305
QQHTRLPIT                                                                    9

SEQ ID NO: 306                moltype = AA  length = 119
FEATURE                       Location/Qualifiers
REGION                        1..119
                              note = synthetic construct
source                        1..119
                              mol_type = protein
                              organism = synthetic construct
SEQUENCE: 306
EVQLQQSGPV LVKPGASVKM SCKASGYPFN DYFLGWVKQS HGKSLEWIGS INPDNDYTMS            60
NQKFKGKATL TVDKSSSTAY MELNSLTSED SAVYYCARYD YDWAWFAHWG QGTLVTVSA            119

SEQ ID NO: 307                moltype = AA  length = 10
FEATURE                       Location/Qualifiers
REGION                        1..10
                              note = synthetic construct
source                        1..10
                              mol_type = protein
                              organism = synthetic construct
SEQUENCE: 307
GYPFNDYFLG                                                                  10

SEQ ID NO: 308                moltype = AA  length = 17
FEATURE                       Location/Qualifiers
REGION                        1..17
                              note = synthetic construct
source                        1..17
                              mol_type = protein
                              organism = synthetic construct
SEQUENCE: 308
SINPDNDYTM SNQKFKG                                                          17

SEQ ID NO: 309                moltype = AA  length = 10
FEATURE                       Location/Qualifiers
REGION                        1..10
                              note = synthetic construct
source                        1..10
                              mol_type = protein
                              organism = synthetic construct
SEQUENCE: 309
YDYDWAWFAH                                                                  10

SEQ ID NO: 310                moltype = AA  length = 216
FEATURE                       Location/Qualifiers
REGION                        1..216
                              note = synthetic construct
source                        1..216
                              mol_type = protein
                              organism = synthetic construct
SEQUENCE: 310
DIVMTQTPAS VEAAVGGTVT IKCQASQSIY RYLSWYQQKP GQRPKLLIYG ASNLASGVSS            60
RPKGSGSGTE FTLTISDLEC ADAATYYCQS YYYSSSSGYG NVFGGGTEVV VKGDPVAPTV           120
LIFPPAADQV ATGTVTIVCV ANKYFPDVTV TWEVDGTTQT TGIENSKTPQ NSADCTYNLS           180
STLTLTSTQY NSHKEYTCKV TQGTTSVVQS FNRGDC                                    216

SEQ ID NO: 311                moltype = AA  length = 445
FEATURE                       Location/Qualifiers
REGION                        1..445
                              note = synthetic construct
source                        1..445
                              mol_type = protein
                              organism = synthetic construct
SEQUENCE: 311
```

```
QEQLKESGGG LVQPGGSLKL SCKASGFDLS SYGVSWVRQA PGKGLEWIGY IDPVFGSTYY    60
ANWVNGRFTI SSDNAQNTLY LQLNSLTAAD TATYFCARGS GYVYYGYTYD LWGPGTLVTV   120
SSGQPKAPSV FPLAPCCGDT PSSTVTLGCL VKGYLPEPVT VTWNSGTLTN GVRTFPSVRQ   180
SSGLYSLSSV VSVTSSSQPV TCNVAHPATN TKVDKTVAPS TCSKPTCPPP ELLGGPSVFI   240
FPPKPKDTLM ISRTPEVTCV VVDVSQDDPE VQFTWYINNE QVRTARPPLR EQQFNSTIRV   300
VSTLPIAHQD WLRGKEFKCK VHNKALPAPI EKTISKARGQ PLEPKVYTMG PPREELSSRS   360
VSLTCMINGF YPSDISVEWE KNGKAEDNYK TTPAVLDSDG SYFLYSKLSV PTSEWQRGDV   420
FTCSVMHEAL HNHYTQKSIS RSPGK                                        445

SEQ ID NO: 312          moltype = AA  length = 220
FEATURE                 Location/Qualifiers
REGION                  1..220
                        note = synthetic construct
source                  1..220
                        mol_type = protein
                        organism = synthetic construct
SEQUENCE: 312
DIVMTQSPSS LAMSVGQKVT MSCKSSQSLL SSYNQKNYLA WYQRKPGQSP KLLVYFASQR    60
ATGVPDRFIG SGSGSDFTLT ISSVQAEDLA DYFCQQHTRL PITFGAGTKL ELKRADAAPT   120
VSIFPPSSEQ LTSGGASVVC FLNNFYPKDI NVKWKIDGSE RQNGVLNSWT DQDSKDSTYS   180
MSSTLTLTKD EYERHNSYTC EATHKTSTSP IVKSFNRNEC                         220

SEQ ID NO: 313          moltype = AA  length = 443
FEATURE                 Location/Qualifiers
REGION                  1..443
                        note = synthetic construct
source                  1..443
                        mol_type = protein
                        organism = synthetic construct
SEQUENCE: 313
EVQLQQSGPV LVKPGASVKM SCKASGYPFN DYFLGWVKQS HGKSLEWIGS INPDNDYTMS    60
NQKFKGKATL TVDKSSSTAY MELNSLTSED SAVYYCARYD YDWAWFAHWG QGTLVTVSAA   120
KTTPPSVYPL APGSAAQTNS MVTLGCLVKG YFPEPVTVTW NSGSLSSGVH TFPAVLQSDL   180
YTLSSSVTVP SSTWPSETVT CNVAHPASST KVDKKIVPRD CGCKPCICTV PEVSSVFIFP   240
PKPKDVLTIT LTPKVTCVVV DISKDDPEVQ FSWFVDDVEV HTAQTQPREE QFNSTFRSVS   300
ELPIMHQDWL NGKEFKCRVN SAAFPAPIEK TISKTKGRPK APQVYTIPPP KEQMAKDKVS   360
LTCMITDFFP EDITVEWQWN GQPAENYKNT QPIMDTDGSY FVYSKLNVQK SNWEAGNTFT   420
CSVLHEGLHN HHTEKSLSHS PGK                                           443
```

We claim:

1. A method of detecting IL-19 in a patient sample comprising the steps of:

contacting the patient sample with a first antibody, said first antibody binding a first epitope region of IL-19; wherein the first antibody comprises a light chain variable region (LCVR) and a heavy chain variable region (HCVR), wherein the LCR and HCVR are selected from:

a. the LCVR having the amino acid sequence of SEQ ID NO: 66 and the HCVR having the amino acid sequence of SEQ ID NO: 70;

b. the LCVR having the amino acid sequence of SEQ ID NO: 74 and the HCVR having the amino acid sequence of SEQ ID NO: 78;

c. the LCVR having the amino acid sequence of SEQ ID NO: 82 and the HCVR having the amino acid sequence of SEQ ID NO: 86;

d. the LCVR having the amino acid sequence of SEQ ID NO: 34 and the HCVR having the amino acid sequence of SEQ ID NO: 38;

e. the LCVR having the amino acid sequence of SEQ ID NO: 42 and the HCVR having the amino acid sequence of SEQ ID NO: 46;

f. the LCVR having the amino acid sequence of SEQ ID NO: 50 and the HCVR having the amino acid sequence of SEQ ID NO: 54;

g. the LCVR having the amino acid sequence of SEQ ID NO: 58 and the HCVR having the amino acid sequence of SEQ ID NO: 62;

h. the LCVR having the amino acid sequence of SEQ ID NO: 294 and the HCVR having the amino acid sequence of SEQ ID NO: 298; and i. the LCVR having the amino acid sequence of SEQ ID NO: 302 and the HCVR having the amino acid sequence of SEQ ID NO: 306, and contacting the patient sample with a second antibody, said second antibody binding a second epitope region of IL-19 and said second antibody comprising a detectable label;

wherein the second antibody comprises a light chain variable region (LCVR) and a heavy chain variable region (HCVR), wherein the LCVR comprises complementarity determining regions (CDRs) LCDR1 set forth in SEQ ID NO. 11, LCDR2 set forth in SEQ ID NO. 12, and LCDR3 set forth in SEQ ID NO. 13 and the HCVR comprises CDRs HCDR1 set forth in SEQ ID NO. 15, HCDR2 set forth in SEQ ID NO. 16 and HCDR3 set forth in SEQ ID NO. 17, and detecting a signal provided by said detectable label of the second antibody contacting the patient sample.

2. The method of claim 1, wherein the patient sample is one of blood, plasma, or serum.

* * * * *